US007328242B1

(12) United States Patent
McCarthy et al.

(10) Patent No.: US 7,328,242 B1
(45) Date of Patent: Feb. 5, 2008

(54) USING MULTIPLE SIMULTANEOUS THREADS OF COMMUNICATION

(75) Inventors: James Mark McCarthy, Woodinville, WA (US); Michelle Lee McCarthy, Woodinville, WA (US)

(73) Assignee: McCarthy Software, Inc., Woodinville, WA (US)

( * ) Notice: Subject to any disclaimer, the term of this patent is extended or adjusted under 35 U.S.C. 154(b) by 855 days.

(21) Appl. No.: 10/246,809

(22) Filed: Sep. 17, 2002

Related U.S. Application Data

(60) Provisional application No. 60/337,945, filed on Nov. 9, 2001.

(51) Int. Cl.
*G06F 15/16* (2006.01)

(52) U.S. Cl. ...................... 709/204; 709/203; 709/205; 715/751; 715/753; 715/758; 715/759

(58) Field of Classification Search ..................... None
See application file for complete search history.

(56) References Cited

U.S. PATENT DOCUMENTS 7,188,140 B1 3/2007 Greenspan et al.

OTHER PUBLICATIONS

MIRC Application Screen shot (MIRC maybe downloaded from http://www.mirc.com).*
Microsoft Outlook Screen shot.*
DALNET website home page, at http://www.dalnet.net.*
Microsoft Outlook copyright date (shows the publication date).*
MIRC Home page at, http://www.mirc.com.*
Google Groups, an example of Usenet posts on a thread topic. It also shows a child thread. Posted at http://www.groups.google.com/group/uk.finance.stockmarket/index/browse_frm/thread/.*
MIRC Application Screen shot (MIRC maybe downloaded from http://www.mirc.com), Apr. 2006.*
Microsoft Outlook Screen shot, date unknown.*
DALNET website home page, at http://www.dalnet.net, Apr. 2006.*
Microsoft Outlook copyright date (shows the publication date), date unknown.*
MIRC Home page at, http://www.mirc.com, date unknown.*
Google Groups, an example of Usenet posts on a thread topic. It also shows a child thread. Posted at http://www.groups.google.com/group/uk.finance.stockmarket/index/broswse_frm/thread/, Apr. 2006.*

(Continued)

*Primary Examiner*—Yves Dalencourt
(74) *Attorney, Agent, or Firm*—Seed IP Law Group PLLC

(57) ABSTRACT

A method, system, and computer-readable medium is described for providing a thread messaging system for communications between users of thread client computing devices. The thread messaging system provides significant benefits over existing prior art messaging systems such as email, IM, chat and bulletin boards. In some situations, the thread messaging system supports each user having multiple simultaneous threads of conversation with distinct user-specified groups of multiple other users, maintains communications in a persistent and virtual manner such that a user can specify communications for threads regardless of their own connectivity status or that of the intended recipients and can receive thread communications from others that occurred while the user was not connected, and allows the communications for each thread conversation to be displayed distinctly and simultaneously such that the contents of current and previous communications are displayed together in a uniform manner and in a user-specified order.

94 Claims, 35 Drawing Sheets

OTHER PUBLICATIONS

Instant Messaging Planet: FAQ, Copyright 2002 (4 pages) http://www.instantmessagingplanet.com/faq/ [Accessed May 24, 2002].

Yahoo! Help, Copyright 2002 (1 page) http://help.yahoo.com/help/us/help/doyou/doyou-02.html [Accessed May 24, 2002].

Yahoo!Messenger, Copyright 2002 (1 page) http:/messenger.yahoo.com/ [Accessed May 24, 2002].

Yahoo!Messenger—IMVironments™, Copyright 2002 (2 pages) http://messenger/yahoo.com/mesenger/imv/ [Accessed May 24, 2002].

Yahoo!Messenger, Copyright 2002 (2 pages) http://help.yahoo.com/help/us/mesg/mesg-22.html [Accessed May 24, 2002].

Yahoo!Messenger, Copyright 2002 (1 page) http://help.yahoo.com/help/us/mesg/use/use-33.html [Accessed May 24, 2002].

Yahoo!Messenger, Copyright 2002 (2 pages) http://help.yahoo.com/help/us/mesg/use/use-01.html [Accessed May 24, 2002].

Yahoo!Messenger, Copyright 2002 (1 page) http://help.yahoo.com/help/us/mesg/use-use.02.html [Accessed May 24, 2002].

Yahoo!Messenger, Copyright 2002 (2 pages) http://help.yahoo.com/help/us/mesg/use/use-35. html [Accessed May 24, 2002].

Yahoo!Messenger, Copyright 2002 (2 pages) http://help.yahoo.com/help/us/mesg/chat/chat-01.html [Accessed May 24, 2002].

* cited by examiner

User A's Machine
Time: 1:04
Interaction Status: Active

100

Threads

| Thread ID | Subject | Other Participants |
|---|---|---|
| 1 | Topic 1 | User B, User C, User D |
| 2 | Topic 2 | User B |
|  |  |  |

Topic 1

| User | Communication | Sent | Received |
|---|---|---|---|
| User B: Communication 2 |  | 1:03 | 1:03 |
|  |  | Send |  |

Topic 2

| User | Communication | Sent | Received |
|---|---|---|---|
| User A: Communication 1 |  | 1:02 | 1:02 |
|  |  | Send |  |

User B's Machine
Time: 1:05
Interaction Status: Active

120

| Threads | | |
|---|---|---|
| Thread ID | Subject | Other Participants |
| 1 | Topic 1 | User A, User C, User D |
| 2 | Topic 2 | User A |
|  |  |  |

Topic 1

| User | Communication | Sent | Received |
|---|---|---|---|
| User B: Communication 2 | | 1:03 | 1:03 |
| | | | Send |

Topic 2

| User | Communication | Sent | Received |
|---|---|---|---|
| User A: Communication 1 | | 1:02 | 1:02 |
| Communication 3 —115c | | | Send |

User C's Machine
Time: 1:07
Interaction Status: Active

Threads — 130

131 →

| Thread ID | Subject | Other Participants |
|---|---|---|
| 1 | Topic 1 | User A, User B, User D |

Topic 1

132a →

| User | Communication | Sent | Received |
|---|---|---|---|
| User B: Communication 2 | | 1:03 | 1:05 |
| Communication 4 — 115d | | Send | |

User B's Machine
Time: 1:08
Interaction Status: Active

120

Threads

| Thread ID | Subject | Other Participants |
|---|---|---|
| 1 | Topic 1 | User A, User C, User D |
| 2 | Topic 2 | User A |
| | | |

Topic 1

| User | Communication | Sent | Received |
|---|---|---|---|
| User B: | Communication 2 | 1:03 | 1:03 |
| User C: | Communication 4 | 1:07 | 1:08 |

Send

Topic 2

| User | Communication | Sent | Received |
|---|---|---|---|
| User A: | Communication 1 | 1:02 | 1:02 |
| User B: | Communication 3 | 1:05 | 1:05 |

115e

Communication 5

Send

*Fig. 1I*

User A's Machine
Time: 1:10
Interaction Status: Passive

Threads

| Thread ID | Subject | Other Participants |
|---|---|---|
| 1 | Topic 1 | User B, User C, User D |
| 2 | Topic 2 | User B |
| | | |

Topic 1

| User | Communication | Sent | Received |
|---|---|---|---|
| User B: Communication 2 | | 1:03 | 1:03 |
| Communication 6 — 115f | | Send | |

Topic 2

| User | Communication | Sent | Received |
|---|---|---|---|
| User A: Communication 1 | | 1:02 | 1:02 |
| User B: Communication 3 | | 1:05 | 1:05 |
| | | Send | |

User A's Machine
Time: 1:11
Interaction Status: Passive

100

| Threads | | |
|---|---|---|
| Thread ID | Subject | Other Participants |
| 1 | Topic 1 | User B, User C, User D |
| 2 | Topic 2 | User B |
| | | |

Topic 1

| User Communication | Sent | Received |
|---|---|---|
| User B: Communication 2<br>User A: Communication 6 | 1:03<br>1:10 | 1:03<br>1:10 |
| | | Send |

Topic 2

| User Communication | Sent | Received |
|---|---|---|
| User A: Communication 1<br>User B: Communication 3 | 1:02<br>1:05 | 1:02<br>1:05 |
| Communication 7 —115g | | Send |

User A's Machine
Time: 1:12
Interaction Status: Passive

100

Threads

| Thread ID | Subject | Other Participants |
|---|---|---|
| 1 | Topic 1 | User B, User C, User D |
| 2 | Topic 2 | User B |
|  |  |  |

Topic 1

| User | Communication | Sent | Received |
|---|---|---|---|
| User B: Communication 2<br>User A: Communication 6 |  | 1:03<br>1:10 | 1:03<br>1:10 |
|  |  | Send | |

Topic 2

| User | Communication | Sent | Received |
|---|---|---|---|
| User A: Communication 1<br>User B: Communication 3<br>User A: Communication 7 |  | 1:02<br>1:05<br>1:11 | 1:02<br>1:05<br>1:11 |
|  |  | Send | |

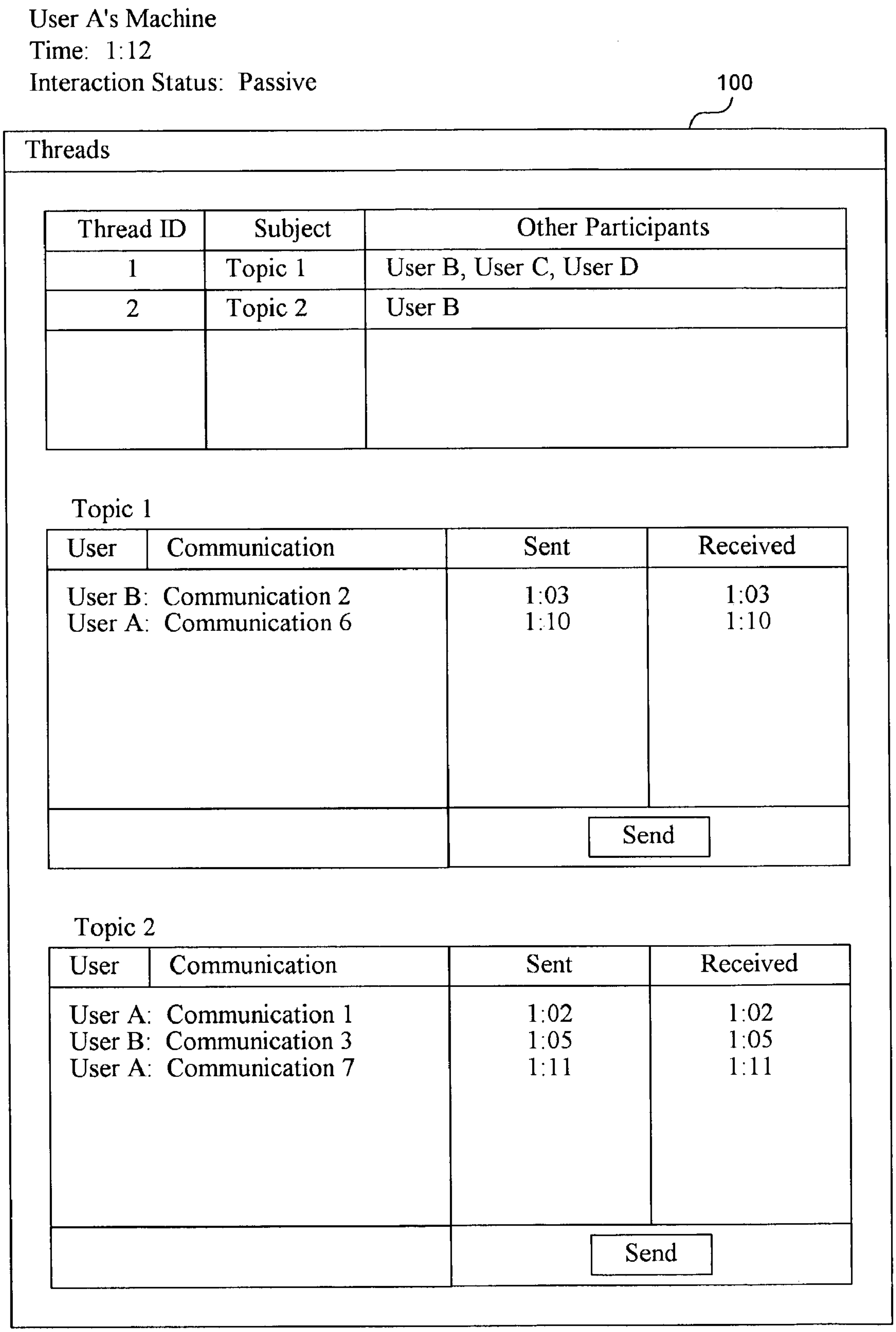

*Fig. 1M*

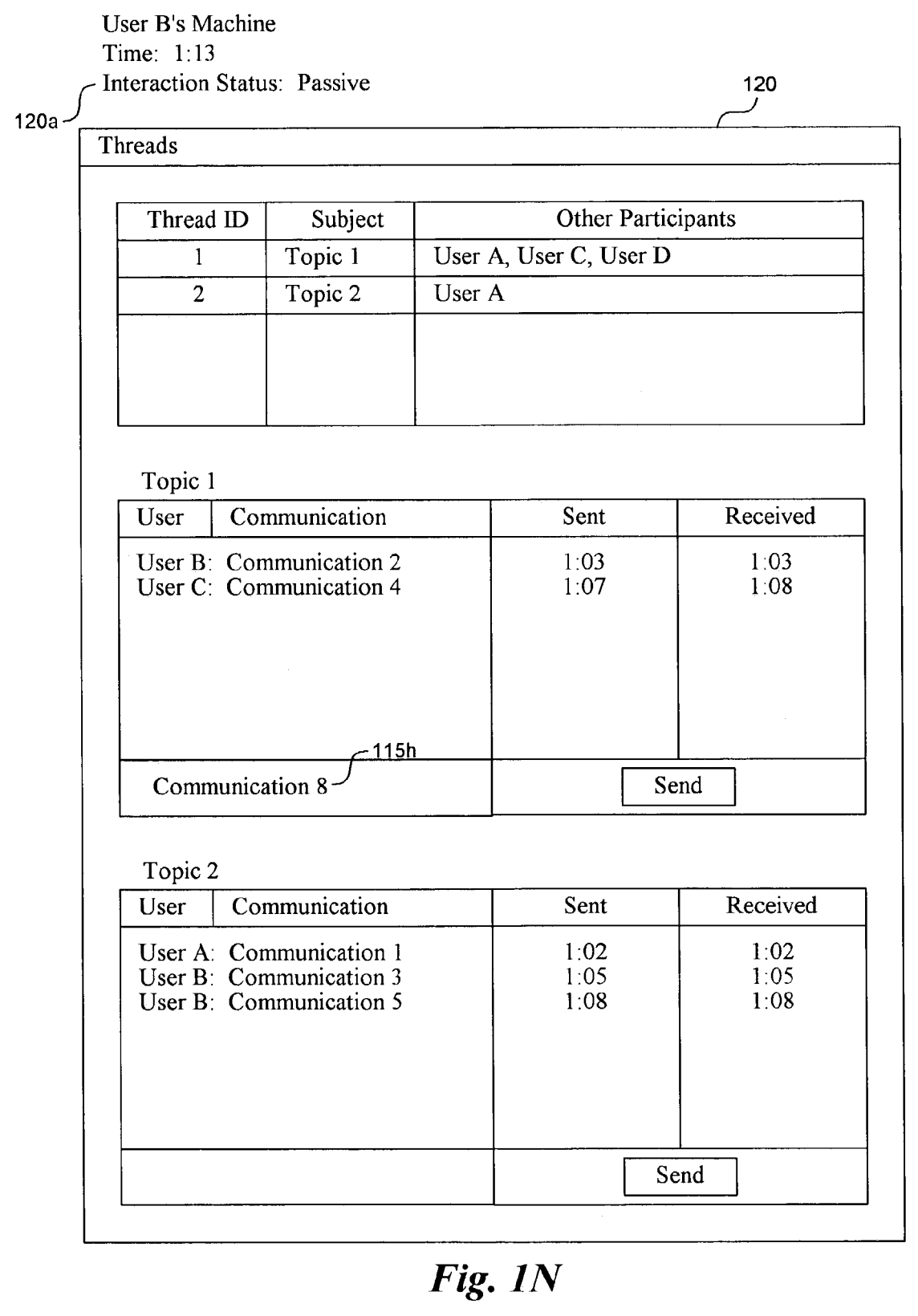

User B's Machine
Time: 1:13
Interaction Status: Passive

120a

120

Threads

| Thread ID | Subject | Other Participants |
|---|---|---|
| 1 | Topic 1 | User A, User C, User D |
| 2 | Topic 2 | User A |

Topic 1

| User | Communication | Sent | Received |
|---|---|---|---|
| User B: | Communication 2 | 1:03 | 1:03 |
| User C: | Communication 4 | 1:07 | 1:08 |
| Communication 8 | | Send | |

115h

Topic 2

| User | Communication | Sent | Received |
|---|---|---|---|
| User A: | Communication 1 | 1:02 | 1:02 |
| User B: | Communication 3 | 1:05 | 1:05 |
| User B: | Communication 5 | 1:08 | 1:08 |
| | | Send | |

*Fig. 1N*

User B's Machine
Time: 1:14
Interaction Status: Passive

120

Threads

| Thread ID | Subject | Other Participants |
|---|---|---|
| 1 | Topic 1 | User A, User C, User D |
| 2 | Topic 2 | User A |
| | | |

Topic 1

| User | Communication | Sent | Received |
|---|---|---|---|
| User B: | Communication 2 | 1:03 | 1:03 |
| User C: | Communication 4 | 1:07 | 1:08 |
| User B: | Communication 8 | 1:13 | 1:13 |

Send

Topic 2

| User | Communication | Sent | Received |
|---|---|---|---|
| User A: | Communication 1 | 1:02 | 1:02 |
| User B: | Communication 3 | 1:05 | 1:05 |
| User B: | Communication 5 | 1:08 | 1:08 |

Send

*Fig. 10*

User D's Machine
Time: 1:15
Interaction Status: Active                              140

| Thread ID | Subject | Other Participants |
|---|---|---|
| 1 | Topic 1 | User A, User B, User C |
|   |   |   |

Topic 1

| User | Communication | Sent | Received |
|---|---|---|---|
| User B: Communication 2 | | 1:03 | 1:03 |
| User C: Communication 4 | | 1:07 | 1:07 |

115i

| Communication 9 | Send |
|---|---|

User C's Machine
Time: 1:16
Interaction Status: Active                                                            130

| Threads | | |
|---|---|---|
| Thread ID | Subject | Other Participants |
| 1 | Topic 1 | User A, User B, User D |

139a — Exit Thread     139

Topic 1

| User | Communication | Sent | Received |
|---|---|---|---|
| User B: | Communication 2 | 1:03 | 1:05 |
| User C: | Communication 4 | 1:07 | 1:07 |
| User D: | Communication 9 | 1:15 | 1:15 |
| | | | Send |

User B's Machine
Time: 1:17
Interaction Status: Active

Threads

| Thread ID | Subject | Other Participants |
|---|---|---|
| 1 | Topic 1 | User A, User D |
| 2 | Topic 2 | User A |
|   |   |   |

Topic 1

| User | Communication | Sent | Received |
|---|---|---|---|
| User B: Communication 2 | | 1:03 | 1:03 |
| User C: Communication 4 | | 1:07 | 1:08 |
| User B: Communication 8 | | 1:13 | 1:13 |
| User D: Communication 9 | | 1:15 | 1:17 |

Communication 10    [Send]

Topic 2

| User | Communication | Sent | Received |
|---|---|---|---|
| User A: Communication 1 | | 1:02 | 1:02 |
| User B: Communication 3 | | 1:05 | 1:05 |
| User B: Communication 5 | | 1:08 | 1:08 |

[Send]

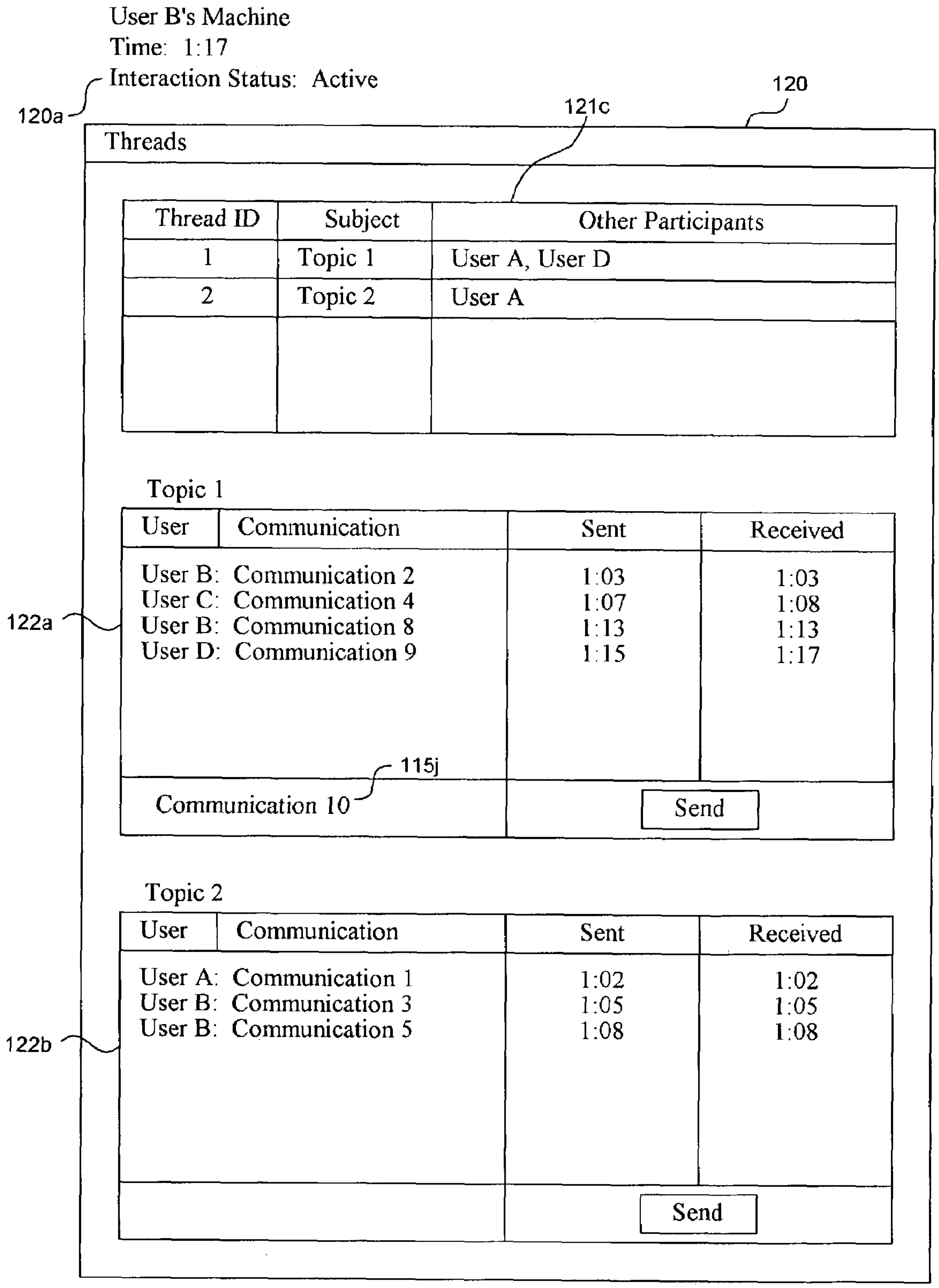

*Fig. 1R*

User D's Machine
Time: 1:18
Interaction Status: Active                                              140

| Thread ID | Subject | Other Participants |
|---|---|---|
| 1 | Topic 1 | User A, User B |
|   |   |   |

Topic 1

| User | Communication | Sent | Received |
|---|---|---|---|
| User B: Communication 2 | | 1:03 | 1:03 |
| User C: Communication 4 | | 1:07 | 1:07 |
| User B: Communication 8 | | 1:13 | 1:17 |
| User D: Communication 9 | | 1:15 | 1:15 |
| User B: Communication 10 | | 1:17 | 1:17 |
|  |  |  | Send |

142a (pointing to communication list)

User E's Machine
Time: 1:20
Interaction Status: Active                                                              160

| Thread ID | Subject | Other Participants |
|---|---|---|
| 1 | Topic 1 | User A, User B, User D |
|  |  |  |

Topic 1

| User | Communication | Sent | Received |
|---|---|---|---|
| User B: Communication 2 | | 1:03 | 1:20 |
| User C: Communication 4 | | 1:07 | 1:20 |
| User B: Communication 8 | | 1:13 | 1:20 |
| User D: Communication 9 | | 1:15 | 1:20 |
| User B: Communication 10 | | 1:17 | 1:20 |
| Communication 11  ⟵115k | | Send | |

162a points to the communication list.

User A's Machine
Time: 1:21
Interaction Status: Active

Threads

| Thread ID | Subject | Other Participants |
|---|---|---|
| 1 | Topic 1 | User B, User D, User E |
| 2 | Topic 2 | User B |
|  |  |  |

Topic 1

| User | Communication | Sent | Received |
|---|---|---|---|
| User B: Communication 2 | | 1:03 | 1:03 |
| User C: Communication 4 | | 1:07 | 1:21 |
| User A: Communication 6 | | 1:10 | 1:10 |
| User B: Communication 8 | | 1:13 | 1:21 |
| User D: Communication 9 | | 1:15 | 1:21 |
| User B: Communication 10 | | 1:17 | 1:21 |
| User E: Communication 11 | | 1:20 | 1:21 |
|  |  |  | Send |

Topic 2

| User | Communication | Sent | Received |
|---|---|---|---|
| User A: Communication 1 | | 1:02 | 1:02 |
| User B: Communication 3 | | 1:05 | 1:05 |
| User B: Communication 5 | | 1:08 | 1:21 |
| User A: Communication 7 | | 1:11 | 1:11 |
|  |  |  | Send |

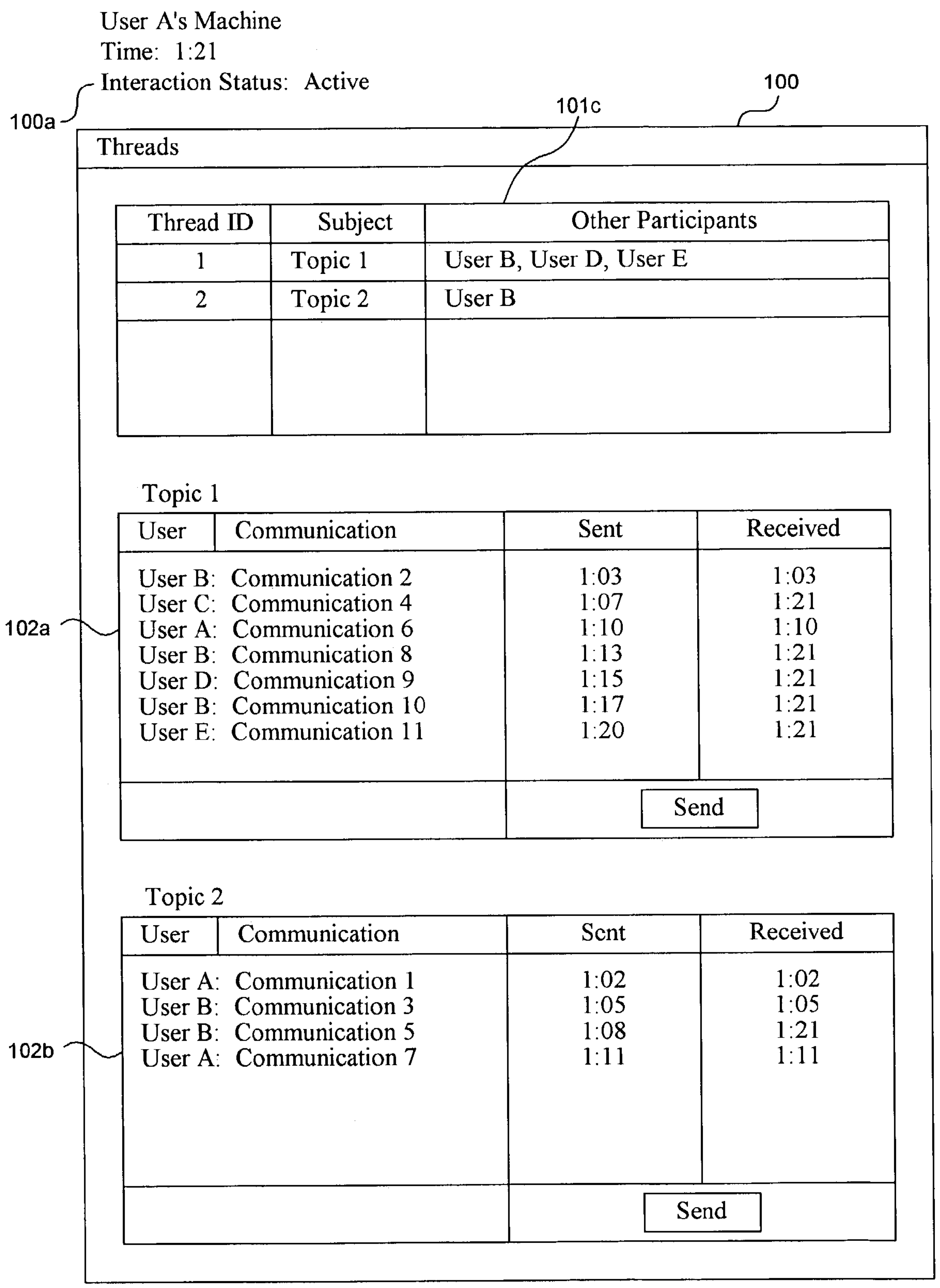

*Fig. 1V*

User A's Machine
Time: 1:22
Interaction Status: Active

100

Threads

| Thread ID | Subject | Other Participants |
|---|---|---|
| 1 | Topic 1 | User B, User D, User E |
| 2 | Topic 2 | User B |
|  |  |  |

Topic 1

| User | Communication | Sent | Received |
|---|---|---|---|
| User B: Communication 2 | | 1:03 | 1:03 |
| User C: Communication 4 | | 1:07 | 1:21 |
| User A: Communication 6 | | 1:10 | 1:10 |
| User B: Communication 8 | | 1:13 | 1:21 |
| User D: Communication 9 | | 1:15 | 1:21 |
| User B: Communication 10 | | 1:17 | 1:21 |
| User E: Communication 11 | | 1:20 | 1:21 |

Send

Topic 2

| User | Communication | Sent | Received |
|---|---|---|---|
| User A: Communication 1 | | 1:02 | 1:02 |
| User B: Communication 3 | | 1:05 | 1:05 |
| User A: Communication 7 | | 1:11 | 1:11 |
| User B: Communication 5 | | 1:08 | 1:21 |

100f

102b

Send

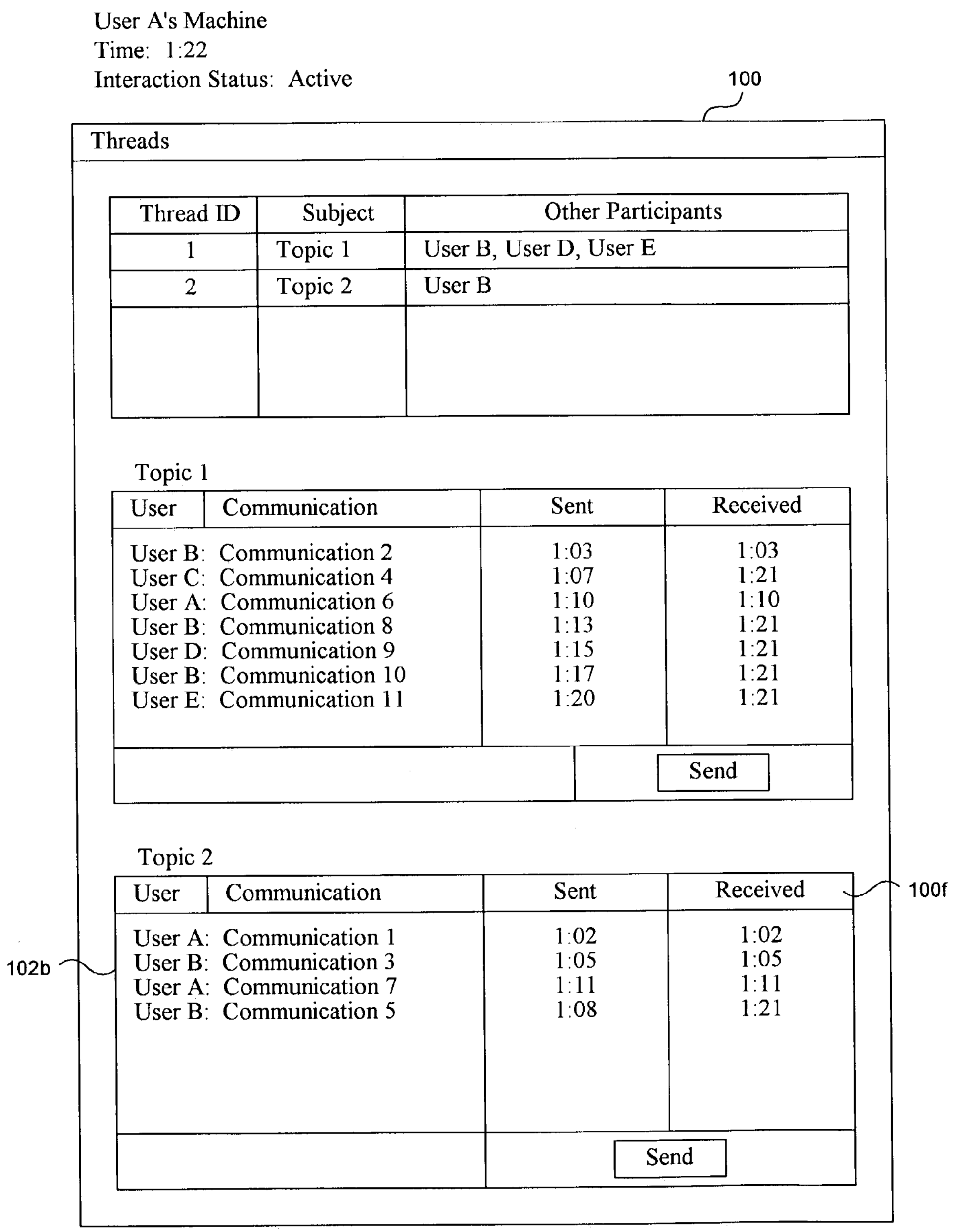

*Fig. 1W*

User B's Machine
Time: 1:23
Interaction Status: Active

120

Threads

| Thread ID | Subject | Other Participants |
|---|---|---|
| 1 | Topic 1 | User A, User D, User E |
| 2 | Topic 2 | User A |

Topic 1

120f

122a

| User | Communication | Sent | Received |
|---|---|---|---|
| User B: | Communication 2 | 1:03 | 1:03 |
| User C: | Communication 4 | 1:07 | 1:08 |
| User B: | Communication 8 | 1:13 | 1:13 |
| User D: | Communication 9 | 1:15 | 1:17 |
| User B: | Communication 10 | 1:17 | 1:17 |
| User E: | Communication 11 | 1:20 | 1:20 |
| User A: | Communication 6 | 1:10 | 1:21 |

Send

Topic 2

| User | Communication | Sent | Received |
|---|---|---|---|
| User A: | Communication 1 | 1:02 | 1:02 |
| User B: | Communication 3 | 1:05 | 1:05 |
| User B: | Communication 5 | 1:08 | 1:08 |
| User A: | Communication 7 | 1:11 | 1:21 |

Send

*Fig. 1X*

User D's Machine
Time: 1:24
Interaction Status: Active

140

Threads

| Thread ID | Subject | Other Participants |
|---|---|---|
| 1 | Topic 1 | User A, User B, User E |
|  |  |  |

Topic 1

140f — User | Communication | Sent | Received

| User | Communication | Sent | Received |
|---|---|---|---|
| User B: | Communication 2 | 1:03 | 1:03 |
| User B: | Communication 8 | 1:13 | 1:17 |
| User B: | Communication 10 | 1:17 | 1:17 |
| User C: | Communication 4 | 1:07 | 1:07 |
| User A: | Communication 6 | 1:10 | 1:21 |
| User D: | Communication 9 | 1:15 | 1:15 |
| User E: | Communication 11 | 1:20 | 1:20 |

142a points to the communication rows.

[Send]

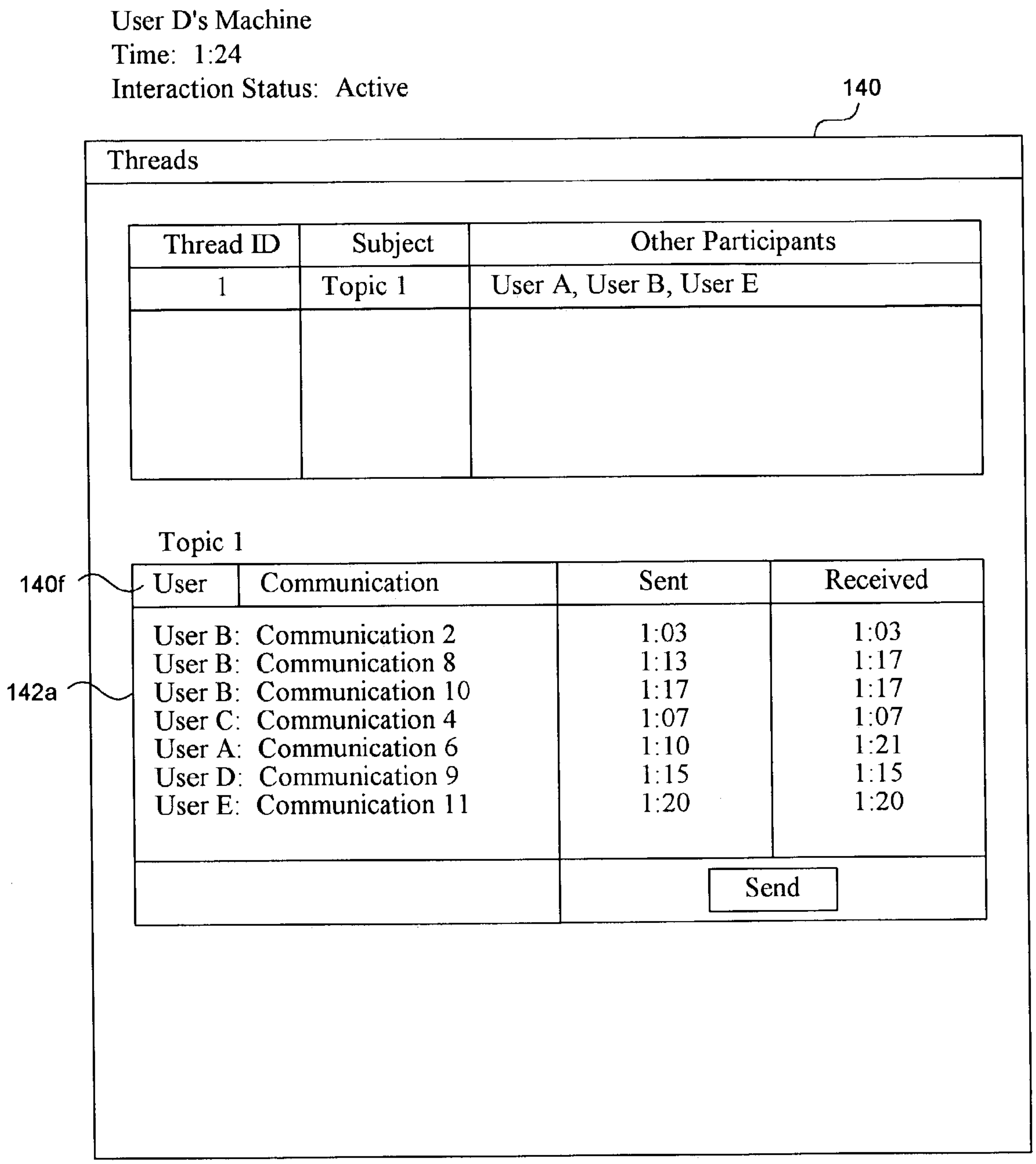

*Fig. 1Y*

USING MULTIPLE SIMULTANEOUS THREADS OF COMMUNICATION

CROSS REFERENCE TO RELATED APPLICATIONS

This application claims the benefit of provisional U.S. Patent Application No. 60/337,945, filed Nov. 9, 2001 and entitled "Network Text Messaging Organized By Threads," which is hereby incorporated by reference in its entirety.

TECHNICAL FIELD

The following disclosure relates generally to computer-assisted communication between users, and more particularly to assisting users in participating in multiple simultaneous threads of communication.

BACKGROUND

Several types of messaging systems exist to allow computer users to participate in text-based communication, including email, Internet Relay Chat ("IRC" or "chat"), instant messaging ("IM"), and bulletin boards. While each of these existing messaging systems is useful in limited contexts and for specific uses, all have problems if an attempt is made to use them as a general-purpose communication mechanism, such as between various user-specified groups of multiple users for conversations that persist over time and regardless of the connectivity status of the computers of the users.

For example, email is useful for a single message that is sent to many other users, and can support with at least limited effectiveness a short interactive conversation between two users. However, each email message is a distinct document, and any response messages are similarly distinct documents. Thus, to view an entire history of communications on a subject, many messages must typically be opened, and the sequence of messages is often difficult to reconstruct. While an email response can include the contents of the previous email, such as when that relationship is explicitly specified by a user (e.g., by using a "Reply" feature), the previous contents are typically displayed in a different manner than those of the response (e.g., indented and with each line prefaced with an indicator such as ">"). Such mechanisms for including prior message contents quickly devolve as multiple responses back and forth each include contents of previous messages, with increasing levels of indentation and line indicators making the contents increasingly unreadable. In addition, email is designed such that the most recent contents are listed first, causing a user to read from the present backwards into the past. Moreover, when more than two users are involved, there is not typically a mechanism to include multiple responses from different users together so that they can viewed in a single window, and each user may receive different messages (since each user sending a message controls the recipients).

The email situation is further complicated when multiple conversations on different topics occur. It is not uncommon for a user's email Inbox to have hundreds or even thousands of messages, with interactions on any one topic sprinkled throughout the messages. This makes finding any one part of a conversation difficult, and makes piecing together the whole conversation very difficult and time consuming. While some mail programs can be used to sort messages by subject or sender, problems still exist, particularly when dealing with large numbers of messages. For example, it is difficult to remember subject headings or email names, and it is time consuming to run sorting algorithms and to search through the sorted material. In addition, messages from a selected user may be part of many distinct conversations, while the use of subjects for sorting requires that each user manually maintains the appropriate subject (e.g., by using the Reply feature and by not altering the default subject). Moreover, even if a group of possibly relevant messages can be identified, the user must then must look at each one of them to locate what is needed, which is difficult and time consuming.

Chat and IM solve some problems introduced by email. For example, the contents of multiple messages may be simultaneously displayed in a manner that is easy to read, thus simplifying the process of viewing a history of a conversation. Unfortunately, the use of chat and IM maintains other problems present with email, and introduces a variety of additional problems. For example, an IM user can typically have only a single on-going conversation with one other person, which greatly limits its usefulness as a general-purpose messaging system. More generally, while email messages can be sent and viewed regardless of the current connectivity status of the current intended recipient or previous sender, a message cannot typically be sent with chat and IM unless both the sender and the recipient are currently connected and participating in the conversation. While this is problematic for any computing device, it causes particular problems when using a device with intermittent connectivity (e.g., portable computing devices, such as cellular telephones, PDAs, WI-FI enabled laptops, etc.).

In addition, chat and IM messages are not typically saved in a persistent memory under control of the user, and previous messages are not typically available to a user when they return after having previously shut down their computing device or after having left the chat or IM messaging service. Thus, when a user rejoins a chat or starts a new IM session, the user has to start over without a context and having missed any intervening messages. Although some chat and IM solutions may provide a "history" or "archiving" functionality that permits the storage of text a user sent and received during all conversations of a session, the functionality is typically difficult to use and provides limited benefits at best. For example, all of the stored text is provided together, giving no differentiation between or context of different discussions with other users. Thus, significant manual effort would typically be required to reconstruct a history of a conversation using such information. In addition, even if a user is able to access a stored archive of a chat, the user cannot participate in the chat while not connected and cannot typically pick up in a past discussion if they later rejoin the chat.

Bulletin boards create yet other problems, and are not typically suitable for arbitrary discussions between user-specified groups of users. Like email, bulletin board messages are typically treated as independent documents, and thus a conversation among participants is difficult to view. A user typically must select and read each message independently of the others, which is both time consuming and causes difficulties in maintaining a context from previous messages. If contents of previous messages are included in a bulletin board message, the same problems arise as are prevalent in email conversations. Furthermore, bulletin boards do not typically provide any means to organize or access data beyond what is presented on the board, such as by sorting or organizing data into folders.

Accordingly, it would beneficial to have a type of messaging that is useful for general-purpose communications by users of various types of client computing devices and that supports a variety of useful features, such as to allow multiple simultaneous conversations with distinct user-specified groups of multiple users that are easily created and used, to maintain communications in a persistent and virtual manner such that users can send communications regardless of their own connectivity status or that of the intended recipients and can receive communications that occurred while the users were not connected, to allow the communications for each conversation to be displayed distinctly and in such a manner that the contents of current and previous communications are easily viewed (e.g., displayed together in a uniform manner and in a user-specified order), to allow the organization and storage of communications in a user-specified manner, and/or to allow the sending and receiving of communications that include various types of information.

DETAILED DESCRIPTION

A software facility is described below that provides a thread messaging system for communications between users of computing devices or systems (referred to as "thread client computing devices/systems", or "thread clients"). In some embodiments, a copy of the thread messaging system executes on each thread client, while in other embodiments one or more thread server computing systems (or "thread servers") may execute the thread messaging system to facilitate the transfer of communications between thread clients.

As described in greater detail below, the thread messaging system combines selected functionality from various prior art messaging systems and adds additional unique functionality to provide a communication messaging system that is designed for general-purpose communications by users of various types of client computing devices and in various environments. The thread messaging system provides significant benefits over existing prior art messaging systems, and in some embodiments supports each user having multiple simultaneous threads of conversation with distinct user-specified groups of multiple other users, maintains communications in a persistent and virtual manner such that a user can specify communications for threads regardless of their own connectivity status or that of the intended recipients and can receive thread communications from others that occurred while the user was not connected, allows the communications for each thread conversation to be displayed distinctly and simultaneously and in such a manner that the contents of current and previous communications are easily viewed (e.g., displayed together in a uniform manner and in a user-specified order), allows the organization and storage of communications in a user-specified manner, and allows the sending and receiving of communications that include various types of information.

Figure 1A:
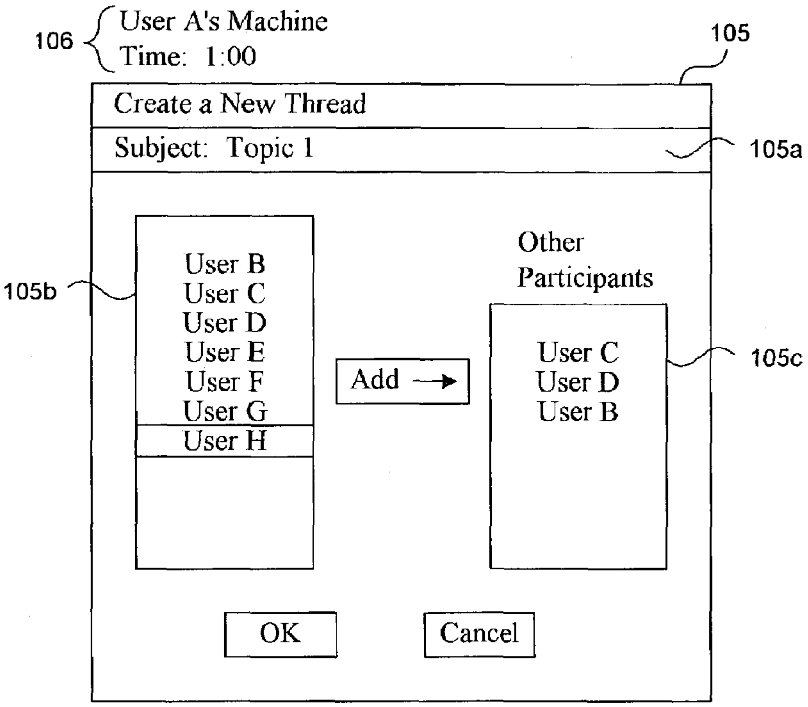
FIGS. 1A-1Y illustrate examples of communications using multiple simultaneous, persistent, virtual threads of communications.

An illustrative example of various thread communications is discussed below with respect to FIGS. 1A-1Y. In FIG. 1A, a User A of a thread client (not shown) is in the process of creating a new communication thread related to a specified topic. A thread creation window 105 is displayed, and a user-specified topic 105*a* for the communications of that thread is shown in the window. User A is specifying other participants 105*c* for the thread, such as by selecting from a list 105*b* of all available users or instead of some subset of those users (e.g., only those users currently online, a predefined list of friends or favorites, etc.). In the illustrated embodiment, the entry for User H in list 105*b* is displayed in a distinct manner from the other entries (e.g., dimmed) to indicate that user H is not currently available to be added to the thread (e.g., based on user preferences of User H, on User H being currently unavailable, etc.), although in other embodiments only available users may be displayed. Status information 106 is also shown for the benefit of the reader, but in the illustrated embodiment is not displayed to User A. The illustrated status information indicates a current time of 1:00 pm and the user to whom the displayed window is currently being shown.

After User A has concluded specifying the thread participants, the user can select the "OK" button to initiate the thread creation process. In the illustrated embodiment, the thread is then created, with the specified participants and User A forming a group of users associated with the new thread, although in the illustrated embodiment the participants can later opt out of the thread if they so choose. In other embodiments, however, some or all of the specified thread participants may first be notified of the thread creation and/or queried as to whether they agree to membership in the group of users for the thread before the thread creation is completed. Alternatively, in some embodiments the thread participants may not be notified and/or queried about the creation of a new thread if they had previously indicated a willingness to participate in such threads, whether explicitly or implicitly (e.g., by previously participating in similar or related threads). Note that in the illustrated embodiment User A is assumed to be part of the thread that he/she is creating, but in other embodiments at least some users (e.g., administrators of the thread messaging system) could define thread membership groups that do not include themselves.

Figure 1B:
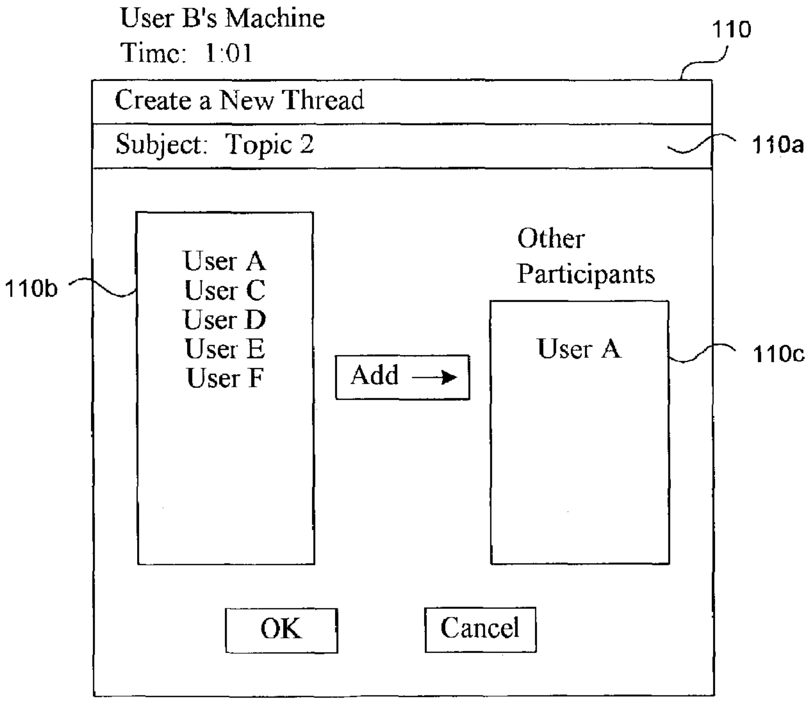

In a similar manner to FIG. 1A, FIG. 1B illustrates a thread creation process being performed by User B shortly after the creation of the first thread. A thread creation window 110 is displayed, and a distinct topic 110*a* that was specified by User B for the new thread is shown. User B has specified only one other user 110*c* to participate in this thread with User B, that being User A. In the illustrated embodiment, the list of available users 110*b* from which User B can select is different than those available to User A, such as based on different user preferences, different defined groups of friends, different accessible users to the respective thread clients, etc.

Figure 1C:
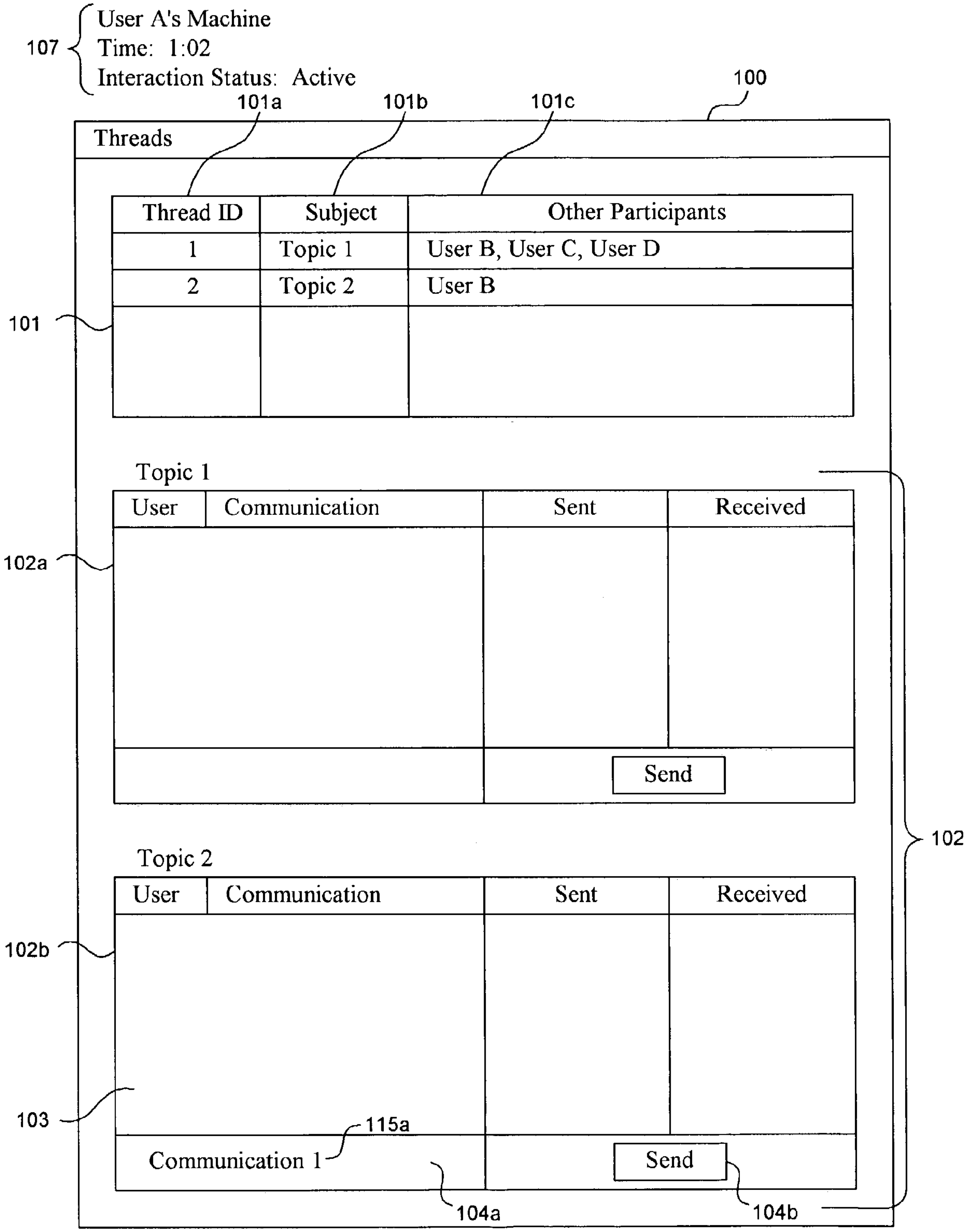

FIG. 1C illustrates a thread display window 100 that is displayed to User A after the creation of the two threads.

While not displayed to User A, a variety of status information 107 is also illustrated in FIG. 1C, including a current time 1:02 and a current thread communication interaction status. In the illustrated embodiment, the thread communication interaction status indicates whether User A is currently participating in active interaction with other users, such as when User A's thread client is connected to other thread clients (e.g., via a network connection) and User A has not selected to temporarily suspend or exit from active thread communications. In other embodiments, thread communication interaction status may be able to be specified on a per-thread basis, or instead there may not be a mechanism by which a user can manually select to enter a passive interaction status that suspends active interactions (other than by explicitly modifying the connection status of the thread client to make it unavailable to other computing devices).

As discussed in greater detail below, in some embodiments the thread messaging system supports virtual interactive thread communications that render transparent to a user whether the user's thread client is currently connected to other thread clients, thus allowing the user to participate in thread communications (e.g., by responding to a prior thread communication) when the thread client is not currently connected but without knowledge that those thread communications have not yet been immediately transmitted to the other members of the thread.

The thread display window in the illustrated embodiment includes various thread summary information 101 about each of the threads for which User A is currently a member, which are currently the two threads created in FIGS. 1A and 1B. The illustrated thread summary information includes a thread identifier ("ID") 101*a* (e.g., a unique ID), a topic (or "subject") 101*b*, and a list of other participants 101*c* for each of the threads. A variety of other types of thread-related information could be shown in other embodiments, such as a summary or other indication of the total or new thread communications that have occurred since a specified time (e.g., the thread creation, the user's last communication on the thread, since the user previously viewed the thread display window, etc.), information about the last activity that occurred on the thread (e.g., a time of last activity), information about various properties of the thread (e.g., thread termination criteria such as an end time or a limit on a number of thread communications, information about the thread creator, information about supported functionality for the thread such as types of communications that are allowed, information about types of thread manipulations allowed such as criteria for adding new members, etc.), information about the current status of other members of threads (e.g., whether "online" or otherwise currently connected to the thread messaging system), etc.

In the illustrated embodiment, the thread display window also includes a thread communication area 102 with a distinct thread communication display for each of the threads in which User A is currently a member. Each thread communication display includes an area 103 in which contents of the communications for that thread can be displayed together simultaneously in a uniform manner, although no thread communications yet exist for either of the threads. In the illustrated embodiment, the display of each thread communication includes an indication of the communication sender, of the communication contents, of the send time when the sending user specified the communication, and of the receipt time by the current user's thread client. In other embodiments, a variety of other types of information could similarly be displayed, such as indications of additional communication-related information specified by the sending user (e.g., an urgency, a priority, an indication that a response is requested, etc.), indications of relationships between different communications (e.g., that one communication is a response to another communication), an indication of the relevance of the communication's contents to the topic for the thread, etc. While each communication for a thread is intended to have contents that relate to the topic for that thread, in the illustrated embodiment that association is not enforced, although in other embodiments verification and/or enforcement of such a content-to-topic association could be performed (e.g., manually, such as by a moderator or administrator for the thread, or automatically, such as by automated content processing).

Each thread communication display in the illustrated embodiment also includes an area 104*a* in which User A can specify a communication to be sent for that thread, as well as a "Send" button 104*b* with which User A can select to send the communication in area 104A when ready. While User A can specify a text communication via an input device such as a keyboard, various other types of information can also be specified for communications in at least some embodiments (e.g., sounds, images, video, files, etc.) and various types of corresponding controls (e.g., to locate an existing file) could similarly be provided. In addition, in other embodiments portions of a communication may be sent as soon as they are specified by a user (e.g., by using "Type-And-See" functionality), and if so a "Send" button or other similar control may not be provided.

In the illustrated embodiment, User A is currently specifying a Communication 1 in the area 104*a* for thread communication display 102*b*, which corresponds to the thread having an ID of 2 (referred to as "thread 2"). While not illustrated here, the communication includes various contents which are displayed in the area 104*a* and will be displayed in the appropriate thread communication display after the communication is sent. While the selection of the "Send" button for Communication 1 is not illustrated as part of this example, an assumption will be made for this and other user-specified communications of this illustrative example that the display in which the communication specification is shown corresponds to a time just before the user selects the "Send" button for the communication being specified.

While the illustrated thread display window includes various specific types of thread-related information in a specific manner, thread-related information can be presented in other manners in other embodiments. For example, the thread communication displays 102*a* and 102*b* could in other embodiments each be a distinct window that are displayed simultaneously, and the thread summary section 101 could be yet another window. In addition, some or all of the status information 107 may in some embodiments be available to the user, whether from the thread messaging system or instead independently from the thread client (e.g., an indication of a current time or of a current network connection status, such as in a task bar on the thread client display).

Figure 2A:
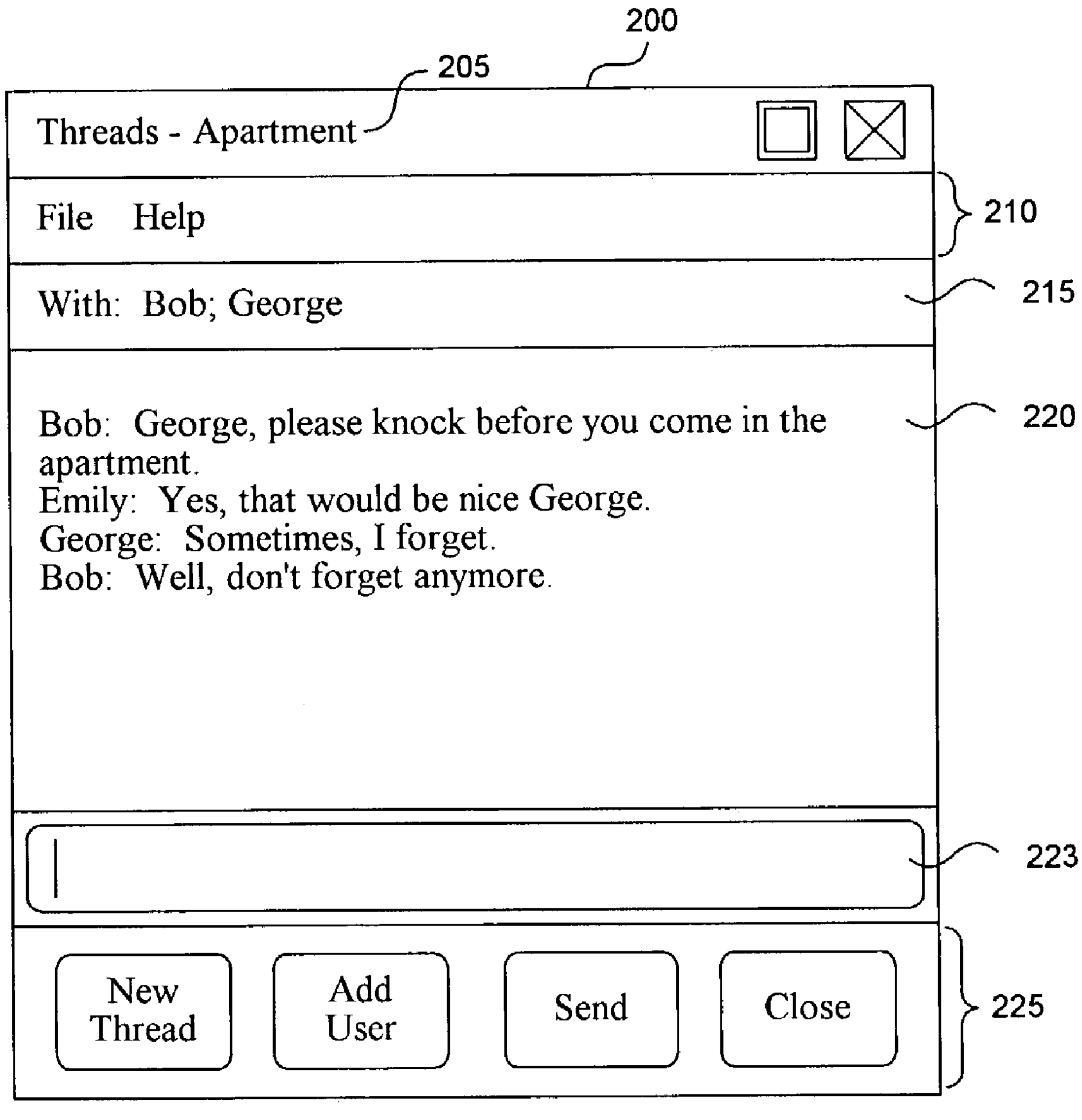
FIGS. 2A and 2B illustrate alternative examples of creating a thread and participating in a threaded conversation.
Figure 2B:
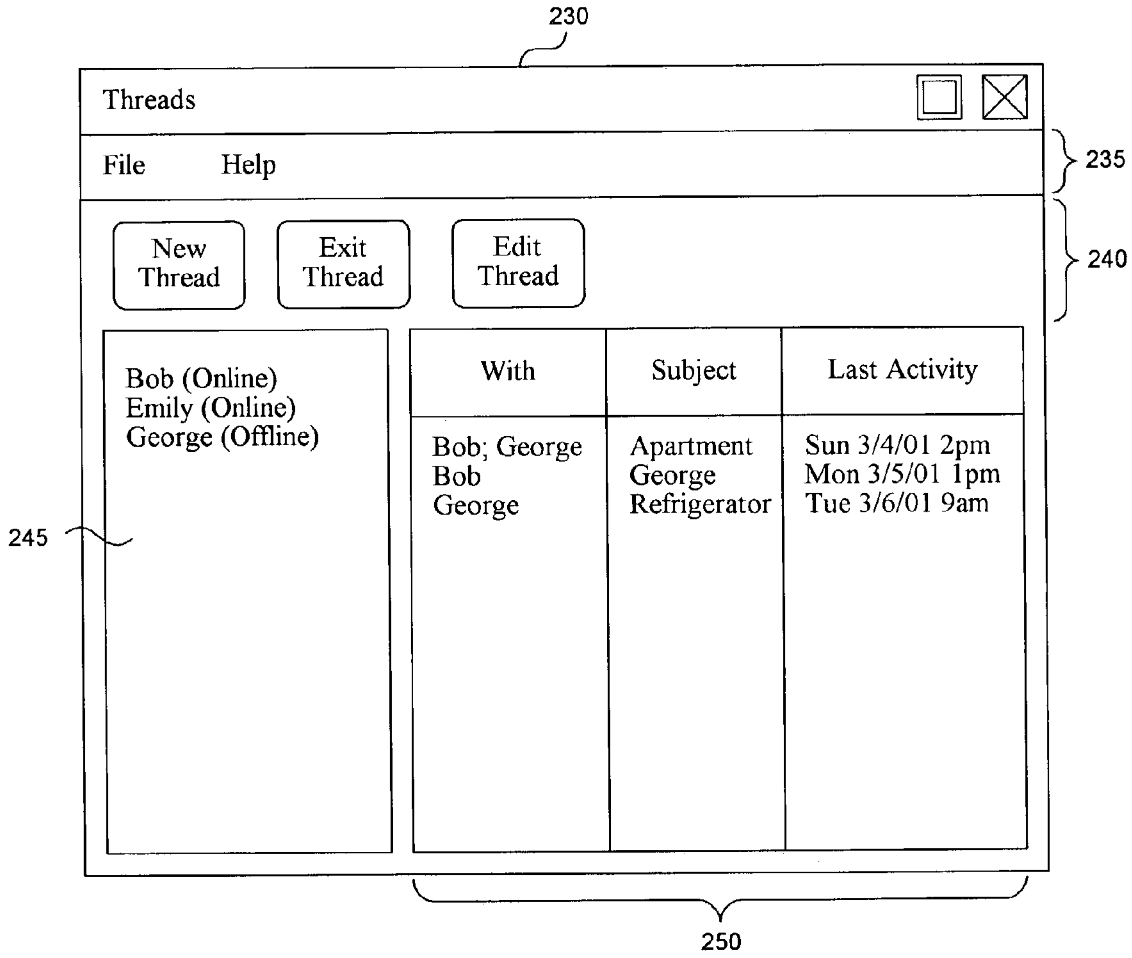

As examples of alternative displays for thread communication information and thread summary information, FIGS. 2A and 2B illustrate an embodiment in which thread communication displays and the thread summary information are each presented in separate windows. Thus, with respect to FIG. 2A, a separate thread communication display window 200 for a user "Emily" shows communications for a thread whose topic is shown to be "Apartment" 205 (e.g., a thread whose members are the co-occupants of a shared apartment).

The window includes various menu controls 210 to provide various thread-related and/or windows-related functionality, and in the illustrated embodiment also includes an area 215 that lists other members of the thread. A communication contents area 220 of the window 200 displays four text communications from various members of the thread, and the window 200 also includes a communication input area 223 and various control buttons 225 to provide various thread-related functionality, as described in greater detail elsewhere. As with the thread display window illustrated in FIG. 1C, the current time and current interaction status are not displayed in this embodiment. The information shown in the contents area 220, however, differs from that of FIG. 1C in that communication send and receive times are not currently illustrated.

As another alternative, in some embodiments thread communication information and/or thread summary information can be displayed in other manners, such as within a non-thread application program. For example, in some embodiments the contents of the current communications of a thread may be included as part of a generated Web page that is displayed in a Web browser. Alternatively, the current thread communication contents could be included as part of a document that is displayed for other types of application programs, such as an email message in an email application program or as a text document in a word-processing program. While in some embodiments the document that includes the thread communication contents will be static such that the document contents do not automatically change after creation to reflect new communications for the thread, in other embodiments such automatic updating may occur if the application program in which the information is displayed supports such updating.

For example, some application programs and/or underlying operating systems support embedded or linked objects that can be automatically updated, and if so such a mechanism could be used for the thread communication contents. In other embodiments, an executable applet or other code could be included or referenced in a document such that execution of the code (e.g., automatically upon opening the document and/or upon explicit user selection) would cause then-current thread communication contents to be included in the document or otherwise presented. In yet other situations, an explicit link (e.g., a hyperlink) representing some or all thread communication contents (e.g., the new contents after initial creation, or instead all contents) may be included in a document to allow a user to view a current version of thread communication contents by selecting the link.

FIG. 2B illustrates a thread summary window 230 that includes various information about the threads in which user Emily is currently a member. The window 230 includes various menu controls 235 from which various thread-related and/or window-related functionality can be obtained, as well as various thread manipulation controls 240, such as to create a new thread, edit an existing thread, or exit an existing thread. The thread summary window also includes information 250 about each of Emily's current threads, such as the associated topic and other thread group members. A thread ID is not displayed in this embodiment (and may not be used by the thread messaging system), but an indication of the time of last activity for the thread is illustrated. The thread summary window 230 also includes information 245 to provide interaction-related status information about various users, such as the users that are members of a selected one of the threads or that are members of any of the current threads.

Figure 1D:
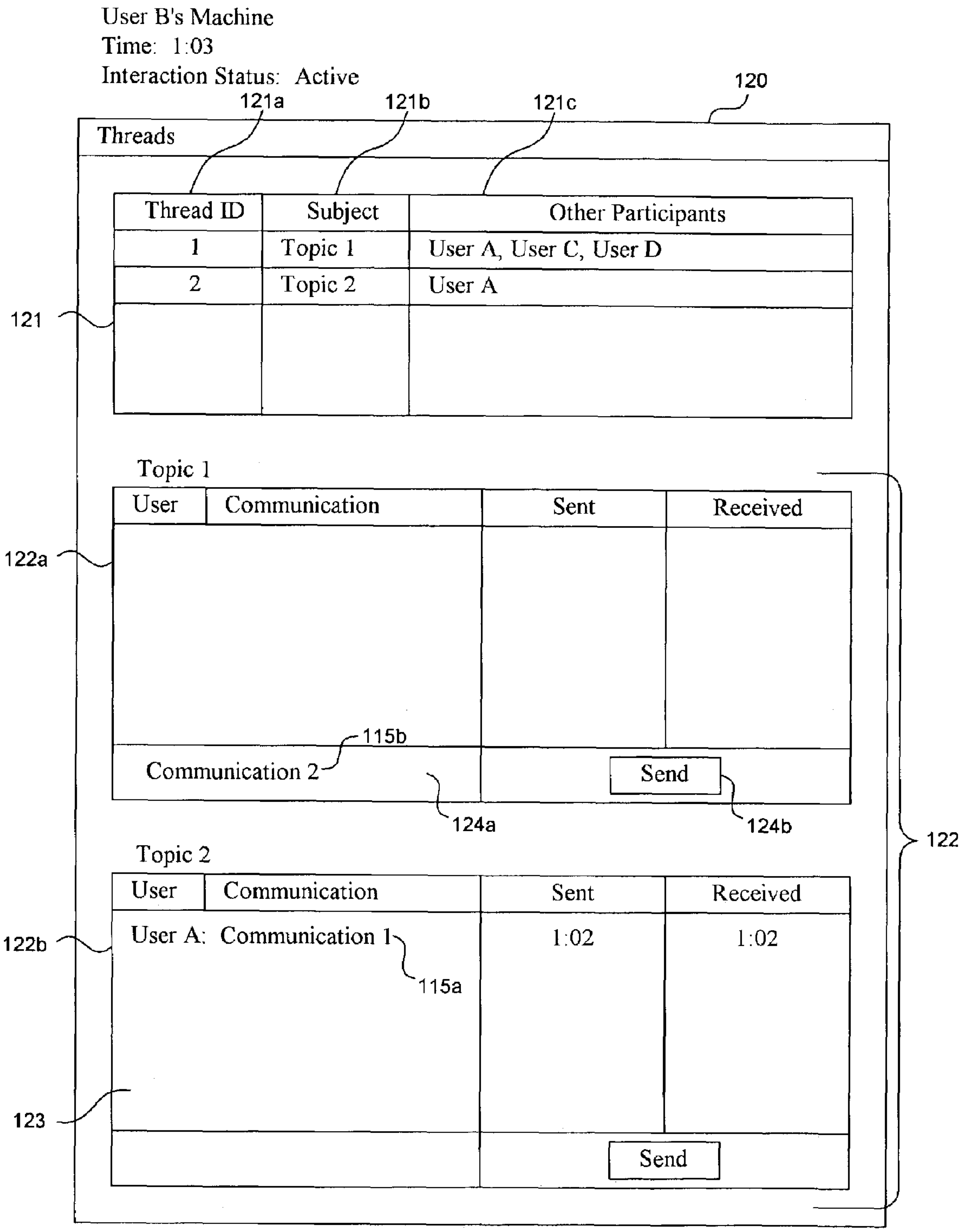

Returning now to the illustrative example of FIGS. 1A-1Y, FIG. 1D illustrates a thread display window 120 that is presented to User B at time 1:03. In a manner similar to that of FIG. 1C, the window 120 includes a thread summary area 121 and an area 122 in which distinct thread communication displays are provided for each thread in which User B is currently a member. As is shown, the contents area 123 of thread communication display 122*b* for thread 2 includes previously sent Communication 1 from User A. In addition, thread communication display 122*a* for the thread with an ID of 1 (referred to as "thread 1") similarly includes a thread communication specification area 124*a* and a corresponding "Send" button 124*b*. As is shown, User B is currently specifying Communication 2 for thread 1.

Figure 1E:
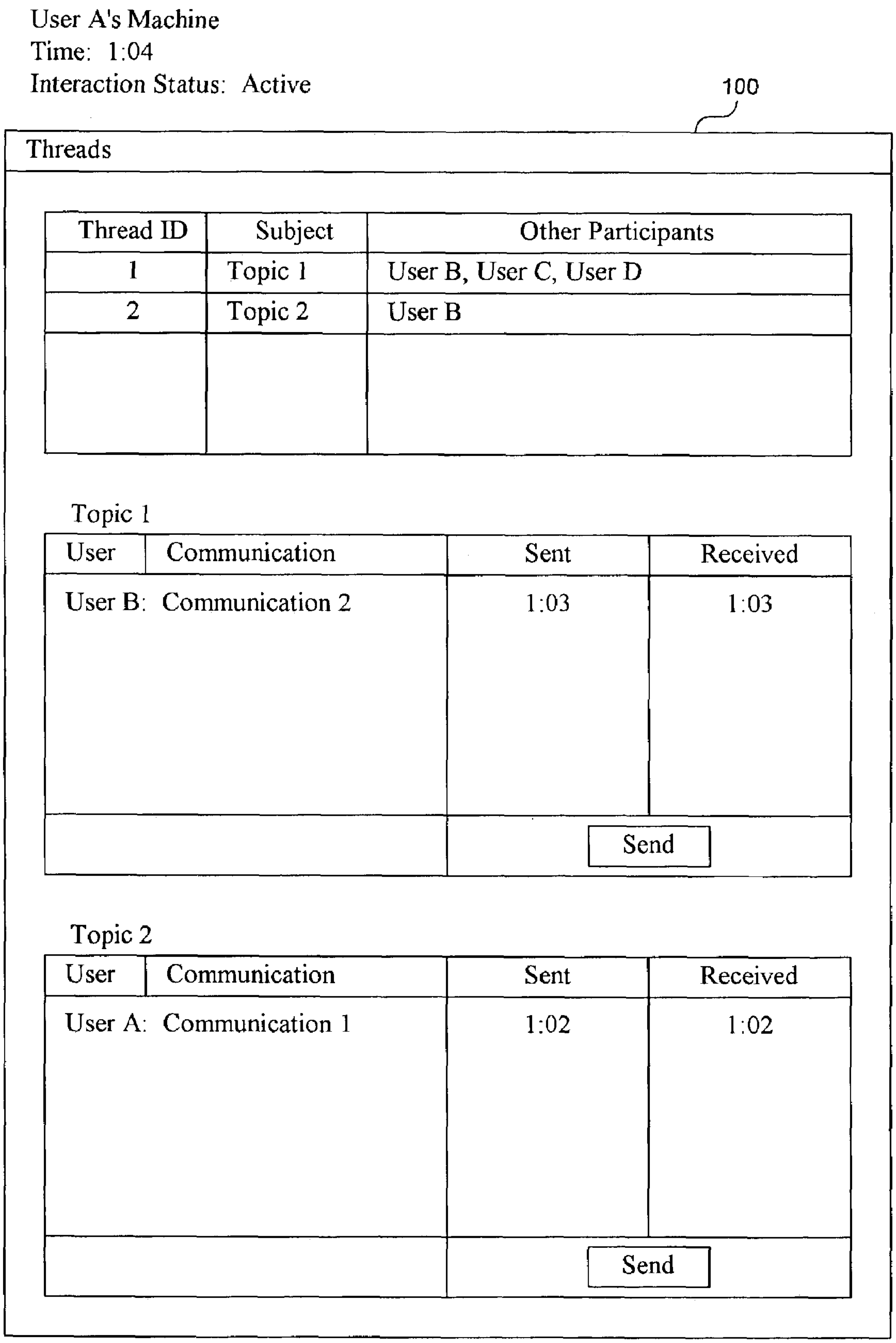
Figure 1F:
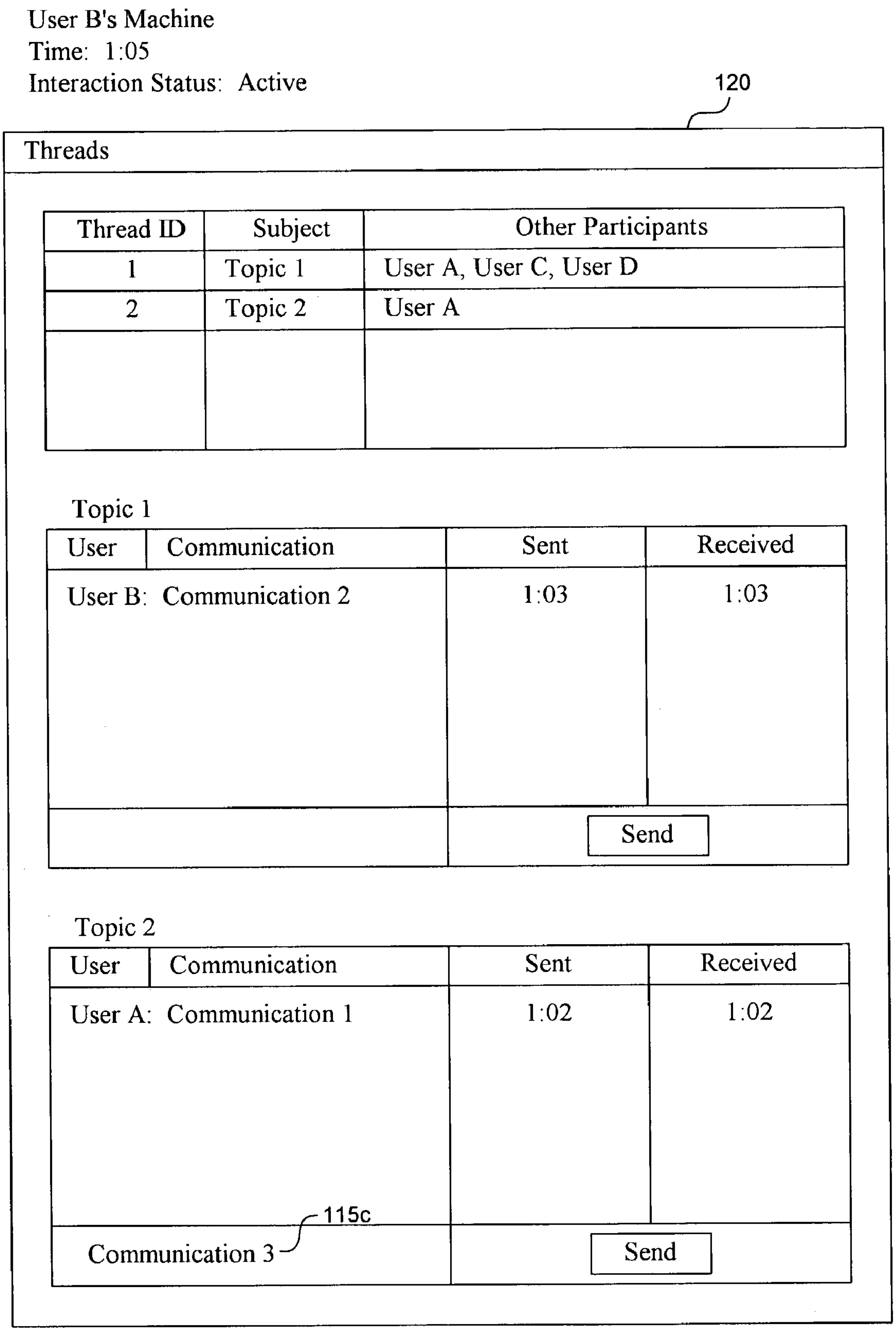

Turning now to FIG. 1E, the thread display window 100 for User A is illustrated at time 1:04, and each of the threads now displays a communication. FIG. 1F similarly illustrates thread display window 120 for User B at time 1:05, with the same two communications for the two threads shown (since Users A and B are currently members of the same threads). In addition, as is shown in FIG. 1F, User B is currently specifying Communication 3 for thread 2, which is a response to the existing Communication 1 from User A.

Thus, as indicated in FIGS. 1E and 1F, the communications for different threads are displayed separately. Such communications can be stored in various manners, however. In some embodiments the communications for each thread are also stored separately, such as in a distinct file for each thread or as multiple files in a distinct folder for each thread. Alternatively, the communications for multiple threads could instead be stored together (e.g., in a single database table) as long as the thread to which the communication belongs can be determined (e.g., by storing the corresponding thread ID along with the communication). In addition, in some embodiments users may be prevented from modifying stored communications for a thread, such as to ensure consistency of locally stored thread communications for the thread members. Moreover, while in the illustrated embodiment each thread client maintains a separate local storage of thread communications that are received or sent, in other embodiments other storage mechanisms could be used, as discussed in greater detail below.

The determination of what thread a received communication belongs to can also be made in various ways, such as with a corresponding thread ID included with the communication (e.g., in a header), by determining the appropriate thread based on the specified recipients for the communication (e.g., if the groups members were distinct were each of the current threads) and/or on a subject for the communication (e.g., that corresponds to a thread topic), etc.

Figure 1G:
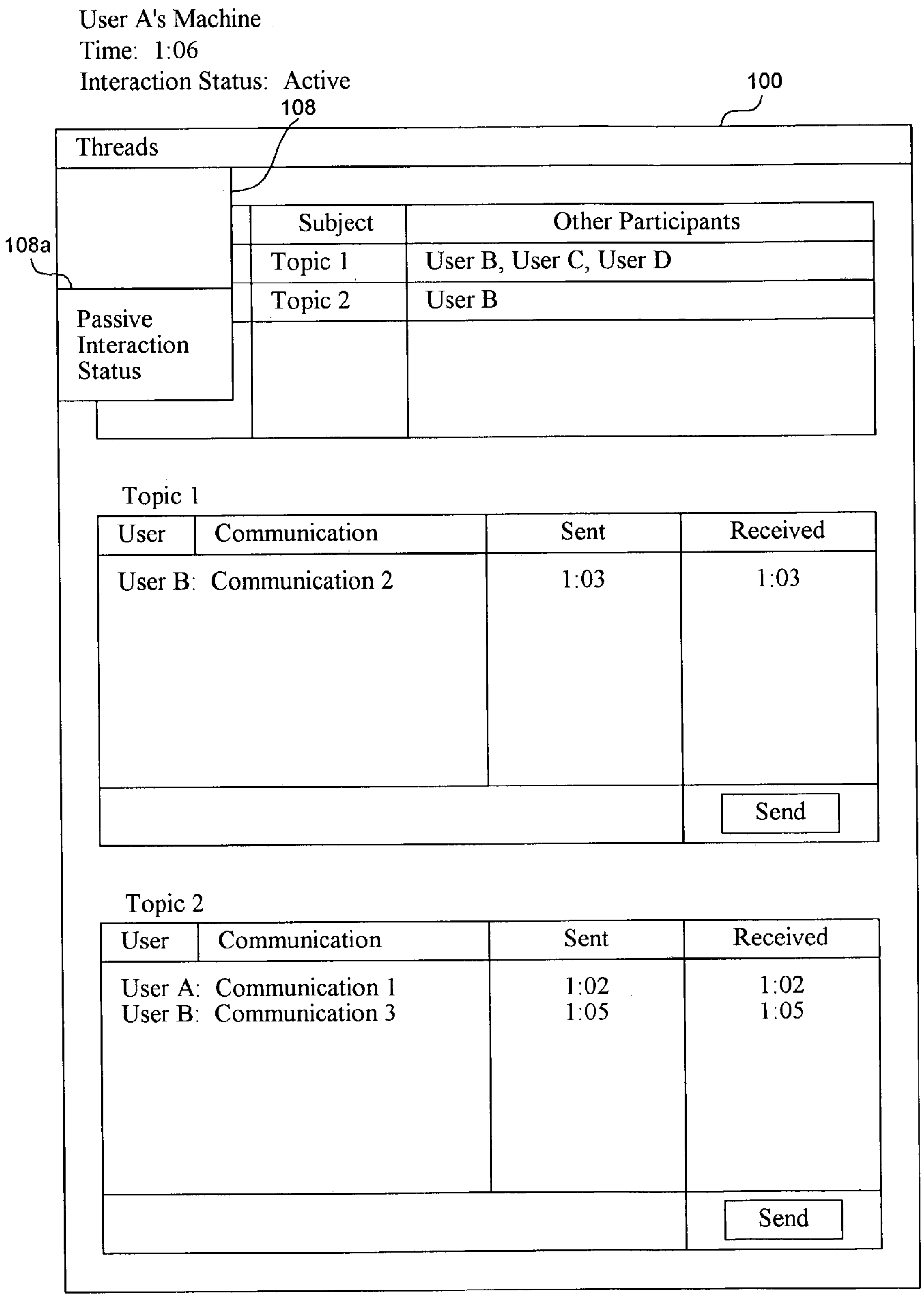

FIG. 1G illustrates the state of thread display window 100 for User A at time 1:06, with the thread communication display for thread 2 now including Communication 3 from User B in addition to the previous Communication 1 from User A. As is shown, the contents of Communications 1 and 3 are displayed in a uniform manner (e.g., without any indentations or indicators such as ">"), despite the fact that they are received at different times and from different users and that one communication is a response to the other. The multiple communications for a thread are also referred to as a "transcript" for the thread, and can be presented as if part of a single document.

In addition, while the thread communication interaction status is currently "active", User A is in the process of selecting element 108*a* from dropdown menu 108 in order to change the interaction status to "passive". The illustrated embodiment of the thread messaging system supports virtual thread communications, however, so that User A can continue to interact with the thread display window 100 after the selection is made in the same manner as during active thread communication interaction status, including specifying communications to be sent and having the thread communication displays updated to reflect those specified communications. However, specified communications will not be forwarded to other thread members while User A is in a passive interaction status, nor will the thread display be updated to reflect communications sent by other thread members or other changes to threads by those users. Thus, the current interaction status is transparent to User A when viewing displayed thread communications unless the current embodiment includes an explicit indication of interaction status. Moreover, even when a user has not explicitly selected a passive interaction status, such a status may arise due to a change in connection status for the thread client, and in some embodiments the transparency of communications is maintained by not notifying the user when such a loss of connection (and corresponding passive interaction status) occurs.

The illustrated embodiment of the thread messaging system also supports persistent thread communications, such that a thread and its communications will continue to persist for each of the thread group members despite some or all of the members having a passive interaction status, having currently closed the display of thread communications for the thread, having currently exited the thread messaging system, and/or having a thread client that is not currently connected to other computing devices. Thus, if User A enters a passive interaction status (and/or another thread member enters a passive interaction status), the existence of the thread will persist and User A can continue to interact with the threads in a virtual and persistent manner.

Figure 1H:
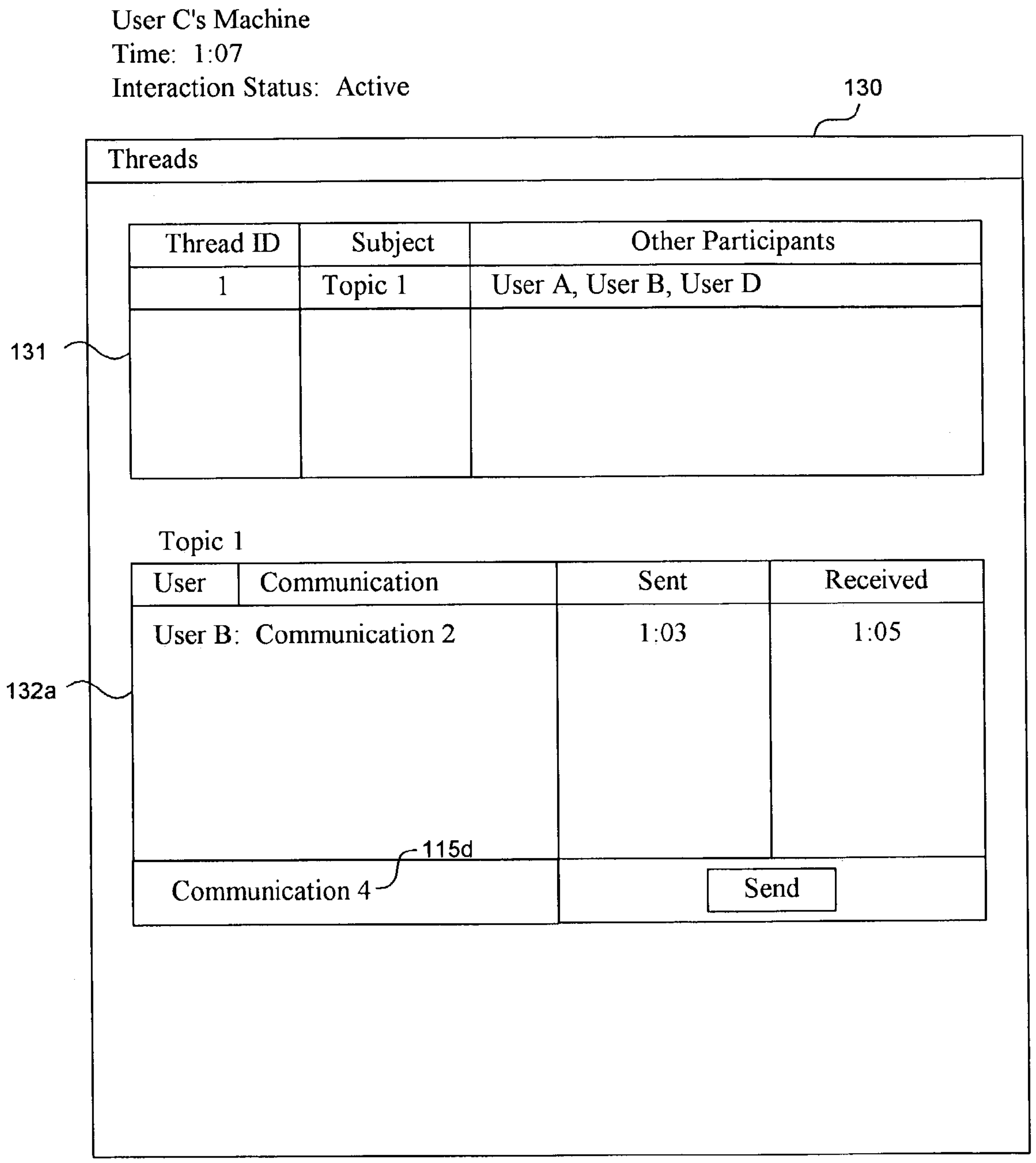

FIG. 1H illustrates a thread display window 130 for User C that is similar to thread display windows 100 and 120. However, as User C is currently a member of only one thread (i.e., thread 1), only a single thread communication display 132*a* is currently shown. User C's thread 1 display includes Communication 2 from User B, but in the illustrated embodiment the displayed receipt time for the communication is different than the time of receipt displayed for that communication for User A in FIG. 1G, such as to reflect a slow network connection available to User C. User C is currently specifying Communication 4 for Thread 1.

Figure 1J:
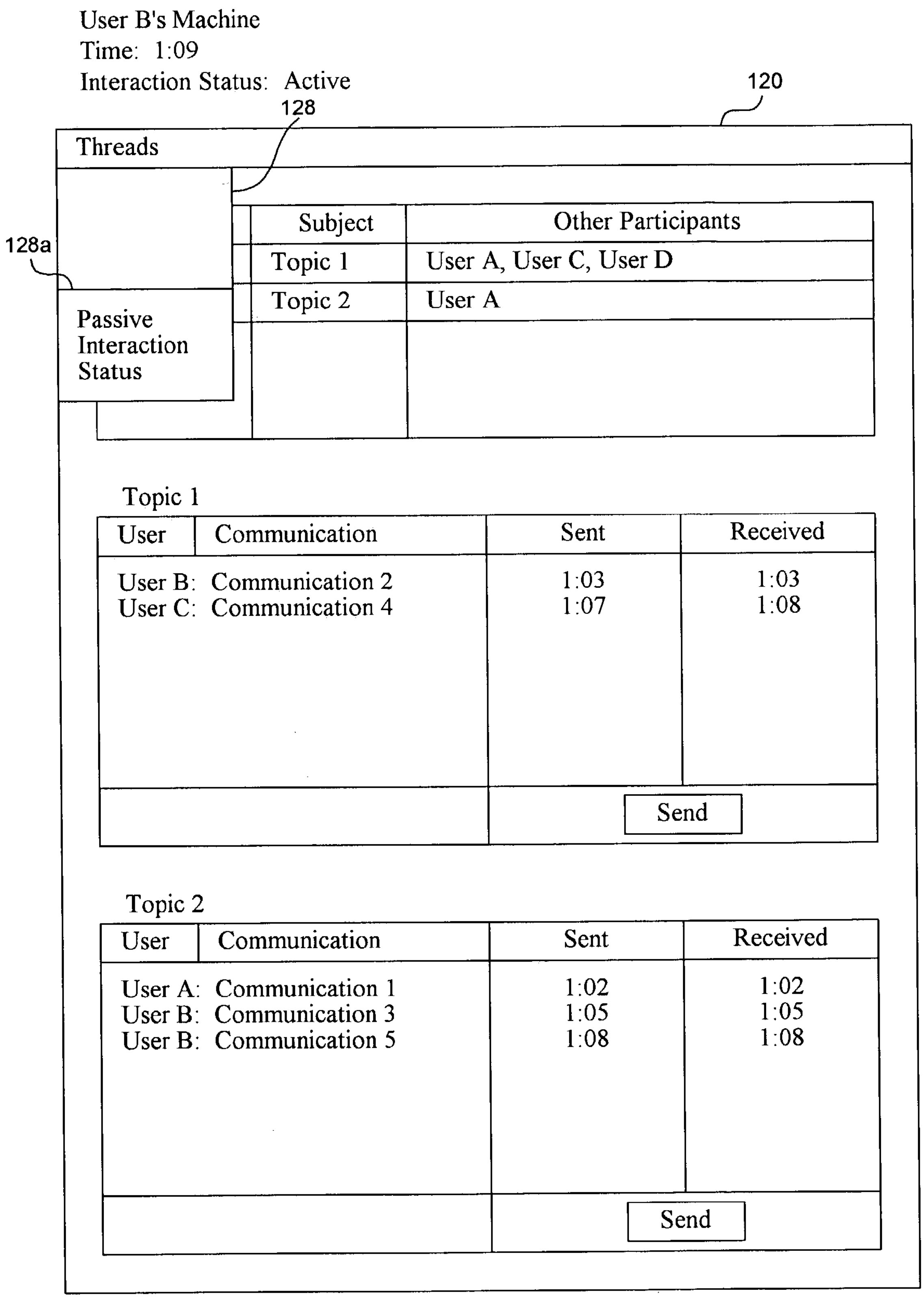

FIG. 1I illustrates thread display window 120 for User B at time 1:08, and thus now includes Communication 4 from User C in the thread communication display for thread 1. User B is currently specifying Communication 5 for Thread 2, and FIG. 1J illustrates an updated display of thread display window 120 at time 1:09 in which Communication 5 is now displayed for thread 2. In a similar manner to that of User A in FIG. 1G, User B is currently selecting an element 128*a* from a dropdown menu 128 in order to change to a passive interaction status.

Figure 1K:
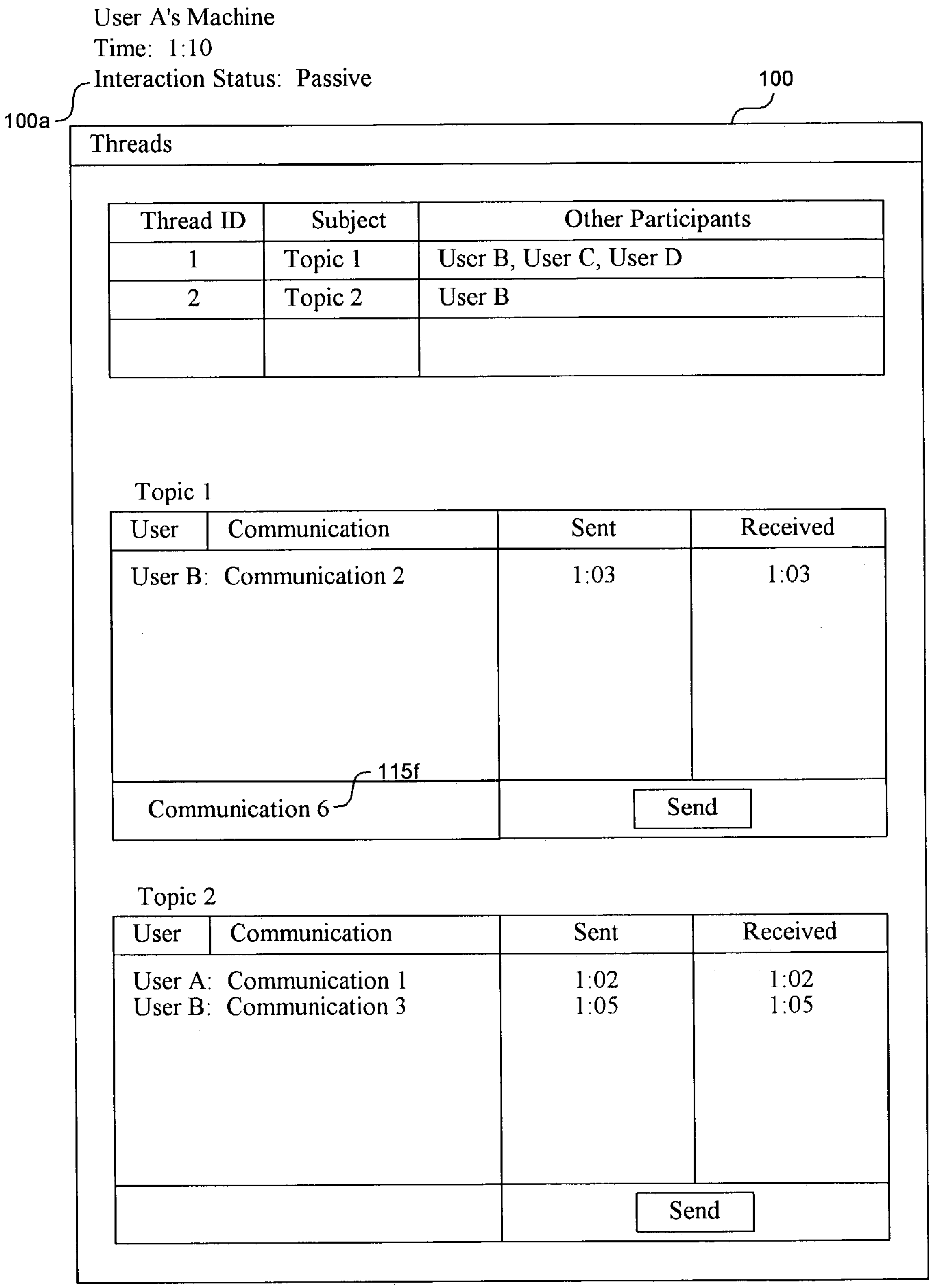
Figure 1L:
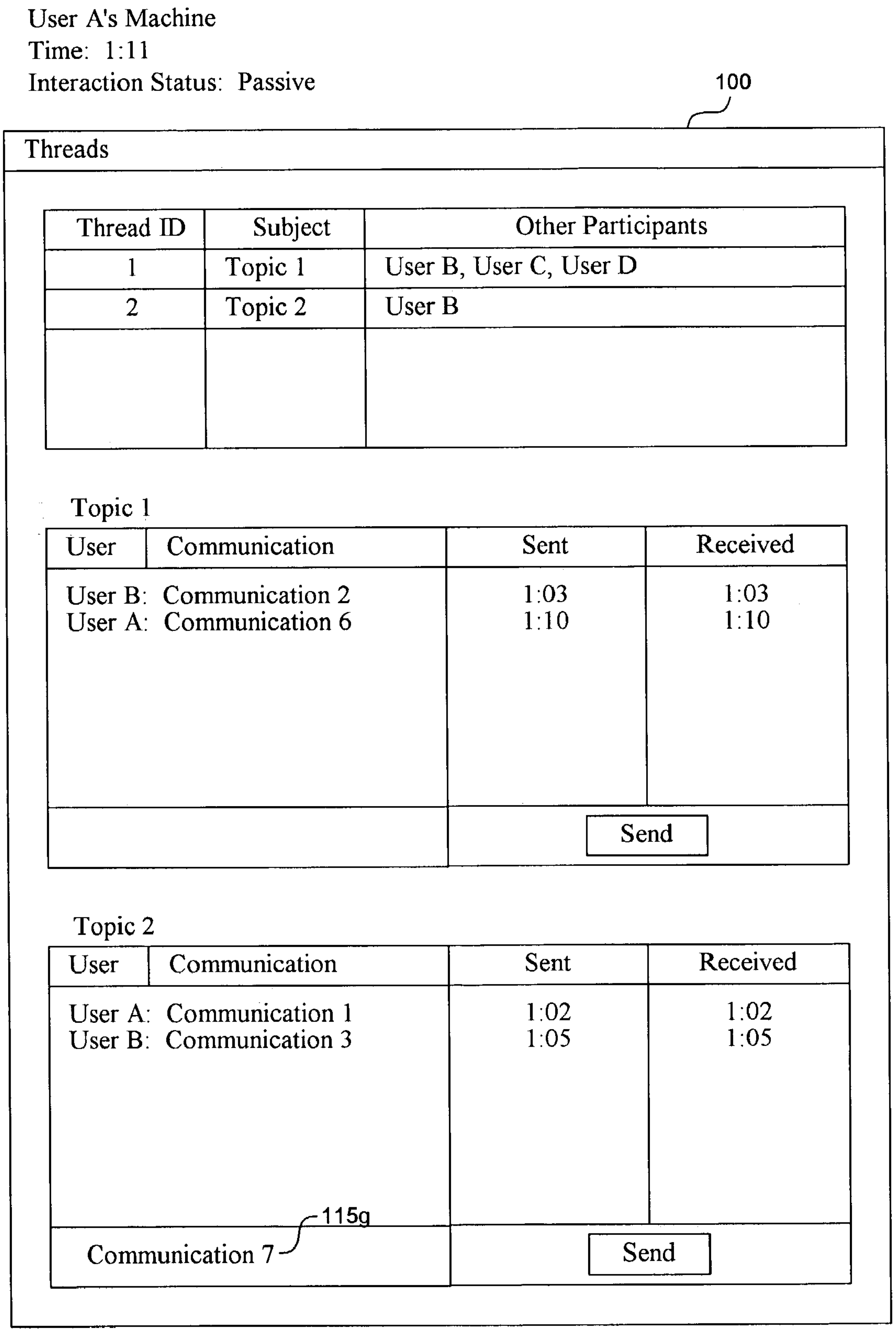

FIG. 1K illustrates thread display window 100 for User A at time 1:10. As is shown, the current interactive status 100*a* for User A is now passive. Thus, since User A has had a passive interaction status since time 1:06, the thread 1 display does not show Communication 4 from User C and the thread 2 display does not show Communication 5 from User B. User A is currently specifying Communication 6 for thread 1, and FIG. 1L illustrates an updated display of the thread display window 100 at time 1:11. Although the interaction status for user A is still passive, the thread communication display for thread 1 has been updated to include Communication 6 from User A in a virtual interactive manner. Thus, User A is not provided with any visible indication in the illustrated embodiment that Communication 6 is not currently displayed to the other members of thread 1, nor that any non-displayed communications from others are available for threads 1 and 2 (even if they have already been received by User A's thread client). User A is currently specifying Communication 7 for thread 2, and FIG. 1M shows an updated version of thread display window 100 at time 1:12 in which the thread 2 display includes Communication 7.

FIG. 1N illustrates thread display window 120 for User B at time 1:13, with the current interaction status still being passive. As User B has not specified any additional communications since the interaction status became passive at time 1:09, the thread communication displays are still the same as they were at that time. User B is currently specifying Communication 8 for Thread 1, and FIG. 1O includes an updated display for thread display window 120 in which the thread 1 display includes Communication 8.

Figure 1P:
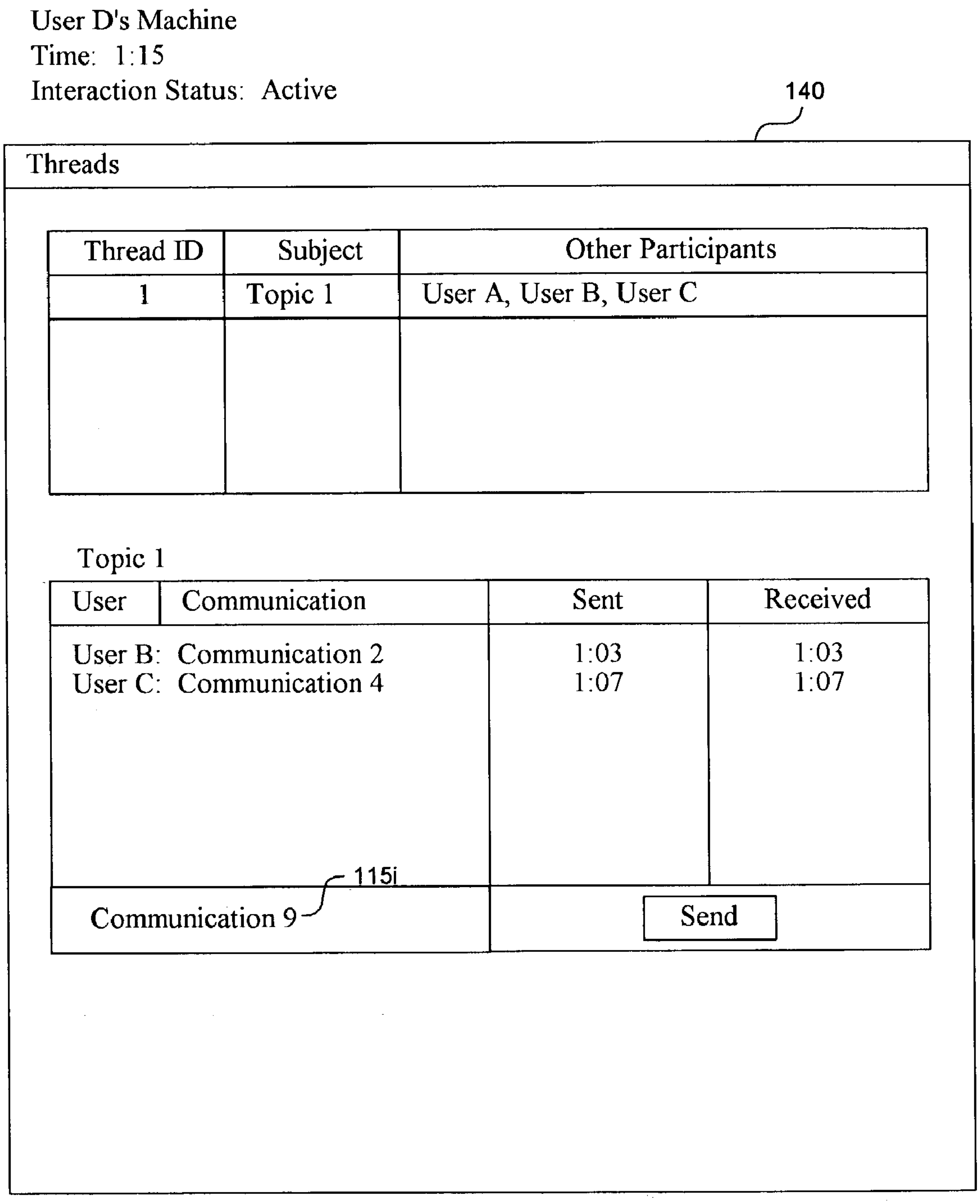

FIG. 1P illustrates a thread display window 140 for User D at time 1:15. In a manner similar to that for the thread display window of User C, thread display window 140 includes only a single thread communication display for thread 1, as User D does not currently belong to any other threads. The thread communication display includes Communications 2 and 4 from Users B and C respectively, but does not include Communications 6 or 8 from Users A and B respectively that were specified by those users while in a passive interaction status. User D is currently specifying Communication 9 for thread 1.

Figure 1Q:
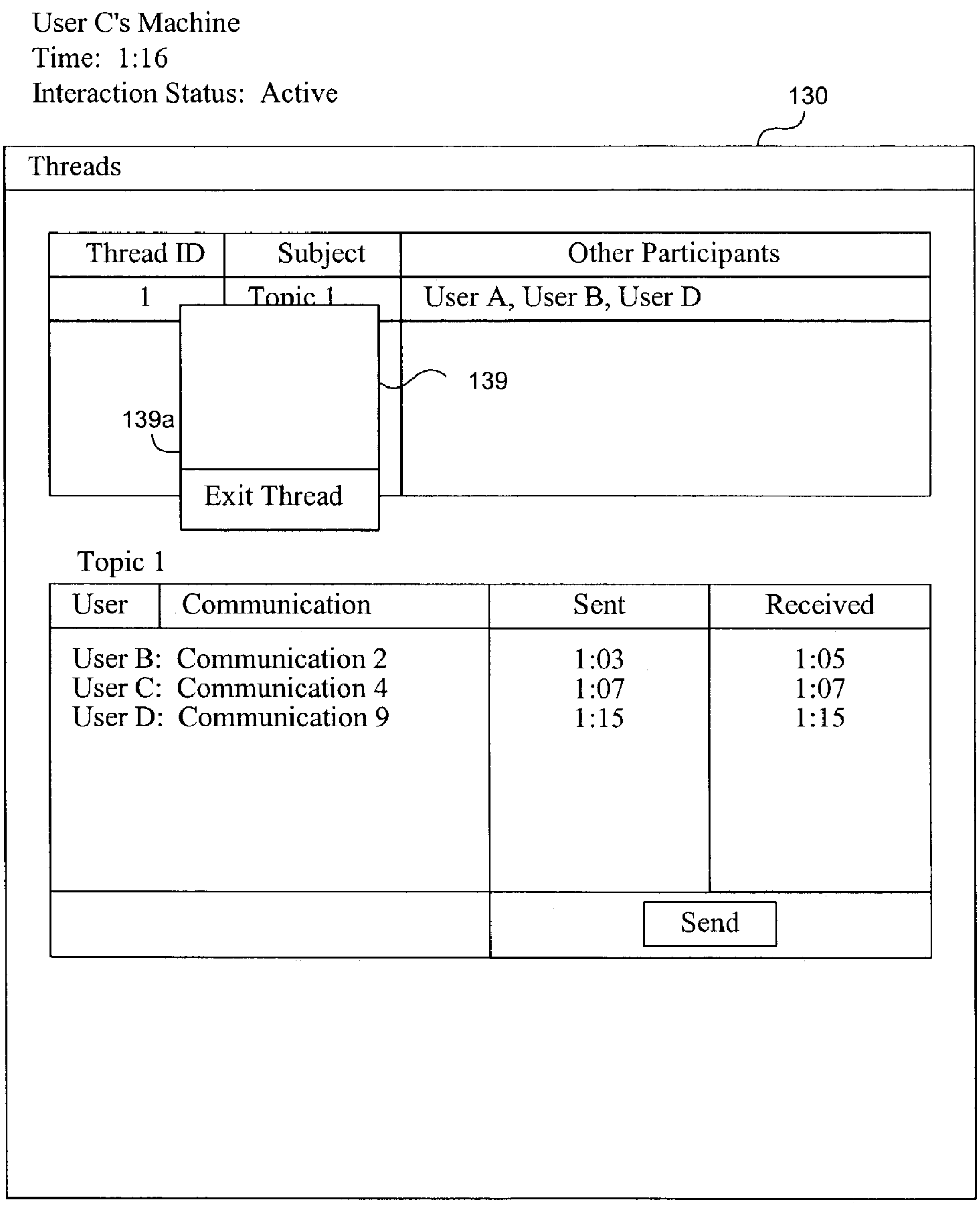

FIG. 1Q illustrates thread display window 130 for User C at time 1:16, with the thread 1 display including Communications 2, 4 and 9. User C is currently in the process of specifying that thread 1 should be exited, such as by selecting element 139*a* of pop-up menu 139. In other embodiments, users may not be allowed to exit threads, or instead the specification to exit a thread may be made in other manners. After exiting the thread in the illustrated embodiment, User C's thread display window will no longer show the thread 1 display and thread 1 communications will no longer be stored by User C's thread client. In addition, new communications for thread 1 that are received (if any) by User C's thread client will be deleted or otherwise ignored. However, in the illustrated embodiment, other thread members will continue to store and display thread communications that were previously received from User C, although in other embodiments such communications could instead be removed from display and/or storage for the other thread members.

FIG. 1R illustrates the thread display window 120 for User B at time 1:17, with the window displaying thread-related information after the thread communication interaction status 120*a* for User B has been returned to active (e.g., based on an explicit instruction (not shown) from User B). After the interaction status became active, the information for the various threads was automatically updated to reflect their current status, such as by sending out communications that were specified by User B during the time when the interaction status was passive and by receiving available thread communications that were sent by other users during that time (e.g., based on a query sent by User B's thread client to one or more other thread clients or one or more thread servers). The thread communication displays for User B have also been updated, with the thread 1 display now including Communication 9 from User D. In addition, in the illustrated embodiment the information 121*c* in the thread summary section about other thread members has been updated for thread 1 to reflect that User C is no longer a member of the thread. In other embodiments, however, other thread members may not be notified when a user exits a thread. User B is currently specifying Communication 10 for Thread 1.

Figure 1S:
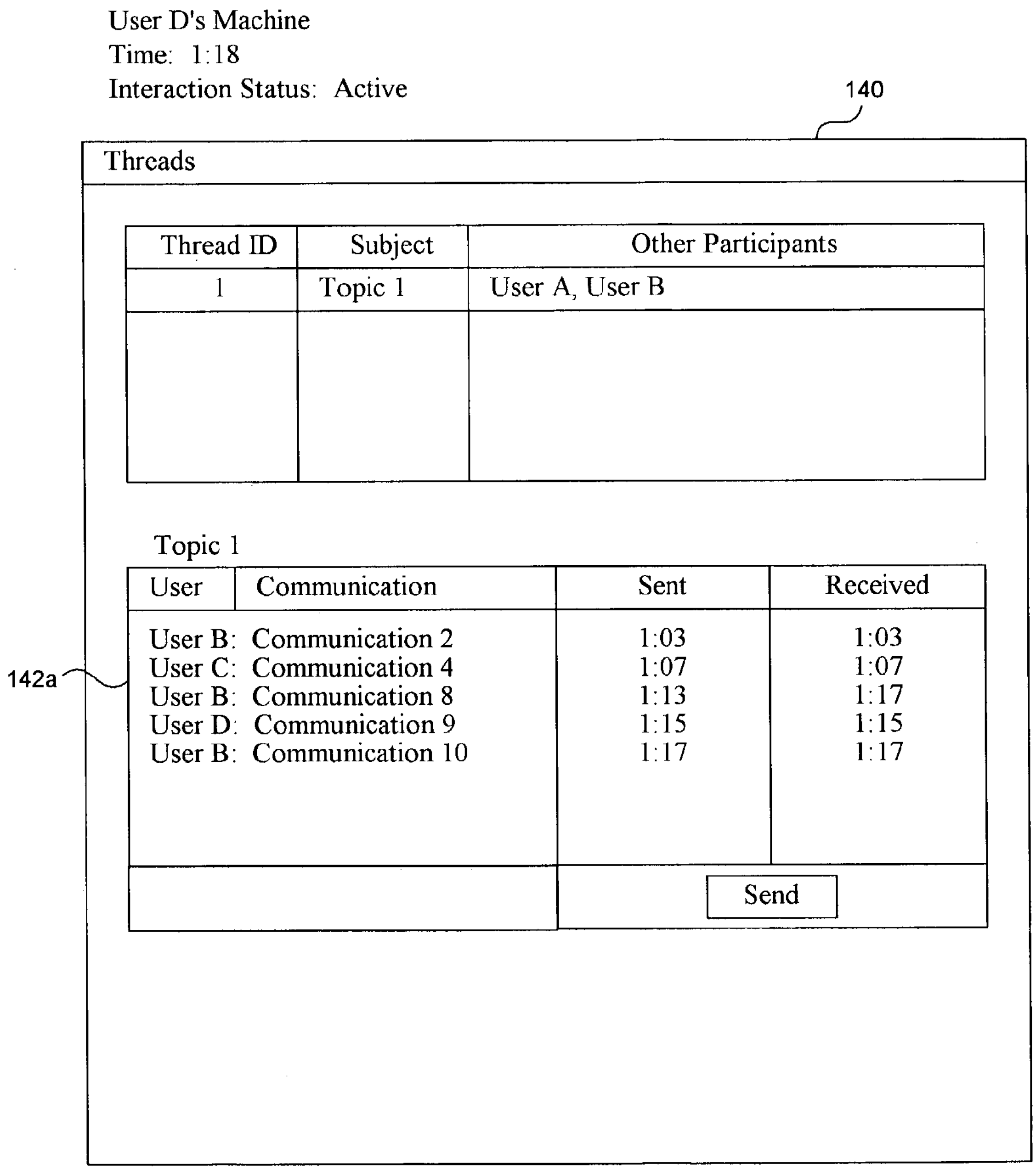

FIG. 1S illustrates thread display window 140 for User D at time 1:18. As with the thread display window for User B, the thread summary information for thread 1 has been updated to show that User C is no longer a member of the thread, and the thread 1 display has been updated to include both Communication 8 that was previously specified by User B while in a passive interaction status and Communication 10 that was just specified by User B. In the illustrated embodiment, although User B specified Communication 8 at time 1:13 (and thus the "sent" time for the communication shows that time), User D's receipt time for Communication 8 is 1:17 since that is the time at which the interaction status for User B became active and the communication actually was received by User D.

Figure 1T:
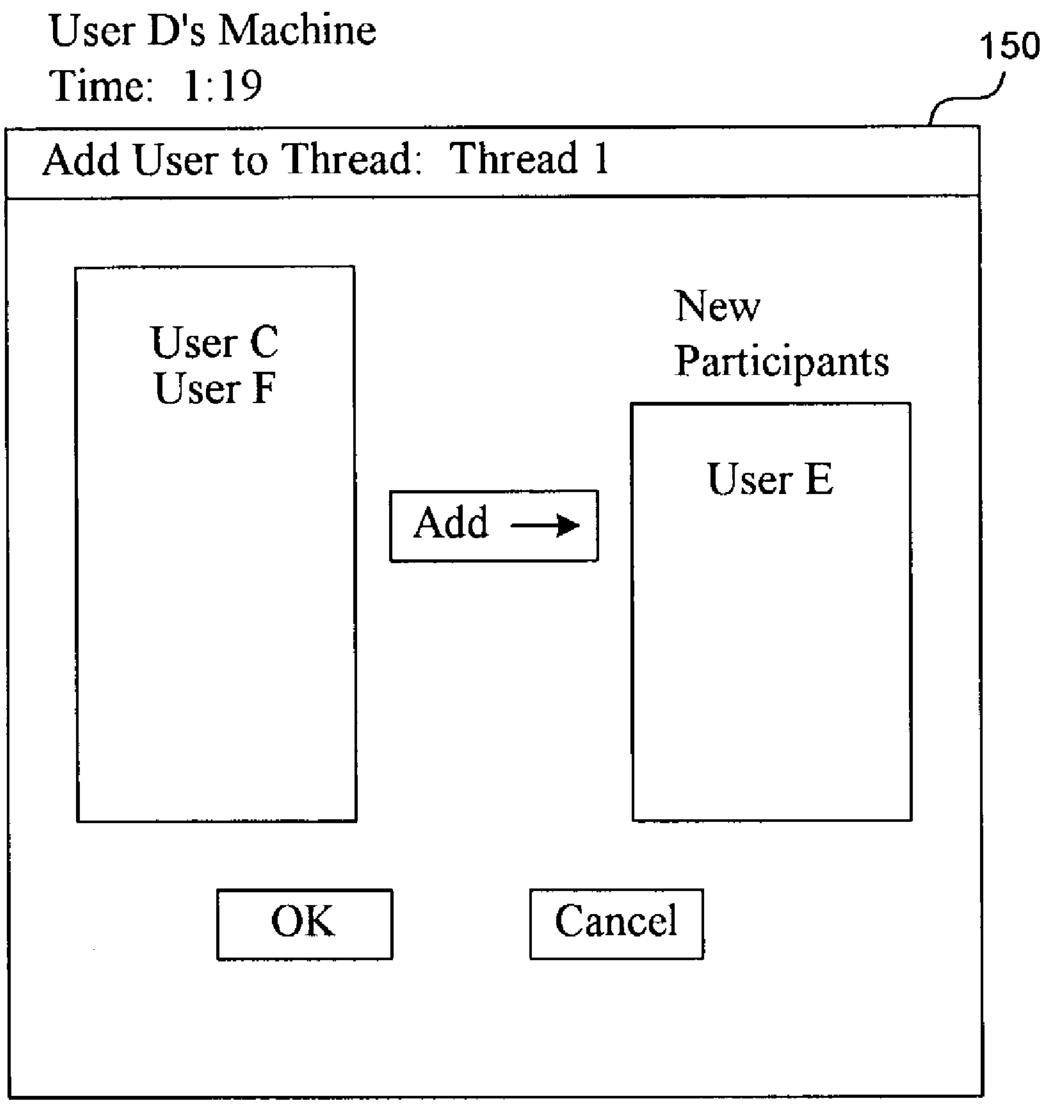

FIG. 1T illustrates a window 150 with which User D is currently specifying a new user (i.e., User E) to be added to thread 1. In the illustrated embodiment, any current member of a thread can specify to add a new member, although in other embodiments thread member additions may not be allowed, or member additions to an existing thread may be limited instead to the thread creator or to some other user authorized to perform the addition (e.g., an administrator). In addition, in some embodiments some or all of the existing thread members may be asked to approve the addition of a new user (although not shown here) and/or the new user may be queried to approve the addition (also not shown here). In some embodiments, a user that is not a current member of an existing thread may also specify or request to be added to that thread, with similar types of approval of some or all existing thread members being employed in some such embodiments. Accordingly, some or all users may be able to obtain information about some or all existing threads of which they are not currently members.

Figure 1U:
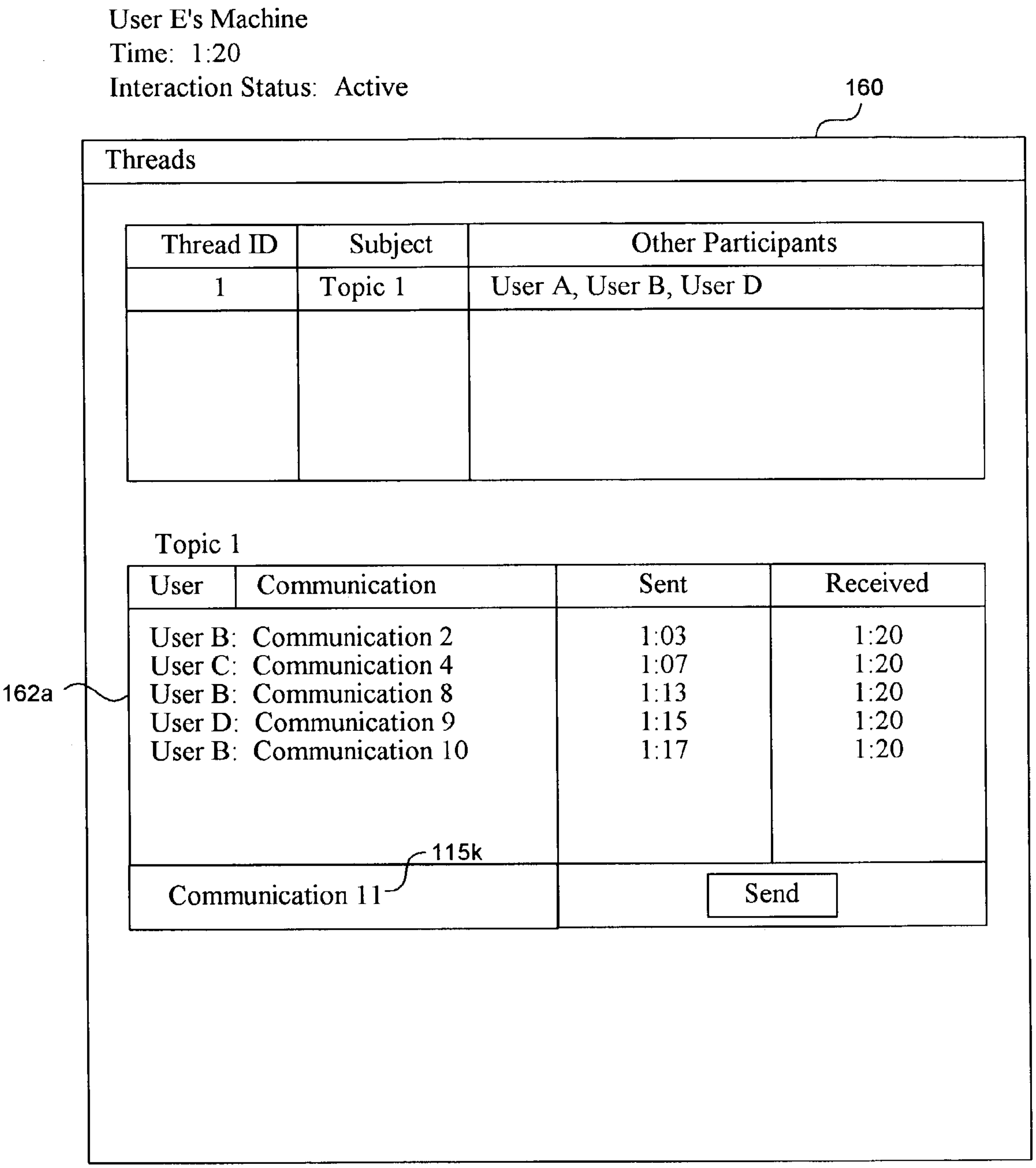

FIG. 1U illustrates thread display window 160 for User E at time 1:20 after User E has been added to thread 1. In the illustrated embodiment, the thread communications display 162*a* for thread 1 has been updated to include prior communications that occurred for the thread before User E was added, such as by default or instead based on an explicit request (not shown) from added user User E or adding user User D. In other embodiments, the inclusion of such prior communications may not be supported, instead providing only future thread communications to such added users. User E is currently specifying Communication 11 for thread 1.

FIG. 1V illustrates thread display window 100 for User A at time 1:21 after the interaction status 100*a* has changed to active. As is shown, the information 101*c* about other thread participants has been updated for thread 1 to reflect that User E is now a thread member and that User C is no longer a thread member. Similarly, the thread communication displays for threads 1 and 2 have been updated to include previously sent communications from other thread members during the period when the interaction status for User A was passive, with the receipt time for those communications shown to be 1:21 when User A's interaction status became active and the communications were received.

FIG. 1W shows an updated display of thread display window 100 for User A at time 1:22 after User A has indicated to change the order of the displayed thread communications for thread 2. In particular, User A has indicated to display the contents of the thread communications for thread 2 in an order based on the time that they were received, such as by selecting the column heading 100*f* for that thread communication display. In alternative embodiments, the user may instead specify a setting for all thread communication displays, such as by setting a multi-thread user preference (not shown). In addition, more complicated display filters may be specified by users in some embodiments, such as to select which thread communications are to be displayed and to specify an order and/or other manner in which the selected thread communications should be displayed.

In a similar manner to FIG. 1W, FIG. 1X illustrates thread display window 120 for User B at time 1:23 after User B has selected to display the thread 1 communications in an order based on time of receipt, such as by selecting the "Received" column heading 120*f* for that thread communication display. In a related manner, FIG. 1Y illustrates thread display window 140 for User D, with the thread communication display for thread 1 illustrated after User D has selected to show the thread communications in an order based on the sending user, such as by selecting the "User" column heading 140*f*.

Thus, a variety of specific details regarding thread-based communications have been provided for the purposes of illustration with respect to FIGS. 1A-1Y and 2A-2B. In addition, some embodiments of the software facility are described below in which specific techniques are disclosed for creating and manipulating threads, for creating, sending, receiving and storing thread communications, and for displaying or otherwise presenting thread communications to users. However, those skilled in the art will appreciate that the techniques of the invention can be used in a wide variety of other situations, and that the invention is not limited to the specific details discussed.

For example, a user can easily create a new thread in some embodiments by selecting a "New Thread" button or other similar control. If an existing thread already exists between the desired group members for the new thread, the user may be able to create the new thread as a "child" of the existing thread, inheriting some or all of the various aspects of the existing thread, such as the group members, existing communications and/or various thread properties. By default, creating a thread in some embodiments triggers the opening of a new display window for the thread communications and the establishment of communication links with the other thread group members. Unlike for chat, no separate step may be needed to request a new chat session from the server or to invite the other users to join the new chat session. Each new thread that is commenced in some embodiments begins creation of a new document (or database entries presented as a single document) that will contain all of the communications between the participants on that subject.

When starting a thread, a user can specify a first communication for the thread at the same time the thread members and a thread topic are specified. The user may also select one or more prior communications from another thread as the starting history to be copied into a new thread. If the thread topic is used as a subject for the first communication, in some embodiments the subject of later communications for the thread cannot be altered by any thread members, such as when the subject is used to associate communications with the thread.

Each new thread (and each first communication to a new member of a thread) may also include an indication that the thread is new to the recipient, such as with new words in the subject field or the inclusion of an indicator such as a "new thread" flag. If so, when a thread communication is received, the communication is examined for the "new thread" indication. If the indication is present, a notification will be provided to the user of the new thread (e.g., a new window will be automatically opened to display the received thread communication) unless the user has specified otherwise via user preferences. If the new thread indication is not detected, an attempt is made to identify an existing thread to which the communication corresponds (e.g., based on an associated thread ID, on the communication subject and/or on the specified communication recipients), and the communication is displayed with or otherwise added to the identified thread. If two or more corresponding threads are identified, in some embodiments a long number (near GUID) given by the sending system as an identifier for the new communication is compared to identifiers in prior thread communications in order to assist in locating similar communications that may belong to the proper thread.

A user may in some embodiments decline to participate in a thread by activating an "Exit" (or "Withdraw") feature. Using the Withdraw feature, whether after the first communication or any subsequent communication, may in some embodiments cause the automatic generation of a message to the other thread members stating that "[user_name] has ceased following this thread". Users also have the option of closing a thread communication display window without terminating the user's participation in the thread, although a new received communication on that thread may then trigger a notification to the user (e.g., by highlighting a displayed indication for that thread in the thread summary window). A user may also specify other notification means with which to be alerted of activity on a thread, such as automatically opening the thread communication display window for a thread which has received new communications.

When a thread client is turned off or the connection with the network is closed without first closing the window of a thread, reestablishing connection with the network will in some embodiments cause a connection to a thread server or other appropriate thread client to automatically be created in order to retrieve communications sent while the thread client was disconnected. Also, to ensure that a complete record of all communications is retained, each thread conversation may be automatically saved with an update after every communication is sent or received, such as to persistent memory.

Thus, a thread can be considered to be a persistent virtual multi-person connection in a context based at least in part on an associated thread topic. Multiple threads can be active on a user's thread client, and each one may be displayed or not visible (e.g., minimized) as desired in some embodiments.

In some embodiments, threads can also be organized in folders (e.g., in a manner similar to email), such as to allow threads to be selected using a hierarchical display mechanism. A user may also be able to delete a thread from a thread client in some embodiments, and if so the displayed information about the thread will be removed, although in some embodiments deleted threads may be retained for at least a limited time. However, in some embodiments a thread archiving feature may be provided to maintain copies of threads, such as by one or more thread servers.

A "friends" list may be kept on each user's machine wherein a list of friends you desire to have threads with is maintained. This can be used to implement opt-in threads functionality, such that a user explicitly decides other users with whom they will share threads, with threads with non-selected users not being allowed.

Thread communications thus support general-purpose communications, including for personal use and business/enterprise use, and are also of particular benefit in a variety of specific environments. As one example, a thread could be created in the customer service area for each service call that is received, with that same thread then shared (or passed around) between the caller and the one or more customer service people that work on resolving the problem. When multiple customer service people work on such a problem, in some embodiments each person will be tracked and identified distinctly when displaying communications (e.g., to show which person made what statements and took what actions), while in other embodiments some or all of the multiple customer service people could act as a single logical thread member (e.g., to show consistency to the person initiating the service call). This technique of treating multiple thread members as a single logical thread member is also useful in a variety of other environments. Other examples of thread uses include for members of a common work project or organization structure (e.g., department), teenagers, students in a class, residents of a common geographical location, clubs and social groups, wireless computing device users, gaming, virtual teams, collaboration between multiple users, technical support and training, etc.

In some embodiments, a variety of additional information can be tracked and optionally provided to some or all thread members. For example, it may be useful to track the "currency" of a thread communication to reflect the type of attention given to the communication by one or more thread members (e.g., viewed the communication, clicked on (or otherwise selected) it or around it, double-clicked it, peeled-off the communication for some specific use, immediately replied to it, etc.). Information about the currency of a communication could also be provided to some or all thread members (e.g., the communication sender) in various ways, such as in textual form or by displaying an indication of the communication in various colors or shades of gray.

Figure 3A:
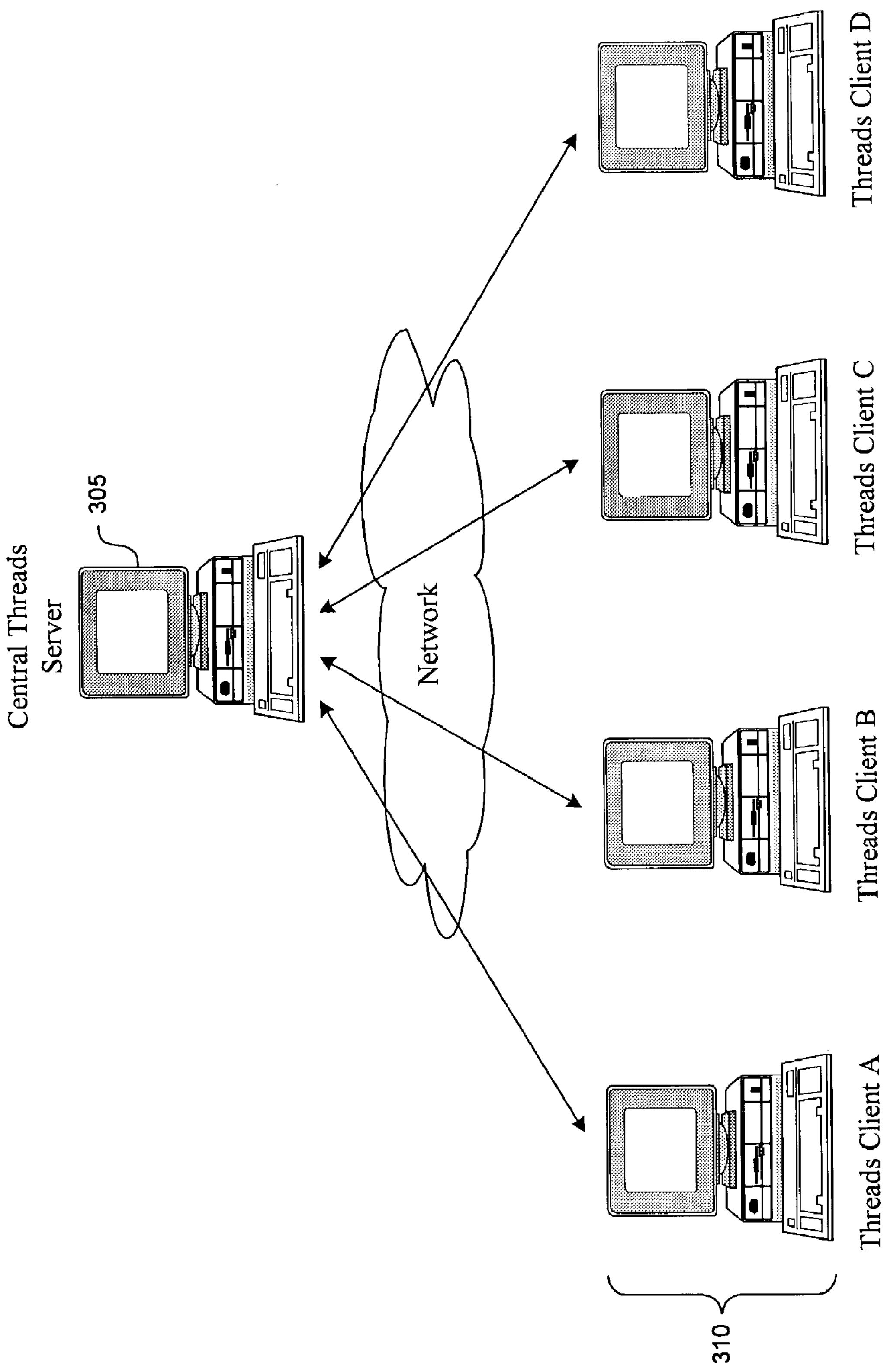
FIGS. 3A-3C illustrate alternative network diagrams in which thread client computing devices are inter-communicating.
Figure 3B:
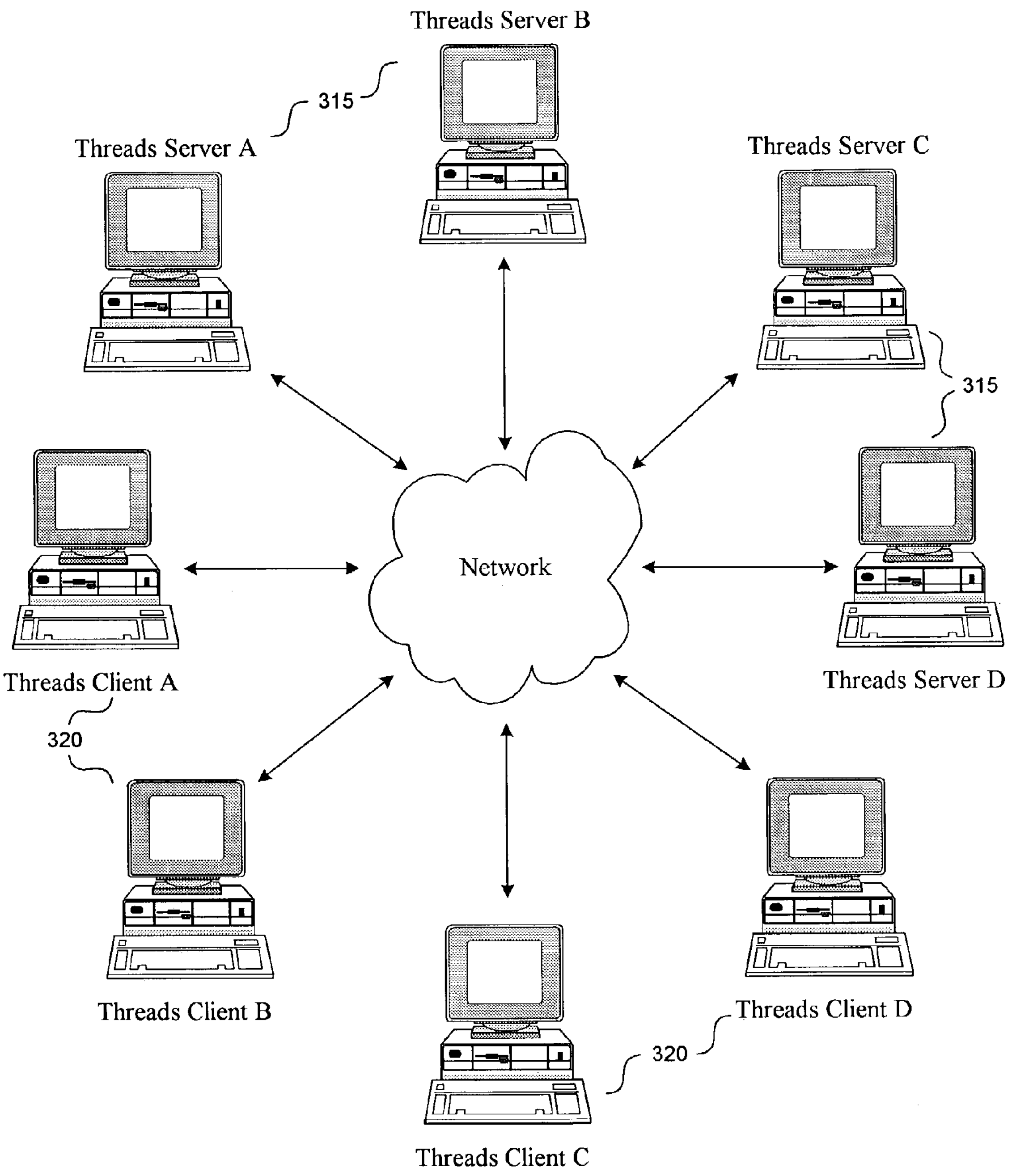
Figure 3C:
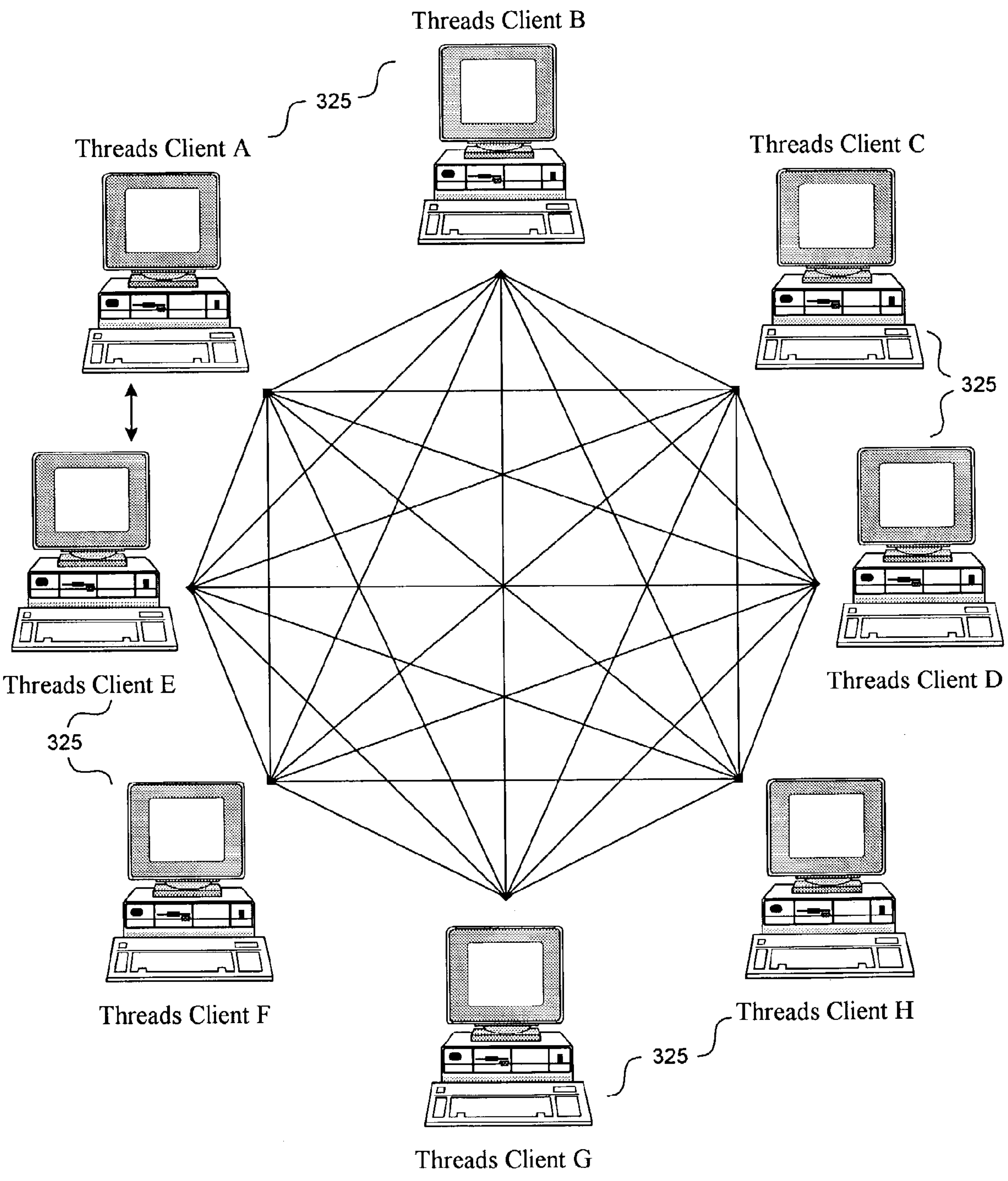

FIGS. 3A-3C illustrate various embodiments for exchanging thread communications between thread clients. For example, with respect to FIG. 3A, a variety of thread clients 310 are illustrated that are communicating with a single, central thread messaging system server 305 in order to send and receive thread communications. In such an embodiment, the thread server may provide functionality such as tracking current members of threads and determining how and when thread communications should be forwarded to thread members (e.g., based on a tracked current interaction status for each thread member and/or connectivity status for each thread client). In addition, the thread server could store a single copy of all thread communications, with the thread clients merely maintaining copies (e.g., on a transient basis) for display. Alternatively, some or all of the thread clients could instead maintain an independent store of all communications sent and/or received for the threads in which their users are members, and could similarly track and specify thread members to whom thread communications should be sent. The use of one or more servers can be beneficial in various embodiments, such as when some or all of the thread clients have only transitory network connections (e.g., for portable devices, such as cell phones or PDAs) and/or some or all thread clients lack sufficient storage and/or processing power (e.g., dumb terminals, thin clients, various portable devices, etc.).

FIG. 3B illustrates an alternative embodiment in which multiple thread clients 320 interact with each other and with multiple thread messaging system servers 315 through a network. In such embodiments, the use of multiple thread servers can provide various benefits, such as redundancy and more rapid response times. In such embodiments, thread clients may also have the ability to send some types of communications or other messages directly to other thread clients without using a thread server. In addition, distributed databases of thread communications could be used in such embodiments (e.g., distributed between the various thread servers), or instead some or all of the thread clients and/or thread servers could locally replicate some or all of the thread communications.

FIG. 3C illustrates an alternative embodiment in which various thread clients 325 inter-communicate without the use of any thread messaging system servers, such as in a peer-to-peer environment. While the illustrated embodiment illustrates full connectivity in which each thread client may send messages directly to each other thread client without the assistance of any intermediate thread clients, in other embodiments the communications may be only partially connected such that some thread clients serve as hubs to assist in forwarding thread communications between distinct groups of other thread clients. Even in a fully networked peer-to-peer environment, however, a variety of other computing devices may be involved in communications between thread clients, such as other intervening computing devices in a network. In embodiments in which thread messaging system servers are not used, some or all of the thread clients may take independent responsibility for tracking thread memberships and forwarding thread communications to other thread clients as appropriate (e.g., when their interaction status becomes active or when they join an existing thread). In addition, some or all of the thread clients could each maintain an independent local copy of the thread communications for the threads in which their users are members, or instead a distributed database among some or all of the thread clients could be used.

Figure 4:
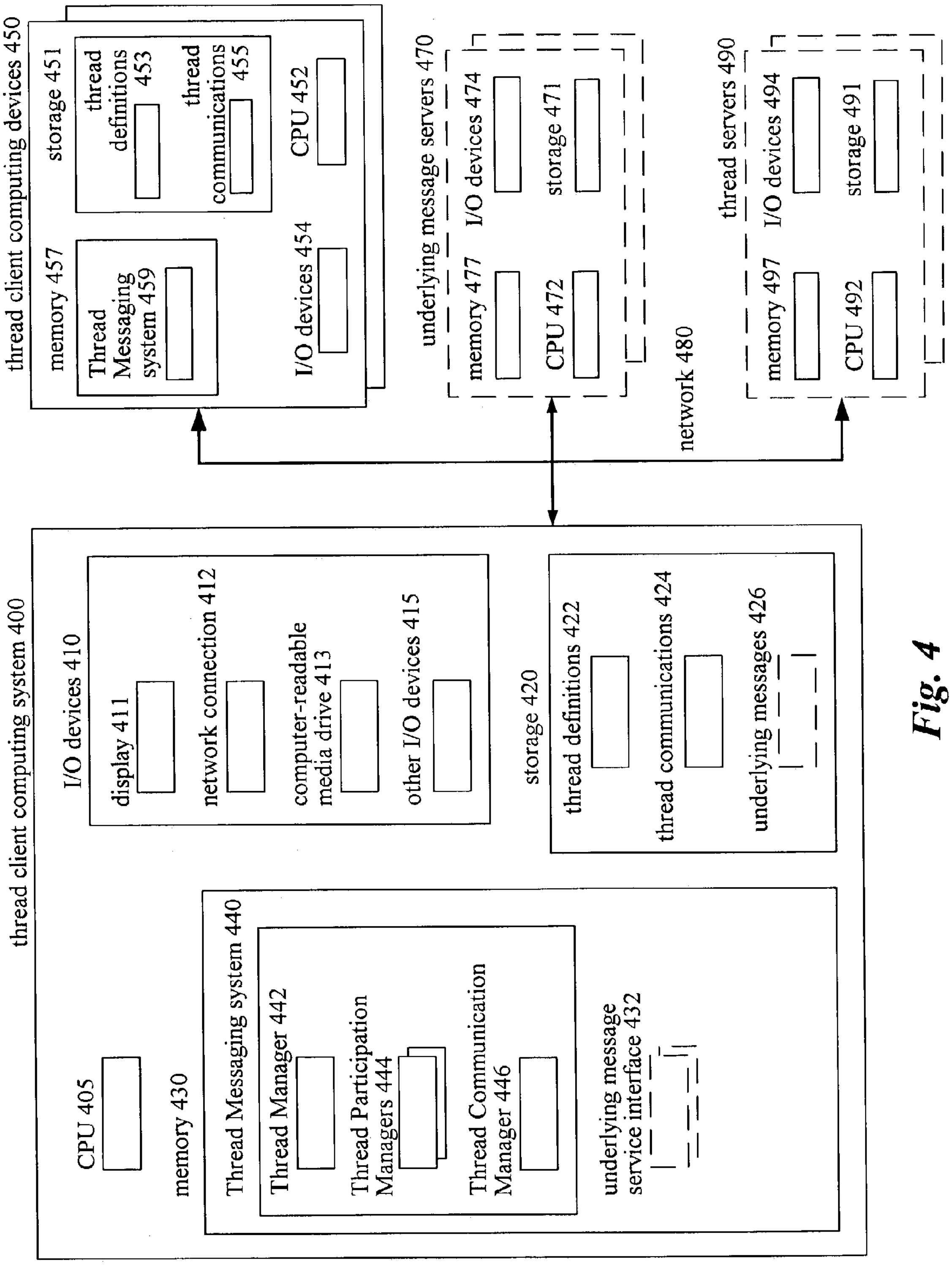
FIG. 4 is a block diagram illustrating an embodiment of the disclosed thread messaging system.

FIG. 4 illustrates a computing system 400 suitable for executing an embodiment of a thread messaging system facility, as well as various other thread client computing devices 450. The thread client computing system 400 includes a CPU 405, various I/O devices 410, storage 420, and memory 430. The I/O devices include a display 411, a network connection 412, a computer-readable media drive 413, and various other I/O devices 415.

An embodiment of the Thread Messaging system 440 is executing in memory, and it includes a Thread Manager component 442, a Thread Communication Manager component 446, and one or more Thread Participation Manager components 444. One or more users of the thread client computing system can access it in a variety of ways. For example, users that have physical access to the client computing system may use some or all of the I/O devices 410 to specify and receive (e.g., view) thread communications as well as to perform various other thread manipulations. Alternatively, other users may use other computing devices (not shown) to remotely access the Thread Messaging system (e.g., via the Internet and/or the World Wide Web). The Thread Messaging system and other executing components may provide information to users via output devices such as the display 411 or other output devices, and may receive various feedback and other types of information from users via various input devices.

In the illustrated embodiment, a user of the thread client computing system interacts with the Thread Manager component to create new threads and to manipulate existing threads in various ways. In particular, the user can specify other participants to be included in a new thread being created, and can optionally specify a variety of other thread properties (e.g., permission information to specify under what criteria new users can be added or existing members can be removed, information about an ending criteria for the threads (if other than indefinite) such as a time limit or limit on number of communications, etc.).

Information about other users available to be specified as thread members can be obtained in various ways, such as from a stored list (not shown) on local storage 420 of all users or of a specified subset of users, or by interacting with one or more client computing devices 450 to obtain user information from them. In some embodiments, one or more optional thread servers 490 are also available, and if so user information may similarly be available from the thread servers. In addition, in some embodiments one or more optional underlying message servers 470 are available, each of which may provide one or more of various types of messaging services (e.g., email, IM, chat, IRQ, bulletin boards, etc.). If so, information about available users of those services may also be obtained in some embodiments from the underlying message servers.

After the user has specified the various information for the thread, the Thread Manager generates a thread definition for that thread. In embodiments in which the other specified thread members are asked to verify their membership, the Thread Manager and/or the Threat Communication Manager may obtain such verifications before the thread definition is created. In the illustrated embodiment, the generated thread definition is then stored with thread definitions 422 on local storage, and is also forwarded to each of the other thread client computing devices 450 that have users who are members of the thread for local storage by those thread clients as part of thread definitions 453 on storage 451. In embodiments in which one or more thread servers are present, the thread definitions may be sent to the thread servers for storage, either in addition to or instead of using local storage on thread clients, and the thread servers may also perform the forwarding of the thread definition to other thread clients if appropriate.

In a similar manner to creating a thread, a user can interact with the Thread Manager to modify an existing thread in various ways, such as to add or delete a thread member, to create a child thread from an existing thread, to delete a thread entirely, etc. In response to such thread manipulations, the Thread Manager modifies (or deletes) a corresponding thread definition as appropriate (such as by modifying the stored thread definition 422) and notifies the thread client computing devices and/or thread servers about the manipulations as appropriate.

In the illustrated embodiment, the Thread Communication Manager interacts with other thread client computing devices and/or thread servers to exchange communications and other messages or information. Thus, for example, the Thread Communication Manager may assist in gaining verification of other users to join a new thread being created when that functionality is used. Similarly, the Thread Communication Manager may perform a notification of new or changed thread definitions to other thread client computing devices and/or thread servers. When a user of another thread client includes a user of the thread client computing system in a thread being created, the Thread Communication Manager 446 receives the notification of the new thread definition from that other thread client computing device, and stores the new thread definition on local storage. In embodiments in which the thread messaging communications are sent using one or more underlying messaging services, the Thread Communication Manager may also interact with one or more optional underlying message service interfaces 432 executing in memory, such as to facilitate the receipt and transmission of thread communications and other information via those underlying message services.

In the illustrated embodiment, a Thread Participation Manager component is created for each thread in which a user of the thread client computing system is a member. The Thread Participation Manager components then each manage the thread communication displays and interactions for their thread. Thus, when a user specifies a new communication for a thread, the Thread Participation Manager for that thread provides the communication to the Thread Communication Manager for transmission to other thread members. The Thread Communication Manager in the illustrated embodiment then stores the communication with other thread communications 424 on storage, and sends the communications to the other thread client computing devices for members of the thread and/or to the thread servers (if any) as appropriate. In other embodiments, such as when thread servers and/or underlying message servers are present, some or all of the thread communications may instead not be stored locally on the thread client computing system. In addition, when underlying message servers are used, various optional underlying messages 426 that represent (e.g., are used to transport) thread communications may also be stored on storage and/or transmitted to thread client computing devices and/or thread servers, such as via or with the assistance of one or more underlying message servers.

After the user of the thread client computing system specifies a communication, the Thread Participation Manager updates a display of the thread communications for that thread to include that new communication if appropriate. Similarly, if a new communication for a thread is received by the Thread Communication Manager, the Thread Participation Manager is notified in the illustrated embodiment to display the new communication and/or to notify the user of the new communication existence as appropriate. Users can also interact with the Thread Participation Managers in the illustrated embodiment to perform various thread-related manipulations, such as to change an interaction status, exit a thread, request a new user be added to a current thread, etc.

Each of the thread client computing devices 450 in the illustrated embodiment includes a copy of a Thread Messaging system 459 executing in memory 457 of the device, and various thread definitions 453 and/or thread communications 455 may be stored on local storage 451 of the device. Various other executing components (e.g., underlying message service interfaces or other programs unrelated to the Thread Messaging system) may also be executing in memory 457 and/or memory 430, and the storages 420 and 451 can similarly store a variety of other types of information (e.g., user preferences, identifications of users for the respective client computing devices and/or client computing system, underlying messages, etc.).

Those skilled in the art will appreciate that thread client computing system 400 and computing devices 450 are merely illustrative and are not intended to limit the scope of the present invention. The thread clients may be connected to other devices that are not illustrated, including through one or more networks such as the Internet or via the World Wide Web (WWW). More generally, a "client" or "server" may comprise any combination of hardware or software that can interact in the described manners, including computers, network devices, internet appliances, PDAs, wireless phones, pagers, electronic organizers, television-based systems and various other consumer products that include inter-communication capabilities. In addition, the functionality provided by the illustrated system components may in some embodiments be combined in fewer components or distributed in additional components, and in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 5:
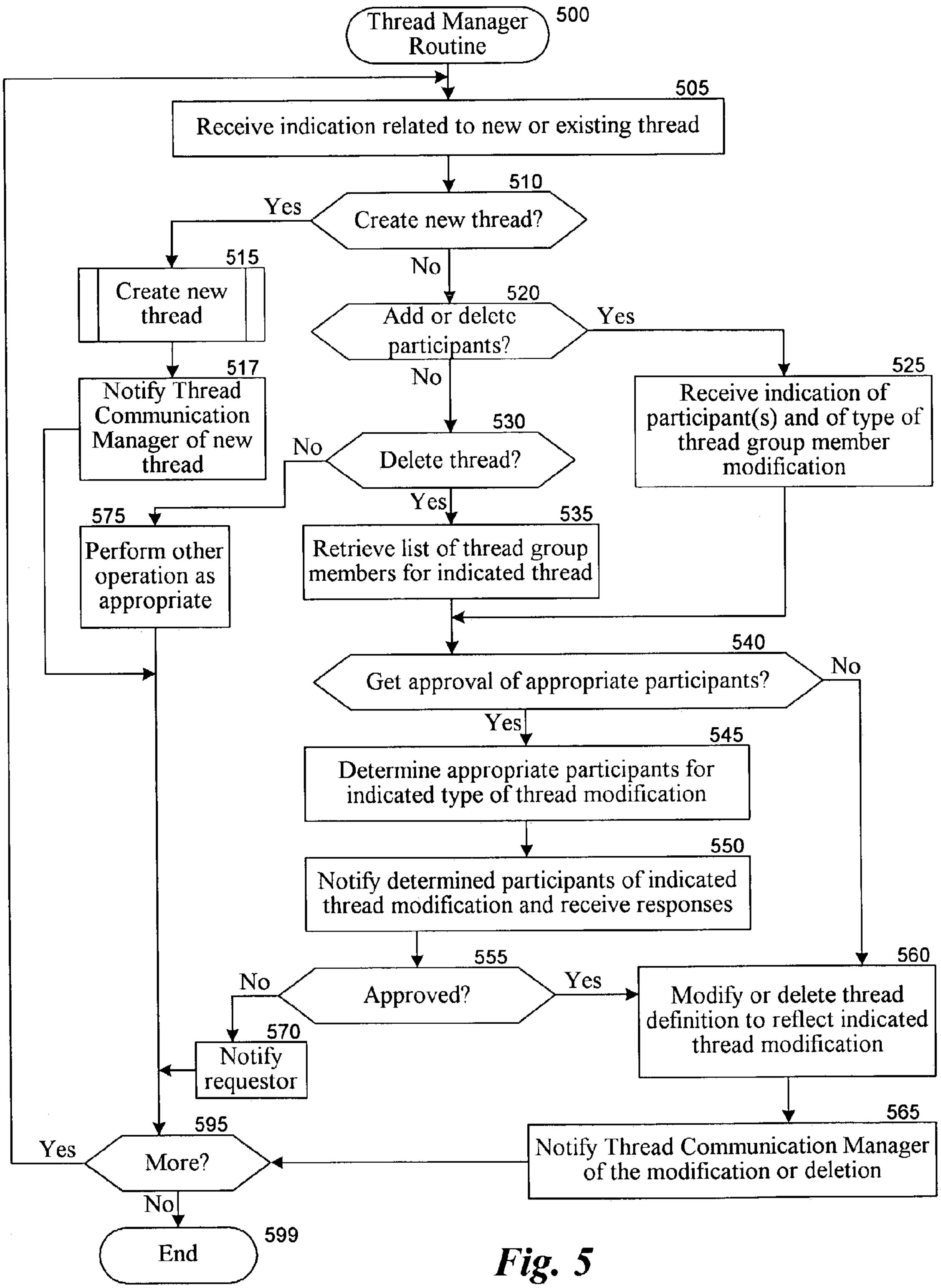
FIG. 5 is a flow diagram of an embodiment of a Thread Manager routine.

FIG. 5 is a flow diagram of an embodiment of the Thread Manager routine 500. The routine receives instructions from a user related to creating a new thread or manipulating an existing thread, and responds to the request as appropriate. While not illustrated in detail here, in some embodiments the Thread Manager routine also displays thread summary information to a user, and if so some or all of the received requests may be based on user interactions with selected controls available from the display. In addition, while in the illustrated embodiment the Thread Manager routine is performed on a thread client on behalf of a particular user, in other embodiments the illustrated Thread Manager routine could with slight modifications be implemented instead on a thread server, such as to serve multiple users at multiple thread clients.

The routine begins at step 505 where an indication is received from a user that is related to a new or existing thread. While not illustrated here, in some embodiments a verification will be performed that the user is authorized to perform the indicated action before it is performed. The illustrated routine continues at step 510 to determine whether the received indication was a request to create a new thread, and if so continues to step 515 to execute a subroutine to create a new thread, as discussed in greater detail with respect to FIG. 6. After step 515, the routine continues to step 517 to notify the Thread Communication Manager routine of the newly created thread, such as by supplying a newly created thread definition.

If it was instead determined in step 510 that the received indication was not to create a new thread, the routine continues instead to step 520 to determine if the received indication was a request from the user to add or delete participants to an existing thread. If so, the routine continues to step 525 to receive an indication from the user of one or more participants and of the type of thread group member modification (e.g., add or delete) to be performed.

If it was instead determined in step 520 that the request was not to add or delete participants, the routine continues instead to step 530 to determine whether the received indication was a request to delete a thread, and if not the routine continues to step 575 to perform another specified operation as appropriate (e.g., to edit an existing thread, such as to modify thread properties). If it was determined in step 530 that a request to delete a thread was received, however, the routine continues to step 535 to retrieve the list of thread group members for the indicated thread.

After steps 525 or 535, the routine continues to step 540 to determine whether approval is needed of appropriate participants, such as based on defaults, user preferences, thread properties, etc. If so, the routine continues to step 545 to determine the appropriate participants for the indicated type of thread modification, which can vary in various embodiments. For example, when adding or deleting a user for an existing thread, appropriate participants whose approval is needed may include the user being added/deleted and/or some or all of the other existing group members (e.g., the creator of thread, a majority of thread users, or all thread users). Similarly, with respect to deleting a thread, some or all of the thread group members may need to approve the deletion. Approval can be obtained in various ways in various embodiments, such as by contacting appropriate participants directly or instead using the Thread Communication Manager to send and receive appropriate responses.

After step 545, the routine continues to step 550 to notify the active participants of the indicated thread modification and to receive responses (if any). It is then determined in step 555 whether or not the requested thread modification was approved, such as based on approval criteria specified for the thread (e.g., as a thread property), as a default, etc. If the modification was not approved, the routine continues to step 570 and provides notification to the user. If approval was instead received or if it was instead determined in step 540 that approval was not needed, the routine continues to step 560 to modify or delete the thread definition for the thread to reflect the modifications made. After step 560, the routine continues to step 565 to notify the Thread Communication Manager of the thread definition modification or deletion. While not illustrated here, in other embodiments notification may also be provided to the user of the successful completion of the operation. After steps 517, 565, 570, or 575, the routine continues to step 595 to determine whether to continue. If so, the routine returns to step 505, and if not the routine continues to step 599 and ends.

Figure 6:
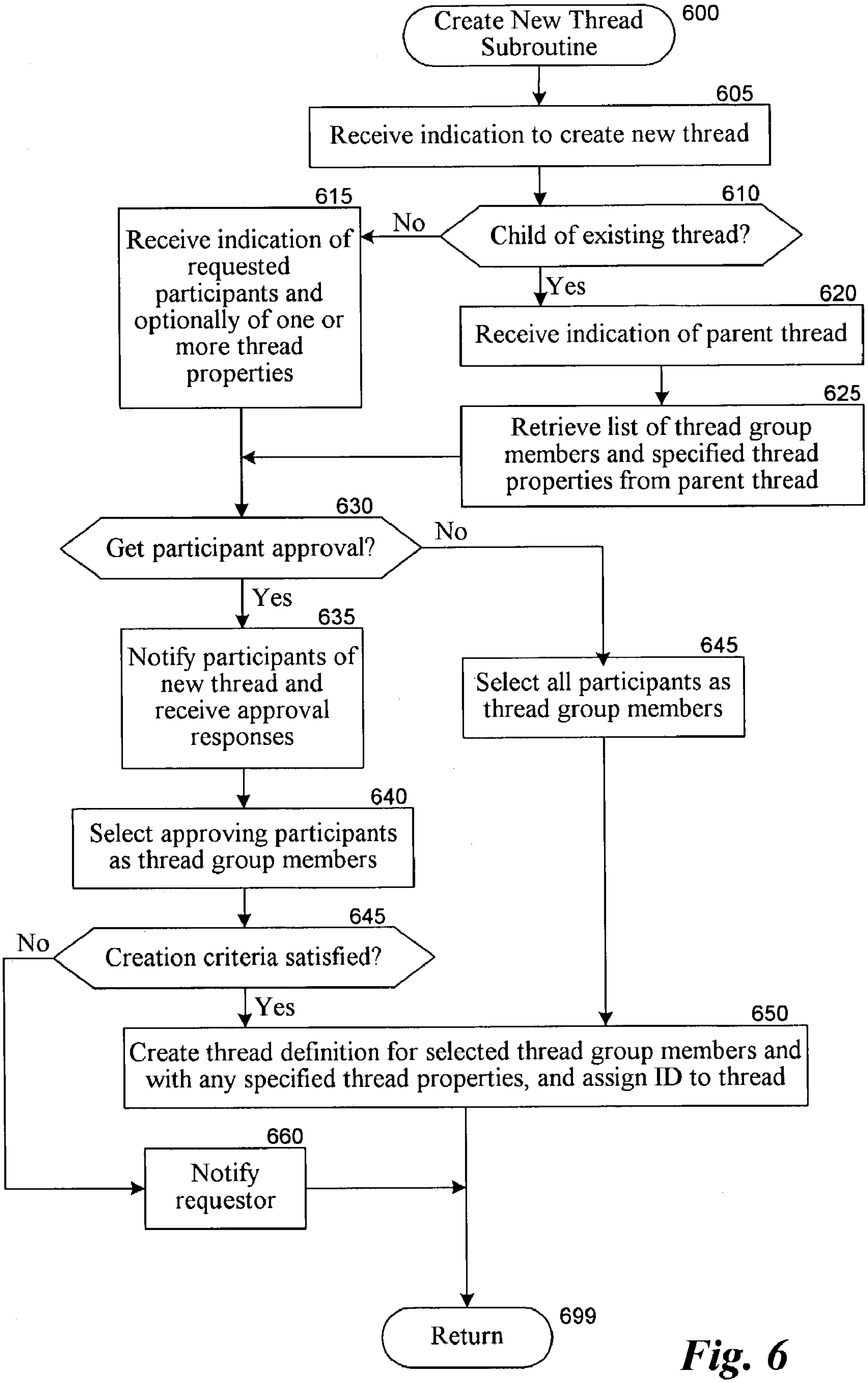
FIG. 6 is a flow diagram of an embodiment of a Create New Thread subroutine.

FIG. 6 is a flow diagram of an embodiment of a Create New Thread subroutine 600. The subroutine receives information about a new thread to be created and creates the thread as appropriate. The subroutine begins at step 605 where an indication is received to create a new thread. The subroutine continues to step 610 to determine whether the new thread is to be a child of an existing thread, and if so continues to step 620 to receive an indication of the parent thread. After step 620, the subroutine in step 625 retrieves a list of the thread group members for the parent thread, as well as optionally retrieving thread properties for the parent thread. In the illustrated embodiment, a child thread can thus inherit users and optionally behaviors of an existing thread, but does not inherit existing communications of a parent, although in other embodiments a child's thread could additionally be created so as to include existing communications of a parent at the time of the creation of the child.

If it was instead determined in step 610 that the new thread is not to be a child of an existing thread, the subroutine instead continues to step 615 to receive an indication from the user of participants who are specified to be members of the new thread group, as well as optionally receiving one or more specified thread properties for the new thread. After steps 615 or 625, the subroutine continues to step 630 to determine whether to get approval of the requested participants for the new thread, with the determination able to be made in various ways such as based on specified thread properties, user preferences, default behavior, status of whether the new thread is a child, etc. If not, the subroutine continues to step 645 to select all participants as thread group numbers for the new thread to be created.

However, if it was determined in step 630 to get approval, the subroutine continues to step 635 to notify the specified participants of the new thread and to receive approval responses (if any). Participant approval can be obtained in various ways in various embodiments, such as by contacting thread participants directly or instead using the Thread Communication Manager to send and receive appropriate responses. In step 640, the subroutine then selects approving participants as thread group members, and continues to step 645 to determine whether creation criteria for the new thread has been satisfied, such as based on specified thread properties, user preferences, default behavior, etc. For example, a minimum number or percentage of requested participants may be required to satisfy thread creation criteria, or instead all requested participants may need to approve the thread creation. If the creation criteria is not satisfied, the subroutine continues to step 660 to notify the user. However, if the creation criteria is satisfied (or if no creation criteria is used), or after step 645, the subroutine continues to step 650 to create a thread definition for the new thread using the selected thread group members and any specified thread properties. In addition, in the illustrated embodiment a thread ID is created and assigned to each new thread (e.g., a unique ID among other threads). After steps 650 or 660, the subroutine continues to step 699 and returns. While not illustrated here, in other embodiments notification may also be provided to the user of the successful creation of the thread, such as to indicate the selected group members for the thread.

Figure 7:
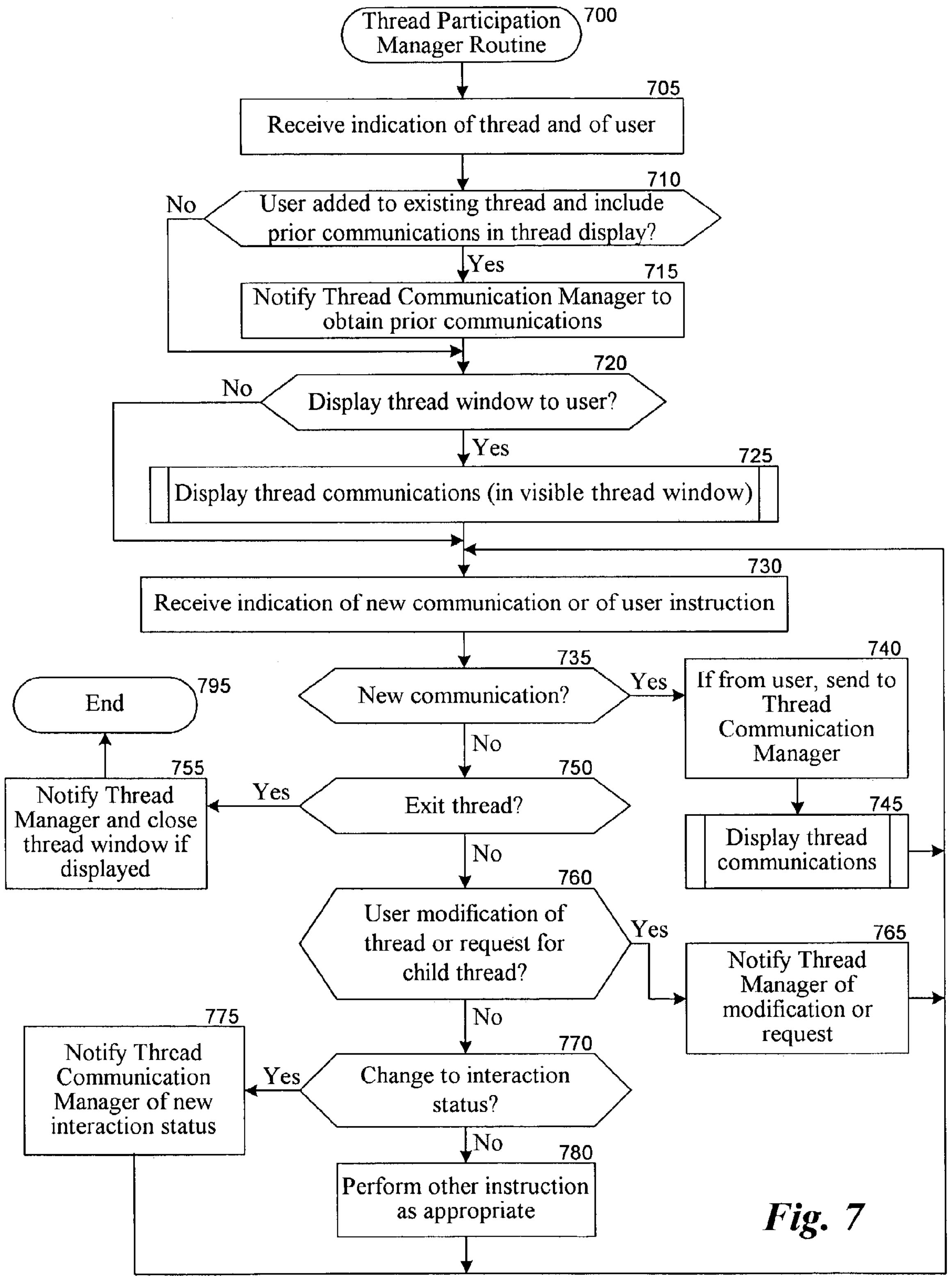
FIG. 7 is a flow diagram of an embodiment of a Thread Participation Manager routine.

FIG. 7 is a flow diagram of an embodiment of a Thread Participation Manager routine 700. The illustrated routine processes received communications for a thread by displaying them and/or by notifying a user of their existence as appropriate, as well as handling various user interactions with the thread display. In the illustrated embodiment, a separate instantiation of the routine is used for each thread for each user, although in other embodiments a single routine could be used to handle multiple threads for one or more users (e.g., at a thread client) and/or to handle one or more threads for multiple users (e.g., at a thread server).

The routine begins in step 705 where an indication is received of a thread and of a user. The routine continues to step 710 to determine whether the user has just been added to an existing thread and, if so, whether it is appropriate to display prior communications for the thread. Determination of whether the user has been added to an existing thread can be made in various ways, such as based on information received in step 705, by querying the user, by interacting with the Thread Communication Manager or other external source having access to that information, etc. Similarly, the decision whether to provide prior communications can be made in various ways, including use of user preferences or information provided in step 705. In other embodiments, however, the functionality of providing prior communications may not be available.

If it is determined in step 710 to include prior communications, the routine continues to step 715 to notify the Thread Communication Manager to obtain prior communications for the thread. After step 715, or if it was instead determined not to include prior communications, the routine continues to step 720 to determine whether to display the thread window to the user immediately, such as based on information received in step 705, by querying the user, user preferences, default behavior, etc. If so, the routine continues to step 725 to execute a subroutine to display thread communications for the user and thread, including indicating to generate a visible display of the thread communications as needed. In other embodiments, thread communications can be provided to the user in various other ways than by displaying in a window, such as by presenting thread communications in an auditory manner or other than in a displayed window.

After step 725, or if it was instead determined in step 720 not to immediately display the thread window, the routine continues to step 730 to receive an indication of a new communication for the thread or of a user instruction related to the thread. The routine continues to step 735 to determine whether a new communication was received, whether from the user or from another thread group member. If so, the routine continues to step 740 where, if the new communication was specified by the user, the new communication is forwarded to the Thread Communication Manager. After step 740, the routine continues to step 745 to execute the subroutine to display the thread communications for the user and thread.

If it was instead determined in step 735 that a new communication was not received, the routine continues to step 750 to determine whether an instruction was received from the user to exit the thread (although in some embodiments this functionality may not be available). If so, the routine continues to step 755 to notify the Thread Manager, and then closes the thread window if it exists. After step 755, the routine continues to step 795 and ends. If it was instead determined in step 750 that the user instruction was not to exit the thread, the routine continues to step 760 to determine whether the user has indicated to modify the thread or has requested a child thread. If so, the routine continues to step 765 to notify the Thread Manager of the modification or request.

If it was not determined in step 760 that the user request was to modify a thread or request a child thread, the routine continues to step 770 to determine whether the user has requested a change to the current interaction status, such as to enter a passive interaction status state (although in some embodiments such functionality may not be provided). If so, the routine continues to step 775 to notify the Thread Communication Manager of the new interaction status, and if not the routine continues to step 780 to perform another type of user request (e.g., to change display properties, such as the order in which thread communications are displayed or the types of thread communication information displayed, to set user preferences or thread properties, to modify the thread display window in other ways, etc.) as appropriate. In the illustrated embodiment, interaction status is not displayed or otherwise provided to the user, although in other embodiments such information may be available. After steps 745, 765, 775 or 780, the routine returns to step 730.

Figure 8:
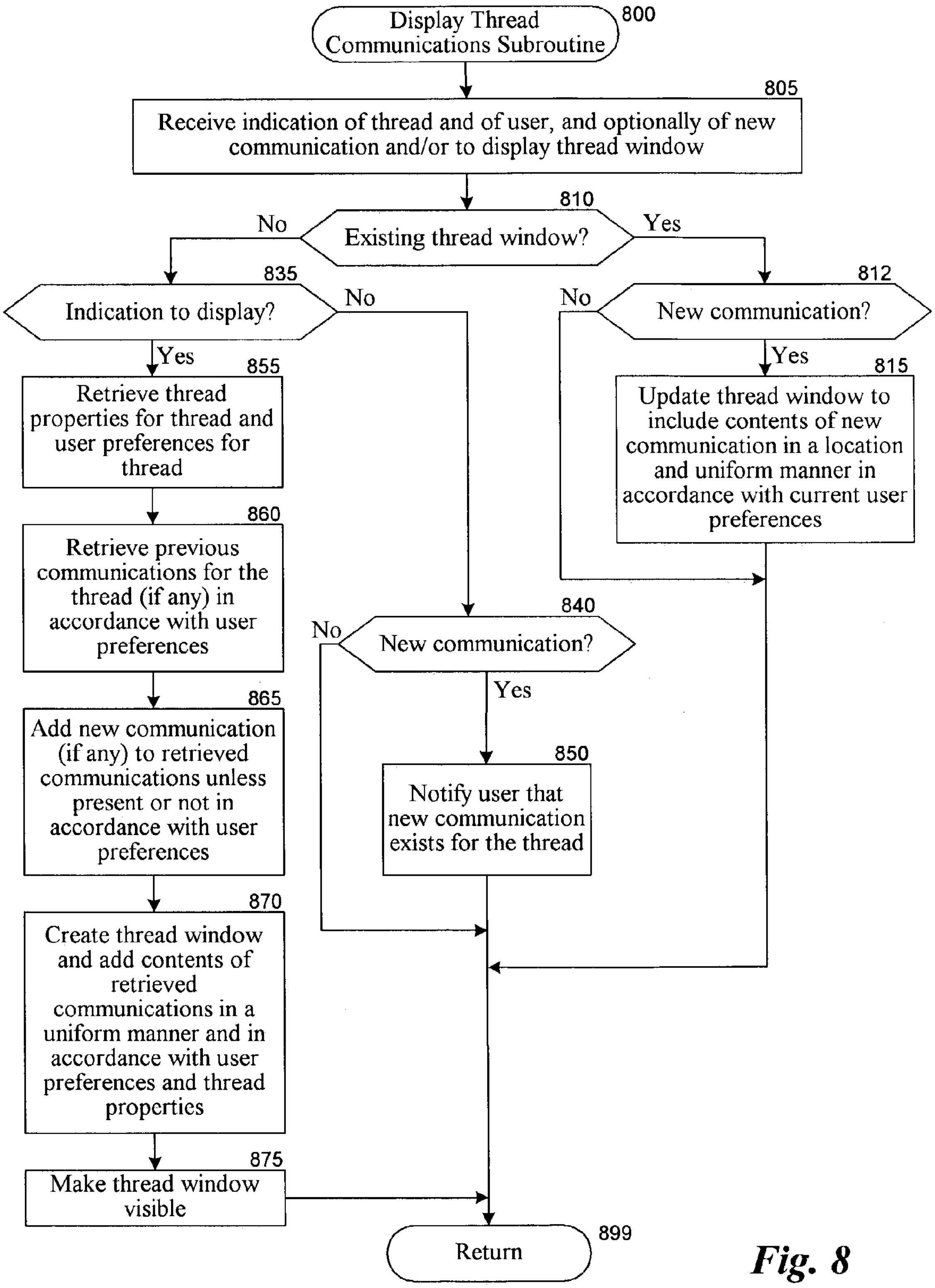
FIG. 8 is a flow diagram of an embodiment of a Display Thread Communications subroutine.

FIG. 8 is a flow diagram of an embodiment of a Display Thread Communications subroutine 800. The subroutine displays information about thread communications to a user or otherwise notifies a user of their existence as appropriate, although in other embodiments thread communication information may be provided in ways other than visual display. In addition, in the illustrated embodiment the transcript of thread communication contents for each thread is displayed in a distinct window (e.g., simultaneously with other thread transcript display windows), although in other embodiments thread transcripts can be displayed in other manners (e.g., in different sections of a single window, or serially one at a time).

The subroutine begins at step 805 where an indication is received of a thread and of a user, and optionally of an indication to immediately display the thread window and/or of one or more new communications that have been received. The subroutine then continues to step 810 to determine whether a thread window is already displayed for the thread. If so, the subroutine continues to step 812 to determine whether one or more new communications were received in step 805. If so, the subroutine continues to step 815 to update the existing thread window to include the contents of those new communications (e.g., in accordance with current user preferences as to types of information to be displayed, an order for the display and other display preferences). In the illustrated embodiment, the various thread communications are by default displayed in a uniform manner with respect to other thread communications and are displayed simultaneously with other thread communications in a specified order in a single window.

If it was instead determined in step 810 that a thread window did not exist, the subroutine continues to step 835 to determine whether an indication to immediately display the thread window was received in step 805. If so, a thread window will be generated and displayed in steps 855-875. In particular, if it is determined in step 835 that an indication to display the thread window was received, the subroutine continues to step 855 to retrieve the thread properties for the thread (if any) and the user preferences related to the thread (if any). The subroutine then continues to step 860 to retrieve previous communications for the thread (if any), such as from a local database or by interacting with the Thread Communication Manager to retrieve non-local stored thread communications (e.g., from a thread server or underlying messaging server that is storing the thread communications). If user preferences exist that relate to prior communications to be displayed (e.g., a maximum number of prior communications to display), such user preferences can be used as part of the retrieving of previous communications, such as by retrieving only communications that conform to the user preferences or by discarding received communications that do not conform.

After step 860, the subroutine continues to step 865 to add any new communications received in step 805 to the retrieved communications, unless those communications are already present or do not conform with any corresponding user preferences. After step 865, the subroutine in step 870 creates a thread window and adds the contents of the retrieved communications in accordance with user preferences and any thread properties, such as to display the contents simultaneously, in a uniform manner, and in an appropriate order. In step 875, the subroutine then makes the created thread window visible to the user if it was not already visible.

If it was instead determined in step 835 that no indication to display a thread window was received in step 805, the subroutine continues to step 840 to determine whether a new communication was received in step 805. In the illustrated embodiment, when a new communication is received but the thread window is not currently displayed, a notification is by default provided to the user of the thread communication existence. Thus, if it is determined in step 840 that a new communication was received in step 805, the subroutine continues to step 850 to notify the user that a new communication exists for the thread. Such notification can be provided in a variety of ways, such as by providing an active notification (e.g., a pop-up window or an audible alert), by providing a visible notification via related information that is accessible to the user (e.g., highlighting or otherwise indicating threads that have new communications in the thread summary information), etc.

After steps 815, 850 or 875, or if it was determined in steps 812 or 840 that no new communications were received, the subroutine continues to step 899 and returns.

Figure 9:
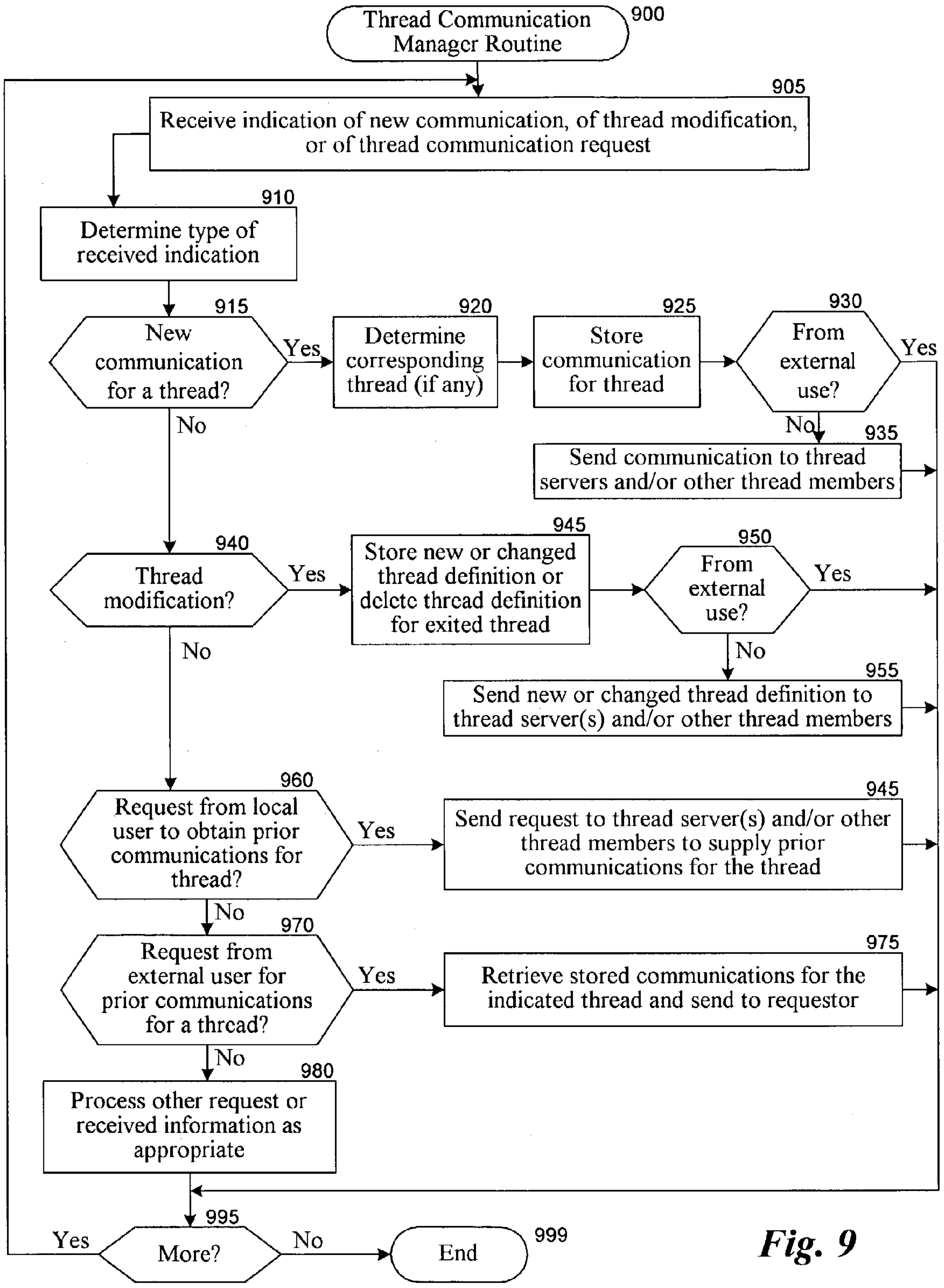
FIG. 9 is a flow diagram of an embodiment of a Thread Communication Manager routine.

FIG. 9 is a flow diagram of an embodiment of a Thread Communication Manager routine 900. The routine receives indications of new communications that are received or to be sent or of other types of messages, and handles the communications or other messages as appropriate. While in the illustrated embodiment the Thread Communication Manager routine is performed on a thread client on behalf of a particular user local to that thread client, in other embodiments the illustrated routine could with slight modifications be implemented instead on a thread server, such as to serve multiple users at multiple thread clients.

The routine begins in step 905 where an indication is received of a new communication, of a new thread or modification to an existing thread, or of a request related to thread communications. The routine then continues to step 910 to determine the type of the received indication.

If it is determined in step 915 that the received indication is of a new thread communication, the routine continues to step 920 to determine the corresponding thread for the communication (if any), such as based on stored or otherwise available thread definitions. An appropriate thread can be determined in a variety of ways, such as based on explicit thread-related information included with the communication (e.g., a thread ID), on a subject or topic associated with the communication, on the specified group of recipients for the communication, etc. In some situations, such as if a user has previously deleted a thread to which the communication belongs, no thread for the communication may be identified. After step 920, the routine continues to step 925 to store the communication for the determined thread (if any). In the illustrated embodiment, each communication is associated with only a single thread, although in other embodiments, a communication could be associated with multiple threads, and if so those multiple threads can be determined in step 920 and the communication could be stored for each of those threads in step 925. The routine then continues to step 930 to determine whether the communication was received from a local thread group member, and if so the routine continues to step 935 to send the communication from the local user to the other external thread group members, either directly or via one or more thread servers and/or one or more underlying message services.

If it was determined in step 915 that the type of received indication was not a new communication, the routine instead continues to step 940 to determine whether the indication was to modify the current threads of the user, such as with a modification to an existing thread or with the addition of a new thread. If so, the routine continues to step 945 to store the new or changed thread definition or to delete a thread definition for a thread that has been exited, as appropriate. In step 950, the routine then determines whether the instruction was received from a local user, and if so continues to step 955 to send the new or changed thread definition to the thread clients of other thread group members and/or to the thread servers, either directly or via an underlying message service.

If it was instead determined in step 940 that the indication was not to modify current threads, the routine continues to step 960 to determine whether the indication was a request from a local user to obtain prior communications for a thread, such as when the user has just joined an existing thread. If so, the routine continues to step 965 to send a request to one or more thread servers and/or thread clients of other thread group members to have them supply prior communications for the thread.

If it was instead determined in step 960 that the indication was not a request from a local user to obtain prior communications, the routine continues to step 970 to determine whether the indication was a request from an external user for prior communications for a thread (e.g., via the Thread Communication Manager for that user). If so, the routine continues to step 975 to retrieve stored communications for the indicated thread (if any) and to send them to the requestor. If it is determined in step 970 that the received indication was not a request from an external user for prior communications, the routine instead continues to step 980 to process another type of request or received information as appropriate. After steps 935, 955, 965, 975 or 980, or if it was determined in steps 930 or 950 that the information was from an external user, the routine continues to step 995 to determine whether to continue. If so, the routine returns to step 905, and if not continues to step 999 and ends.

Those skilled in the art will appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method in a client computing device for maintaining multiple simultaneous interactive threads of communication for a user of the client computing device, the method comprising:

creating multiple persistent threads of communication for the user of the client computing device, each thread having a distinct group of multiple participants that includes the user and multiple other users and each having a distinct associated topic such that the communications for a thread each have contents related to the topic for that thread, the creating of each of the multiple threads occurring before receiving any communications for the thread and including, receiving an indication from the user to create the thread, the received indication including an indication of the group of multiple participants for the thread; and automatically communicating with computing devices of the other indicated participants to create the thread on each of those computing devices, so that each of the thread participants is enabled to send communications for the thread and is enabled to view received communications for the thread from other thread participants; and simultaneously displaying the multiple threads of communication to the user of the client computing device in such a manner that, for each of the multiple threads, communications of the thread are displayed together in a uniform manner and are displayed separately from communications of the other threads, the displaying of each thread of communication including, while the client computing device is actively communicating with other computing devices, receiving multiple communications for the thread that are each from one of the multiple other users for the thread;

receiving multiple communications for the thread from the user that are each intended for the multiple other users for the thread;

sending the multiple communications from the user to the multiple other users for the thread in a manner without notification to the user; and displaying to the user in a single window and in a specified order all the received communications for the thread from the user and from the other users such that all of the contents of all of the communications are displayed to the user in a uniform manner;

after the displaying of all the received communications for the thread and while the client computing device is no longer actively communicating with other computing devices, receiving one or more additional communications for the thread from the user that are intended for the multiple other users for the thread; and without sending the received additional communications to the multiple other users for the thread, updating the display for the thread to include the received additional communications from the user in such a manner that those additional communications are displayed in the same manner as the previously sent communications for the thread from the user; and after the updating of the display and while the client computing device is again actively communicating with other computing devices, sending the received additional communications for the thread from the user to the multiple other users for the thread, the sending performed in a manner without notification to the user;

receiving additional communications for the thread that are each from one of the multiple other users for the thread, one or more of the received additional communications sent while the client computing device was not actively communicating with other computing devices; and updating the display for the thread to include the received additional communications from the other users in such a manner that those additional communications are displayed in the same manner as the other previously received communications for the thread from the other users, so that the user of the client computing device can send communications to each of multiple simultaneous threads whether or not the client computing device is actively communicating with other computing devices and can see a display with all of the contents of all of the communications for a thread shown in a uniform manner.

2. The method of claim 1 wherein each of the threads are persistent such that a thread continues to exist despite passage of time and even if all of the participants for the thread are offline and not currently participating in the thread, so that any of the participants can later continue sending and receiving communications for the thread.

3. The method of claim 1 wherein each of the threads provides virtual interactivity to a user such that a constant connection is simulated transparently to the user for a thread even when the user is offline, the connection simulation allowing the user to view previously received communications from other thread participants and to specify new communications that will later be sent to other thread participants.

4. The method of claim 1 including, after the displaying to the user of all the received communications for one of the threads:

receiving an indication from the user to add an additional user to the group of participants for the one thread; and communicating with the computing devices of the participants for the one thread in order to modify stored definitions for the one thread to include the additional user, so that after the modifying of the stored definitions the additional user can send communications for the one thread to the other thread participants and can view received communications for the one thread that were subsequently sent by the other thread participants.

5. The method of claim 4 including providing to the additional user communications for the one thread that were sent prior to the received indication to add the additional user, so that the additional user can view the same thread communications as other thread participants.

6. The method of claim 1 including, after the displaying to the user of the received communications for one of the threads in a specified order, modifying the order in which the received communications are displayed based on an instruction received from the user.

7. The method of claim 1 including, while the client computing device is actively communicating with other computing devices:

receiving an instruction from the user to temporarily suspend interactive communications for one or more of the multiple threads; and during the period of temporary suspension of interactive communications, refraining from updating the display of the received communications for the one or more threads to include additional communications sent by other thread participants during the temporary suspension period; and refraining from sending to the other thread participants any additional communications specified by the user during the temporary suspension period.

8. The method of claim 1 wherein the sending of communications for one or more of the threads includes:

generating messages corresponding to the communications in such a manner as to be specified in accordance with a distinct underlying messaging service; and supplying the generated messages to the underlying messaging service for transfer to the other thread participants.

9. The method of claim 8 wherein the underlying message service is email.

10. The method of claim 8 wherein the underlying message service is Instant Messaging.

11. The method of claim 1 wherein the client computing device is a thread client, and wherein the receiving and the sending of communications for one or more of the threads includes interacting with one or more thread server computing devices to facilitate the receiving and the sending.

12. The method of claim 1 wherein each of the threads has a unique associated identifier, and wherein the communications for a thread are each associated with the unique identifier for that thread.

13. A method for a computing device of a user to assist the user in participating in multiple simultaneous threads of communication, the method comprising:

receiving multiple thread communications that are each associated with one of multiple simultaneous threads in which the user is participating, each of the threads having multiple participants selected by at least one of the participants, each received communication being from the user or from another of the participants in the thread with which the communication is associated;

for each of the multiple simultaneous threads, automatically displaying a distinct transcript for the thread to the user such that all contents of received communications for that thread are displayed together in a consistent manner as part of the transcript;

automatically storing the multiple received thread communications to enable later display to the user of the multiple received thread communications after the computing device of the user is restarted;

after the displaying of the transcripts for the multiple simultaneous threads, receiving a first next communication from the user for a first of the threads while the user is actively interacting with one or more other participants in the first thread, and in response providing the received first next communication to those other participants and updating the displayed transcript for the first thread to display all contents of the first next communication together in a consistent manner with all contents of previously received communications for the first thread; and after the displaying of the transcripts for the multiple simultaneous threads, receiving a second next communication from the user for a second of the threads while the user is not actively interacting with any other participants in the second thread, and in response storing the received second next communication to enable later providing of the second next communication to those other participants and updating the displayed transcript for the second thread to display all contents of the second next communication together in a consistent manner with all contents of previously received communications for the second thread.

14. The method of claim 13 wherein the transcripts for the multiple threads are simultaneously displayed to the user.

15. The method of claim 14 wherein each of the transcripts is displayed in a distinct window.

16. The method of claim 13 wherein a thread application program executing on the computing device assists in the receiving and the providing of thread communications, wherein at least one of the transcripts is included in a document associated with an application program distinct from the thread application program, and wherein the displaying of the included transcript is based on the display of the document by the distinct application program.

17. The method of claim 16 wherein the distinct application program is an email program and the document is an email message.

18. The method of claim 16 wherein the transcript is included in the document in such a manner as to be dynamically updateable to reflect changes in the communications for the thread.

19. The method of claim 13 wherein the displaying of all contents of multiple communications for a thread together in a consistent manner includes displaying the contents with a uniform appearance.

20. The method of claim 13 wherein the displaying of all contents of multiple communications for a thread includes further displaying an indication of a sender and of an associated time for each of the multiple communications.

21. The method of claim 13 wherein the displaying of all contents of multiple communications for a thread includes displaying the multiple communications in a user-specified order.

22. The method of claim 13 including, after the displaying of all contents of multiple communications for a thread to a user, modifying a displayed order of the displayed thread communications and/or modifying the communications that are displayed for that thread based on instructions received from the user.

23. The method of claim 13 wherein each of the threads has a persistent existence despite passage of time and a lack of any participants actively participating in the thread, so that one of the participants can later continue active participation in the thread.

24. The method of claim 13 wherein a current active participation of the user in at least one of the multiple simultaneous threads is temporarily suspended, and wherein one or more communications from the user for one or more of those threads that are received during the temporary suspension are stored so that they can be provided to the other participants of those threads after the temporary suspension ends.

25. The method of claim 13 wherein a current active participation of the user in at least one of the multiple simultaneous threads is temporarily suspended, and wherein one or more communications from other thread participants for one or more of those threads that were generated by those other thread participants during the temporary suspension are provided to the user after the temporary suspension ends.

26. The method of claim 13 wherein all of the participants in one of the threads other than the user temporarily suspend their active participation in that thread, and wherein one or more communications from the user for that thread that are received during the temporary suspension of the other participants are stored so that they can be provided to the other participants of those threads after the temporary suspension ends.

27. The method of claim 13 wherein each of the threads simulates a virtual interactive connection when the user is not actively interacting with other thread participants, the virtual connection allowing the user to view previously received communications and to specify new communications that will later be sent to other thread participants.

28. The method of claim 27 wherein the virtual connection is provided in such a manner that it is transparent to the user whether the user is actively interacting with other thread participants.

29. The method of claim 13 including, for each of at least one of the threads and before receiving any communications for that thread, creating the thread based on a received instruction from the user that indicates the multiple participants for the thread.

30. The method of claim 29 wherein the creating of the thread includes obtaining approval of an indicated participant for a thread being created before adding that participant to the thread.

31. The method of claim 29 wherein at least some of the multiple participants for a thread being created are offline during the creating of the thread.

32. The method of claim 29 wherein the received instruction from the user to create a thread is to create a child thread of an existing thread, and wherein the multiple participants indicated for the child thread include the participants of the existing thread.

33. The method of claim 32 wherein the creating of the child thread of the existing thread includes inheriting properties of the existing thread and/or inheriting existing communications of the existing thread.

34. The method of claim 13 including, after multiple communications for one of the threads have been exchanged by the participants of that thread, adding an additional user as a participant for the one thread based on a received indication.

35. The method of claim 34 wherein the adding of the additional user as a participant for the one thread includes notifying the existing participants of the one thread so that later communications for the thread from the existing participants will be provided to the additional user.

36. The method of claim 34 including, before the adding of the additional user as a participant for the one thread, obtaining approval of at least some of the existing participants of the one thread.

37. The method of claim 34 wherein the received indication to add the additional user is from the user of the computing device, and including obtaining approval of the additional user before the adding of the additional user as a participant for the one thread.

38. The method of claim 34 wherein the received indication to add the additional user is from the additional user.

39. The method of claim 34 wherein the adding of the additional user as a participant for the one thread includes providing to the additional user at least some of the multiple communications for the one thread that had been exchanged by the participants prior to the adding.

40. The method of claim 13 including, after multiple communications for one of the threads have been exchanged by the participants of that thread, removing one of the participants from the one thread, and wherein subsequent communications for that one thread from other participants of the thread are not provided to the one participant.

41. The method of claim 13 including, after multiple communications for one of the threads have been exchanged by the participants of that thread, removing the user as a participant in the one thread based on an instruction received from the user, and wherein any subsequent communications for that one thread that are received are discarded.

42. The method of claim 13 wherein the receiving and the providing of communications for one or more of the threads is based on an underlying email messaging service.

43. The method of claim 13 wherein the receiving and the providing of communications for one or more of the threads is based on an underlying Instant Messaging service.

44. The method of claim 13 wherein the computing device is a thread client, and wherein the receiving and the providing of communications for one or more of the threads includes interacting with one or more thread servers to facilitate the receiving and the providing.

45. The method of claim 13 wherein the computing device is a thread client, and wherein the receiving and the providing of communications for one or more of the threads includes interacting with thread clients of the other participants of those threads without interacting with any thread servers.

46. The method of claim 13 wherein the computing device is a thread server, and wherein receiving and providing of communications for one or more of the threads is additionally performed for one or more of the other participants of those threads.

47. The method of claim 13 including determining a thread with which a received communication is associated based at least in part on a thread identifier indicated by the received communication, each of the threads having an associated identifier.

48. The method of claim 47 wherein the identifier for a thread is associated with the group of multiple participants for that thread.

49. The method of claim 13 including determining a thread with which a received communication is associated based at least in part on a subject of the received communication and/or on indicated recipients for the received communication.

50. The method of claim 13 wherein each of the multiple threads has a distinct associated topic such that the communications for a thread have contents that are related to the topic for the thread.

51. The method of claim 50 including monitoring received communications for at least one of the threads to ensure that the contents of the received communications for those threads are related to the topics for those threads.

52. The method of claim 13 including tracking attention given by the user to one or more of the received thread communications, and providing information about the tracked attention to at least one thread participant.

53. The method of claim 13 including, for each of the participants of at least one of the threads, tracking interactions of the participant with at least some of the communications of that thread, and wherein information about the tracked interactions with a thread communication are provided to a sender of that communication.

54. The method of claim 13 including assisting another user of a computing device in participating in a distinct group of multiple simultaneous threads, the distinct group of multiple simultaneous threads including at least two of the multiple threads of the user.

55. The method of claim 13 wherein multiple distinct users act as a single virtual participant of a thread, such that communications sent from any of the multiple distinct users appear to other participants of the thread as being from the single virtual participant.

56. The method of claim 13 including, in response to an indication from the user, providing a thread to another user that is not a participant of the thread in such a manner that the another user can view the transcript for the thread.

57. The method of claim 56 wherein the another user can interact with the provided thread in order to provide thread communications to the participants of the thread.

58. A computer-readable memory medium whose contents cause a computing device to assist a user in participating in multiple threads of communication, by performing a method comprising:

receiving multiple thread communications that are each for one of multiple threads in which the user is a participant, each of the threads having multiple participants selected by at least one of the multiple participants, each received communication for a thread being from the user or from another of the participants in the thread; and for each of a plurality of the multiple threads, presenting a distinct transcript for the thread to the user such that contents of multiple communications for that thread are presented together in a consistent manner as part of the transcript;

automatically storing the multiple received thread communications to enable later persistent presentation to the user of the multiple received thread communications;

after the presenting of the transcripts for the plurality of threads, receiving a first next communication from the user for a first of the plurality of threads while one or more other participants in the first thread are currently available, providing the received first next communication to those other currently available participants, and updating the presented transcript for the first thread to include contents of the first next communication together in a consistent manner with contents of previously received communications for the first thread; and after the presenting of the transcripts for the plurality of threads, receiving a second next communication from the user for a second of the plurality of threads while one or more other participants in the second thread are not currently available, the received second next communication to enable later providing of the received second next communication to those other participants that are not currently available, and updating the presented transcript for the second thread to include contents of the second next communication together in a consistent manner with contents of previously received communication for the second thread.

59. The computer-readable medium of claim 58 wherein the computer-readable medium is a memory of the computing device.

60. The computer-readable medium of claim 58 wherein the contents are instructions that when executed cause the computing device to perform the method.

61. The computer-readable memory medium of claim 58 wherein the transcripts for the multiple threads are simultaneously displayed to the user.

62. The computer-readable memory medium of claim 58 wherein the presenting to the user of the transcript for a thread includes presenting all contents of the multiple communications for the thread with a uniform appearance.

63. The computer-readable memory medium of claim 58 wherein one or more of the threads each has a persistent existence despite passage of time and a lack of any users actively participating in the thread, so that one of the users who previously participated in the thread can later continue active participation in the thread.

64. The computer-readable memory medium of claim 58 wherein the one or more other participants in the second thread being not currently available is based on at least one of the user temporarily suspending active participation of the user in at least the second thread and of the computing device being no longer in communication with computing devices of the one or more other participants.

65. The computer-readable memory medium of claim 58 wherein the method further comprises, before receiving any communications for one of the threads, creating the one thread based on a received instruction from the user that indicates one or more of the other selected participants in the one thread.

66. The computer-readable memory medium of claim 65 wherein the creating of the one thread includes obtaining approval of each of the one or more other participants before adding that other participant to the one thread.

67. The computer-readable memory medium of claim 58 wherein the method further comprises, after multiple communications for one of the threads have been exchanged between the participants of the one thread, adding an additional participant to the one thread, such that later communications for the one thread will be provided to the additional participant.

68. The computer-readable memory medium of claim 67 wherein the method further comprises, before the adding of the additional participant to the one thread, obtaining approval of one or more existing participants in the one thread.

69. The computer-readable memory medium of claim 67 wherein the adding of the additional participant to the one thread includes providing to the additional participant at least some of the multiple communications for the one thread that had been exchanged prior to the adding.

70. The computer-readable memory medium of claim 58 wherein the providing of the received first next communication to other currently available participants in the first thread is based on use of at least one of an email messaging service and an Instant Messaging service.

71. The computer-readable memory medium of claim 58 wherein each of the threads has a distinct associated topic such that the communications for a thread have contents that are related to the topic for the thread.

72. The computer-readable memory medium of claim 71 wherein the method further comprises monitoring received communications for a thread to ensure that the contents of the received communications for the thread are related to the topic for the thread.

73. A computing device for assisting a user in participating in multiple threads of communication, comprising:

a thread communication manager component that is capable of receiving multiple thread communications that are each for one of multiple threads in which the user is a participant with one or more other selected participants, each received communication for a thread being from the user or from another of the participants in that thread;

providing thread communications from the user for the multiple threads to other participants of those threads that are currently available;

automatically storing the multiple received thread communications to enable later persistent presentation to the user of the multiple received thread communications;

after receiving a first next communication from the user for a first of the multiple threads, and while one or more other participants in the first thread are currently available, providing the received first next communication to those other currently available participants; and after receiving a second next communication from the user for a second of the multiple threads, and while one or more other participants in the second thread are not currently available, storing the received second next communication to enable later providing of the received second next communication to those other participants that are not currently available; and at least one thread participation manager component that is associated with one or more of the multiple threads and that is capable of, for each of the associated threads;

presenting a distinct transcript for the thread to the user such that contents of multiple communications for the thread are presented together in a consistent manner as part of the transcript;

if the thread is the first thread, after receiving the first next communication from the user, updating the presented transcript to include contents of the first next communication together in a consistent manner with contents of previously received communications for the first thread; and if the thread is the second thread, after receiving the second next communication from the user, updating the presented transcript to include contents of the second next communication together in a consistent manner with contents of previously received communications for the second thread.

74. The computing device of claim 73 wherein the thread communication manager component and the thread participant manager components are executing in memory of the computing device.

75. The computing device of claim 73 further comprising an underlying message service with which the thread communication manager component interacts to facilitate the receiving and the providing of thread communications.

76. The computing device of claim 73 wherein the transcripts for the multiple threads are simultaneously displayed to the user.

77. The computing device of claim 73 wherein one or more of the threads each has a persistent existence despite passage of time and a lack of any users actively participating in the thread, so that one of the users who previously participated in the thread can later continue active participation in the thread.

78. The computing device of claim 73 wherein the thread communication manager component is configured to, before receiving any communications for one of the threads, creating the one thread based on a received instruction from the user that indicates one or more of the other selected participants in the one thread.

79. The computing device of claim 73 wherein the providing of thread communications from the user to other thread participants is based on use of at least one of an email messaging service and an Instant Messaging service.

80. The computing device of claim 73 wherein each of the threads has a distinct associated topic such that the communications for a thread have contents that are related to the topic for the thread.

81. A computer system for assisting a user in participating in multiple threads of communication, comprising:

means for:

receiving multiple thread communications that are each for one of multiple threads in which the user is a participant with one or more other selected participants, each received communication for a thread being from the user or from another of the participants in that thread;

providing thread communications from the user for the multiple threads to other participants of those threads that are currently available;

automatically storing the multiple received thread communications to enable later persistent presentation to the user of the multiple received communications;

after receiving a first next communication from the user for a first of the multiple threads, and while one or more other participants in the first thread are currently available, providing the received first next communication to those other currently available participants; and after receiving a second next communication from the user for a second of the multiple threads, and while one or more other participants in the second thread are not currently available, storing the received second next communication to enable later providing of the received second next communication to those other participants that are not currently available; and means for;

for each of one or more of the multiple, threads, presenting a distinct transcript for the thread to the user such that contents of multiple communications for the thread are presented together in a consistent manner as part of the transcript;

if the thread is the first thread, after receiving the first next communication from the user, updating the presented transcript to include contents of the first next communication together in a consistent manner with contents of previously received communications for the first thread; and if the thread is the second thread, after receiving the second next communication from the user, updating the presented transcript to include contents of the second next communication together in a consistent manner with contents of previously received communications for the second thread.

82. A computer-implemented method for assisting a user of a computing device in participating in multiple simultaneous interactive threads of communication that include a first thread of communication with a first group of multiple other users and a second thread of communication with a second group of multiple other users, the method comprising:

receiving one or more communications for the first thread from the multiple other users of the first group, and receiving one or more communications for the second thread from the multiple other users of the second group;

displaying to the user the received communications for the first thread as a first transcript, and displaying to the user the received communications for the second thread as a second distinct transcript;

receiving a first communication from the user for the first thread and receiving a second communication from the user for the second thread;

updating the display of the first transcript to include the first communication and updating the display of the second transcript to include the second communication;

sending the first communication to the multiple other users of the first group and sending the second communication to the multiple other users of the second group;

while the computing device is no longer in communication with the computing devices of the users of the first group, receiving a third communication from the user for the first thread; and without sending the third communication to the multiple other users of the first group, updating the display of the first transcript to include the third communication in such a manner that the lack of the sending of the third communication is transparent to the user; and when the computing device is again in communication with the computing devices of the users of the first group, sending the third communication to the multiple other users of the first group;

receiving an additional communication for the first thread from one of the other users of the first group that was created while the computing device was not in communication with the computing device of the other user; and updating the display of the first transcript to include the additional communication in such a manner that the lack of communication between the computing device and the computing device of the other user at the time of the communication creation is transparent to the user.

83. The method of claim 82 wherein the first and second transcripts are simultaneously displayed to the user.

84. The method of claim 82 wherein the first thread has multiple communications, and wherein the displaying to the user of the received communications for the first thread includes displaying all contents of the multiple communications together in a consistent manner.

85. The method of claim 82 wherein the first thread has a persistent existence despite passage of time and a lack of any users actively participating in the thread, so that one of the users of the first group can later continue active participation in the thread.

86. The method of claim 82 wherein the computing device being no longer in communication with the computing devices of the users of the first group is based on the user temporarily suspending active participation of the user in at least the first thread.

87. The method of claim 82 further comprising, before receiving any communications for the first thread, creating the first thread based on a received instruction from the user that indicates at least some of the multiple other users of the first group for the first thread.

88. The method of claim 87 wherein the creating of the first thread includes obtaining approval of each of the at least some other users before adding that other user to the first group for the first thread.

89. The method of claim 82 further comprising, after multiple communications for the first thread have been exchanged by the user and the other users of the first group, adding an additional user to the first group for the first thread, such that later communications for the first thread will be provided to the additional user.

90. The method of claim 89 further comprising, before the adding of the additional user to the first group, obtaining approval of one or more of the users in the first group.

91. The method of claim 89 wherein the adding of the additional user to the first group includes providing to the additional user at least some of the multiple communications for the first thread that had been exchanged prior to the adding.

92. The method of claim 82 wherein the receiving of communications for the first thread from the other users of the first group and the sending of communications for the first thread to the other users of the first group are based on use of at least one of an underlying email messaging service and an underlying Instant Messaging service.

93. The method of claim 82 wherein the first and second threads each has a distinct associated topic such that the communications for a thread have contents that are related to the topic for the thread.

94. The method of claim 93 further comprising monitoring received communications for the first thread to ensure that the contents of the received communications for the first thread are related to the topic for the first thread.

* * * * *

UNITED STATES PATENT AND TRADEMARK OFFICE

CERTIFICATE OF CORRECTION

PATENT NO. : 7,328,242 B1 
APPLICATION NO. : 10/246809
DATED : February 5, 2008
INVENTOR(S) : James M. McCarthy et al.

It is certified that error appears in the above-identified patent and that said Letters Patent is hereby corrected as shown below:

<u>On the Title Page</u>
Item (75), Inventors, “Michelle Lee McCarthy” should read as --Michele Lee McCarthy--.

<u>Column 32</u>
Line 48, “capable of” should read as --capable of:--.

<u>Column 33</u>
Line 12, “associated threads;” should read as --associated threads:--.

<u>Column 34</u>
Line 24, “means for;” should read as --means for:--.

Signed and Sealed this

Twelfth Day of August, 2008

JON W. DUDAS
*Director of the United States Patent and Trademark Office*